United States Patent [19]
Gee et al.

[11] Patent Number: 5,581,517
[45] Date of Patent: Dec. 3, 1996

[54] METHOD AND APPARATUS FOR FOCUS CONTROL OF TRANSMIT AND RECEIVE BEAMFORMER SYSTEMS

[75] Inventors: Albert Gee, Los Altos; Christopher R. Cole, Cupertino; J. Nelson Wright, Menlo Park, all of Calif.

[73] Assignee: Acuson Corporation, Mountain View, Calif.

[21] Appl. No.: 432,544

[22] Filed: May 2, 1995

Related U.S. Application Data

[63] Continuation-in-part of Ser. No. 286,268, Aug. 5, 1994, abandoned.

[51] Int. Cl.⁶ .................................................. G03B 42/06
[52] U.S. Cl. ................... 367/138; 367/7; 367/11
[58] Field of Search ................. 367/138, 7, 11; 128/661.01, 660.05, 660.06, 660.07; 73/625, 626; 364/413.25

[56] References Cited

U.S. PATENT DOCUMENTS

| | | | |
|---|---|---|---|
| 4,140,022 | 2/1979 | Maslak | 73/626 |
| 4,180,790 | 12/1979 | Thomas | 367/7 |
| 4,550,607 | 11/1985 | Maslak et al. | 73/626 |
| 4,691,570 | 9/1987 | Hassler | 73/626 |
| 4,699,009 | 10/1987 | Maslak et al. | 73/626 |
| 4,809,184 | 2/1989 | O'Donnell et al. | 364/413.25 |
| 4,839,652 | 6/1989 | O'Donnell et al. | 341/122 |
| 4,870,971 | 10/1989 | Russell et al. | 73/625 |
| 4,886,069 | 12/1989 | O'Donnell | 128/661 |
| 4,893,284 | 1/1990 | Magrane | 367/12 |
| 4,896,287 | 1/1990 | O'Donnell et al. | 364/754 |
| 4,920,521 | 4/1990 | Yoshie | 367/103 |
| 4,975,885 | 12/1990 | Hassler et al. | 367/7 |
| 4,983,970 | 1/1991 | O'Donnell et al. | 341/122 |
| 5,005,419 | 4/1991 | O'Donnell et al. | 73/626 |
| 5,014,710 | 5/1991 | Maslak et al. | 128/660.05 |
| 5,014,712 | 5/1991 | O'Donnell et al. | 128/661.01 |
| 5,068,833 | 11/1991 | Lipschutz | 367/900 |
| 5,111,695 | 5/1992 | Engeler et al. | 73/626 |
| 5,140,558 | 8/1992 | Harrison, Jr. et al. | 367/11 |
| 5,142,649 | 8/1992 | O'Donnell | 367/7 |
| 5,165,413 | 11/1992 | Maslak et al. | 128/660.05 |
| 5,184,623 | 2/1993 | Mallart | 128/661.01 |
| 5,218,869 | 6/1993 | Pummer | 128/660.06 |
| 5,230,340 | 7/1993 | Rhyne | 128/661.01 |
| 5,235,982 | 8/1993 | O'Donnell | 128/660.07 |
| 5,331,963 | 7/1994 | Mallart | 73/625 |
| 5,345,939 | 9/1994 | Engeler et al. | 73/602 |
| 5,348,013 | 9/1994 | Kanda et al. | 128/660.07 |
| 5,353,797 | 10/1994 | Matsushima et al. | 73/626 |
| 5,488,588 | 1/1996 | Engeler et al. | 367/7 |

OTHER PUBLICATIONS

*Beamforming*, Dan E. Dudgeon & Russell M. Mersereau, *Multidimensional Digital Signal Processing*, Section 6.2, Prentice Hall, 1984.

(List continued on next page.)

*Primary Examiner*—Daniel T. Pihulic
*Attorney, Agent, or Firm*—Brinks Hofer Gilson & Lione

[57] ABSTRACT

A beamformer control system includes a primary control and secondary controls so that delay and apodization beamformation profiles can be generated on a dynamic and distributed basis with sparsely sampled base delay and apodization data sets first expanded to the final values by the primary control and then further expanded in the secondary controls associated with multi-processing channels of the beamformer systems. The beamformer control system coordinates the transmit and receive beamformer systems preferably using data sets common to all beamformer systems, and by advantageously specifying to all beamformer systems, processing mode trade-offs among the signal nominal center frequency, the range spatial resolution, and the number of beams. The beamformer control system supports multiple simultaneous beam operation, as well as beam-to-beam adjustable frequency and synthetic aperture operations. Further, the present beamformer control system maintains beam-to-beam coherent receive beamformation and supports adaptive beamformation.

182 Claims, 24 Drawing Sheets

Microfiche Appendix Included
(195 Microfiche, 19058 Pages)

OTHER PUBLICATIONS

*Digital Signal Processing for Sonar,* William C. Knight, Roger G. Pridham, Steven M. Kay, *Proceedings of the IEEE,* vol. 69, No. 11, Nov., 1981.

*Fundamentals of Digital Array Processing,* Dan. E. Dudgeson, *Proceedings of the IEEE,* vol. 65, No. 6, Jun. 1977.

*Digital Beamforming Antennas; An Introduction,* Hans Steyskal *Microwave Journal,* Jan. 1987.

*Doppler Ultrasound in Cardiology; Physical Principles and Clinical Applications,* Liz Hatle and Bjorn Angelsen, Second Edition, pp. 69–71, 1985.

*Acuson 128 Computer Sonography Systems Service Manual,* pp. 13–32, 113–125, Acuson Corp., Aug. 1989.

*Digital Beamforming for Radar,* P. Barton, *Proceedings of the IEEE,* vol. 127, pt. F, No. 4, Aug. 1980.

*A Digital Synthetic Focus Acoustic Imaging System,* P. D. Carl, G. S. Kino, C. S. Desilets, and P. M. Grant, *Acoustic Imaging,* vol. 8, 1978.

*Digital Beamforming in Ultrasound,* B. D. Steinberg, *IEEE Transactions of Ultrasonics, Ferroelectronics, and Frequency Control,* vol. 39, Nov. 1992.

*Multirate Digital Signal Processing,* Ronald E. Crochiere and Lawrence R. Rabiner, Prentice–Hall, 1983.

*Digital Signal Processing Applications Using the ADSP–2100 Family,* vol. 1, Amy Mar, ed., Prentice–Hall, 1992.

*A Novel Approach to Digital Beamforming,* Roger Pridham and Ronald A. Mucci, *Journal of the Acoustical Society of America,* vol. 63, Feb. 1978.

*Digital Interpolation Beamforming for Low Pass and Band Pass Signals,* Roger G. Pridham and Ronald A. Mucci, *Proceedings of the IEEE,* vol. 67, Jun. 1979.

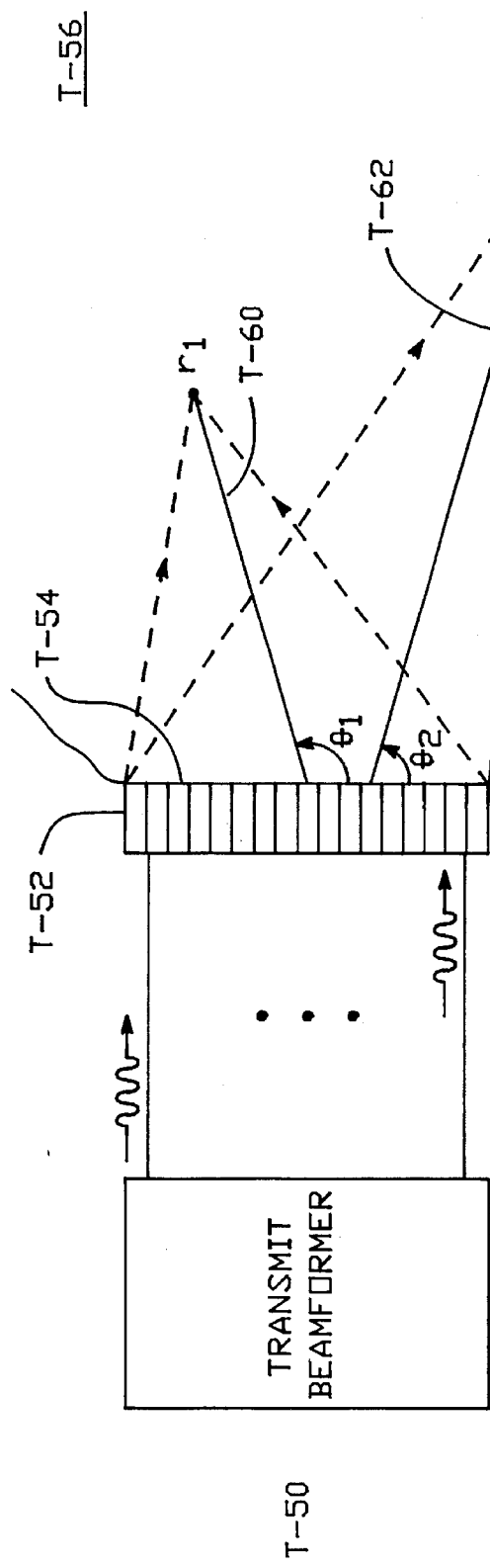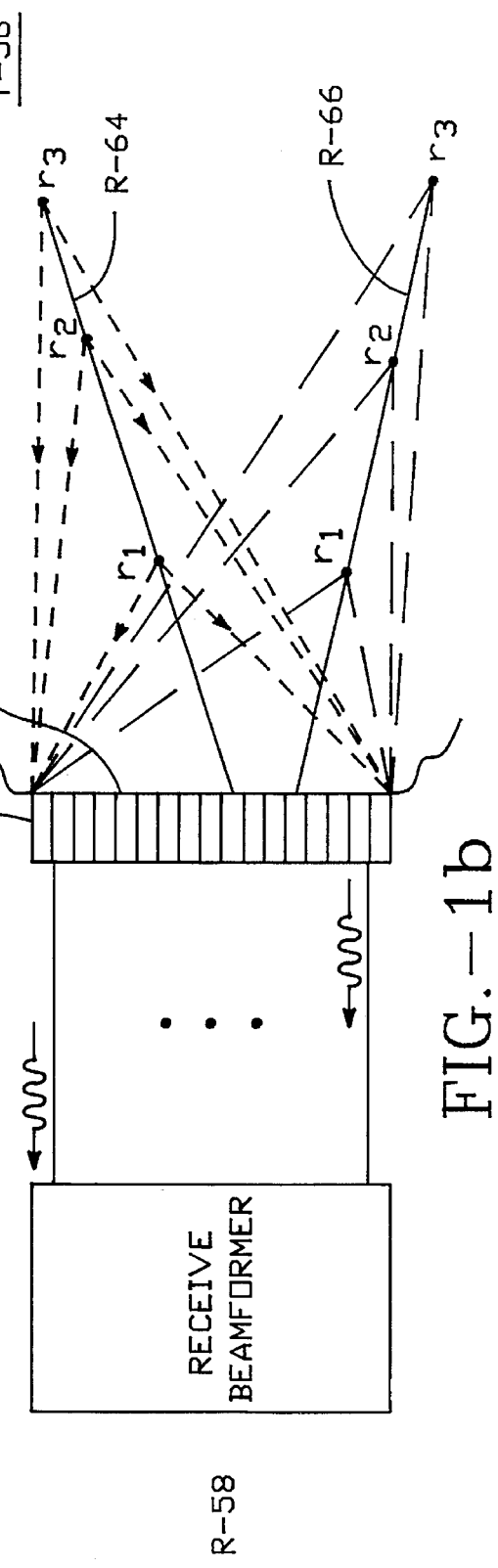

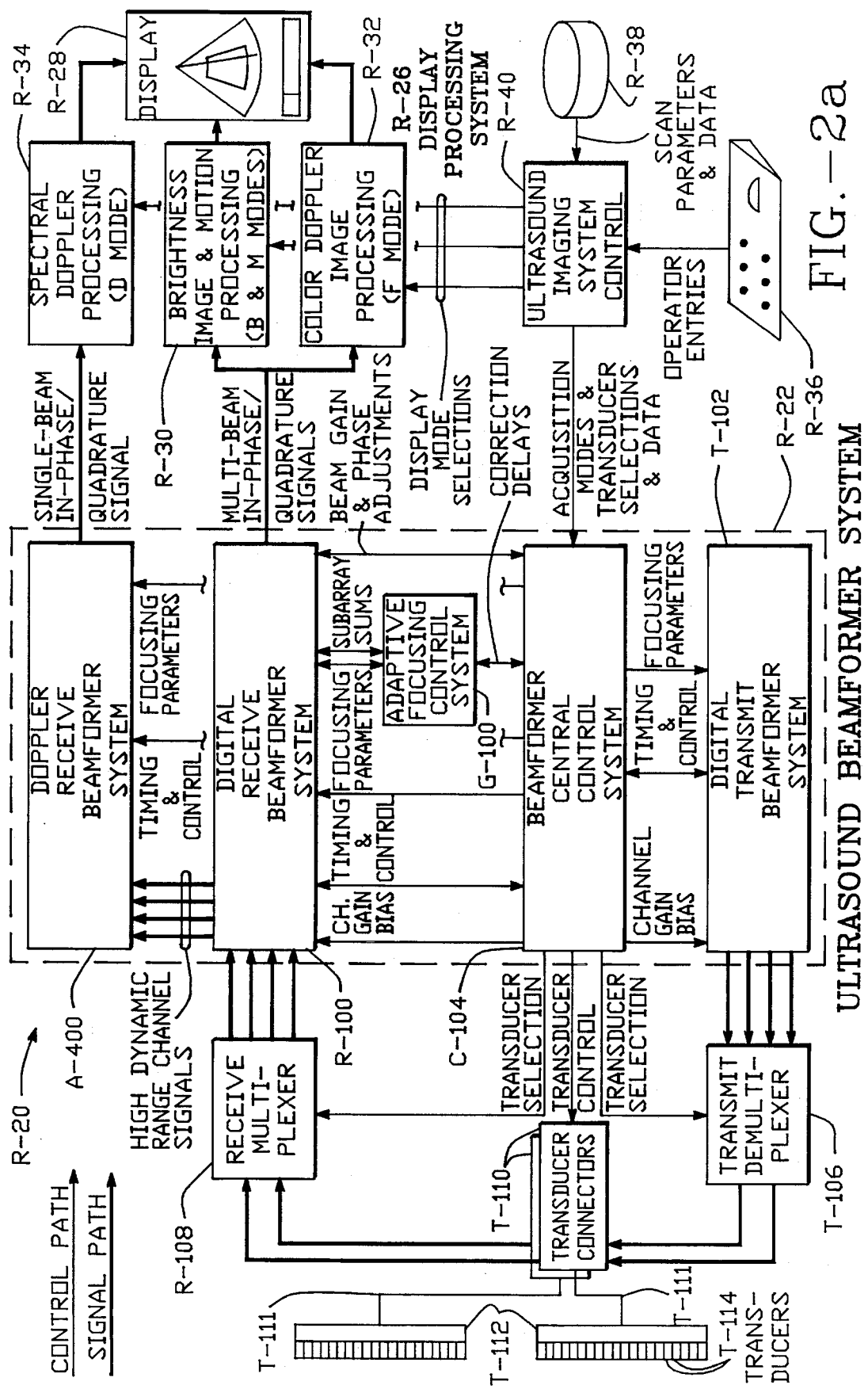
FIG.—2a

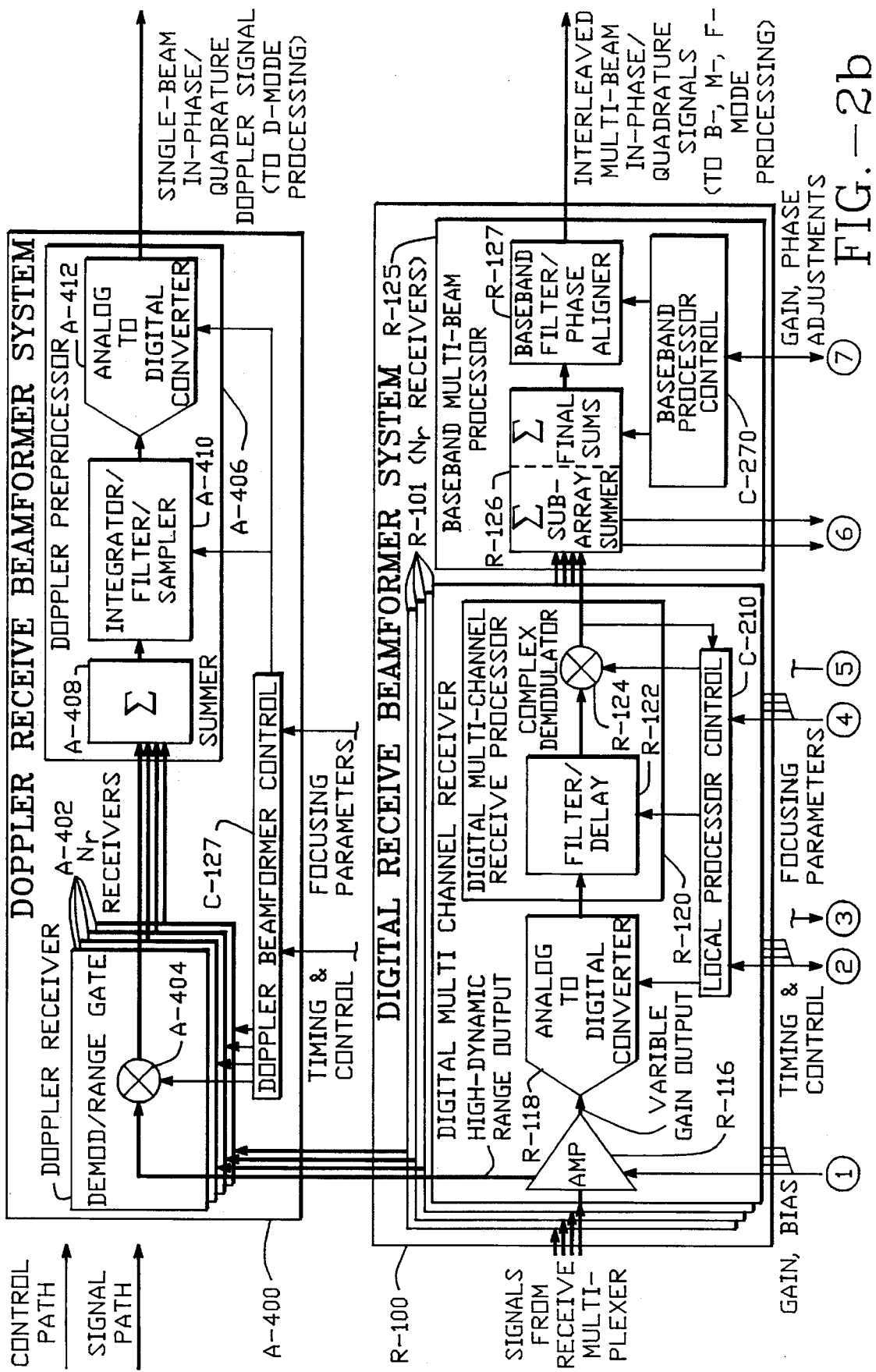
FIG.—2b

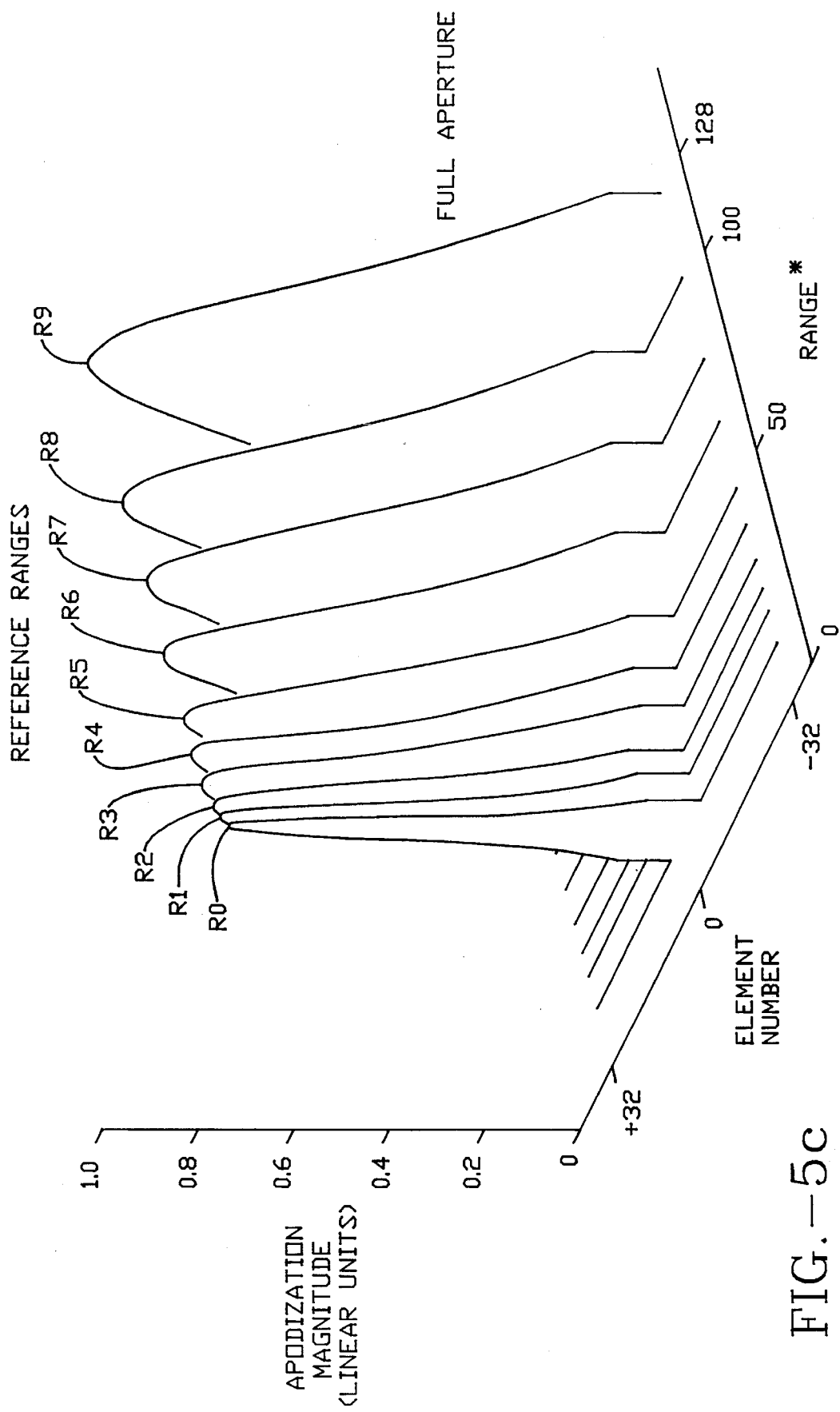
FIG.—5c

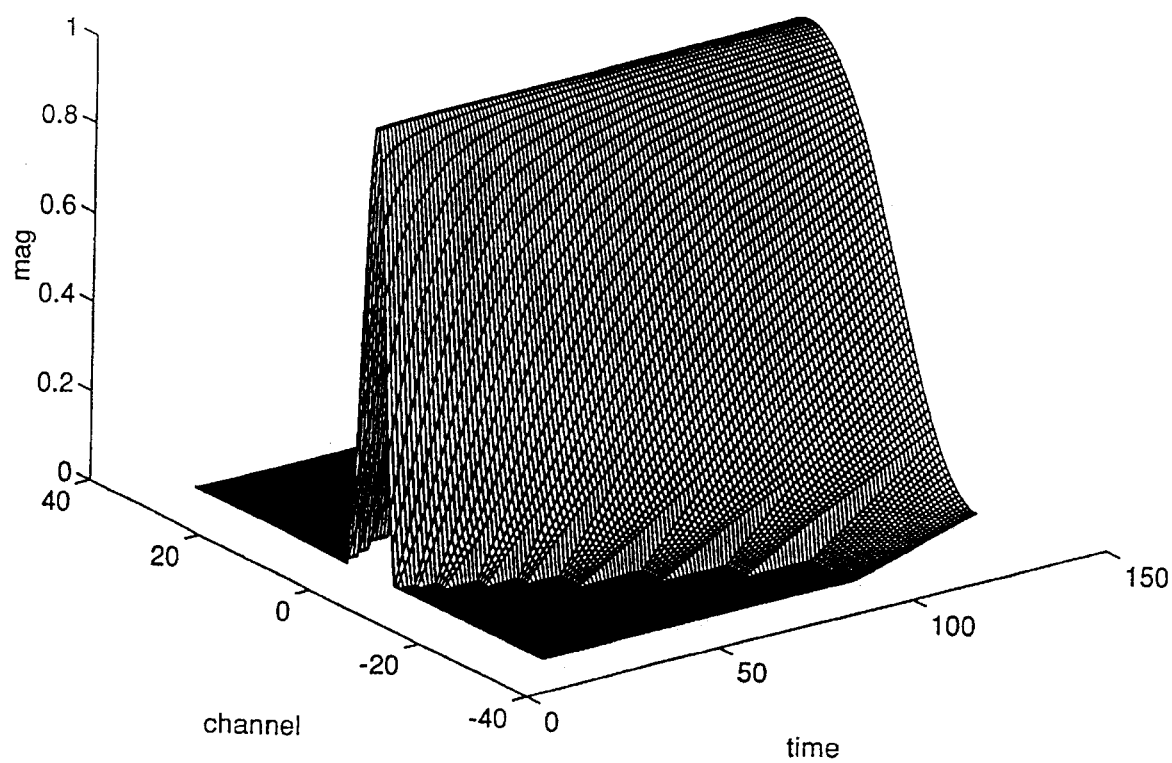
FIG.—5d

DELAY DATA GENERATION

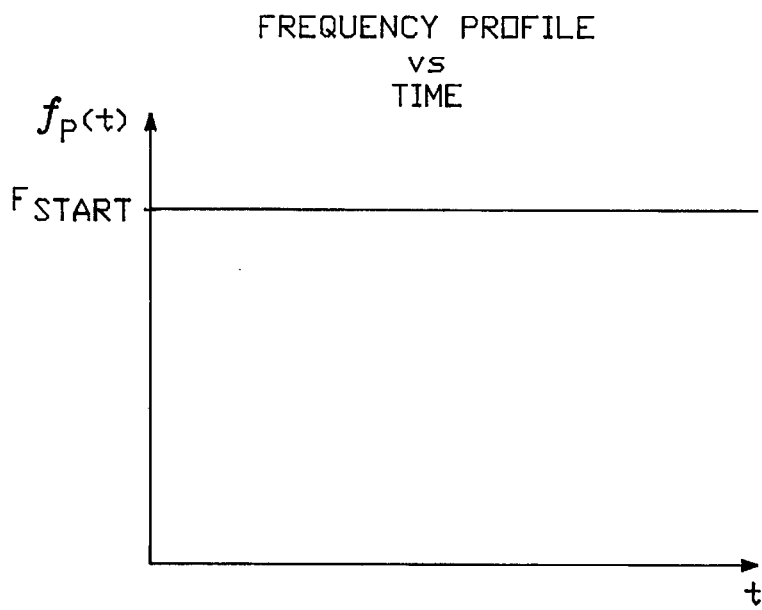
FIG.—13a
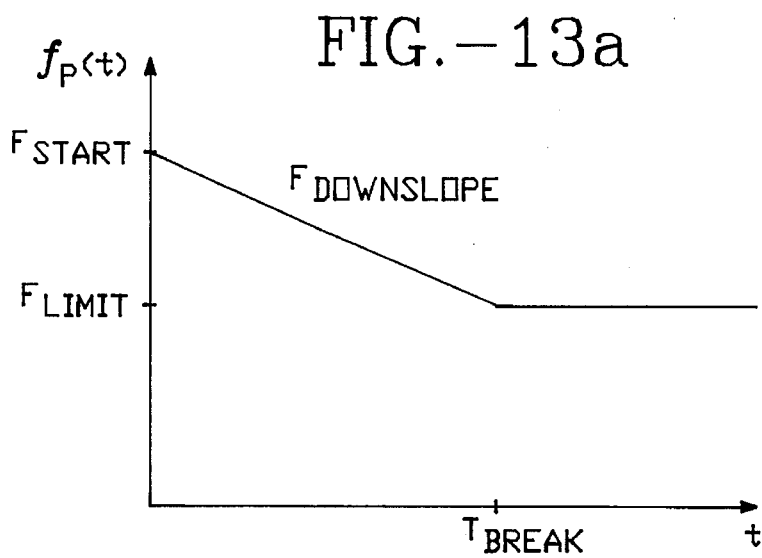
FIG.—13b
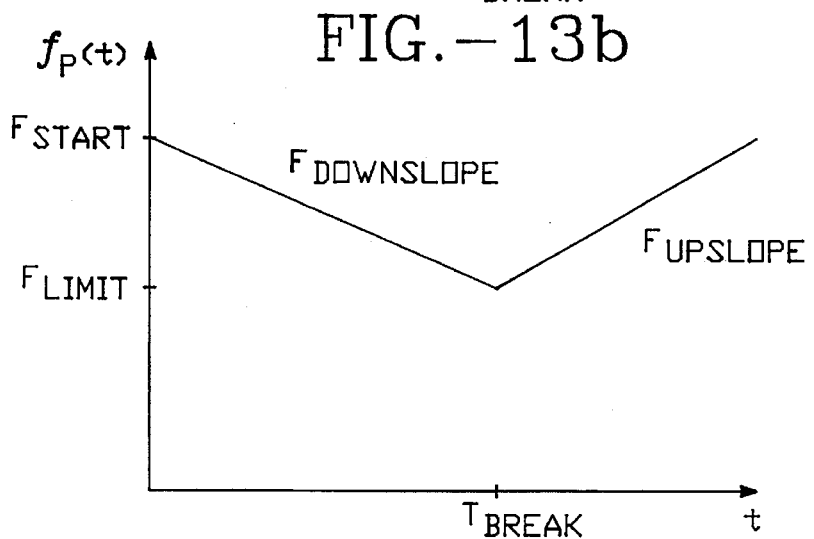
FIG.—13c

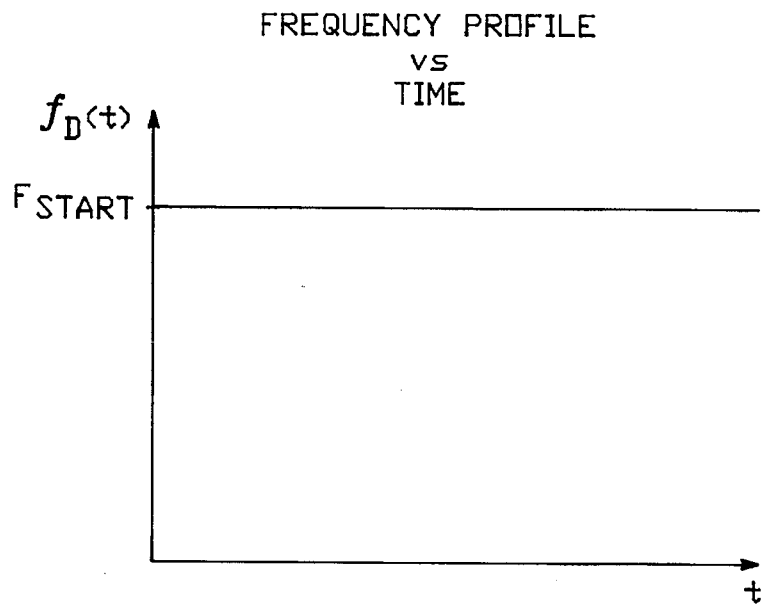
FIG.—13d
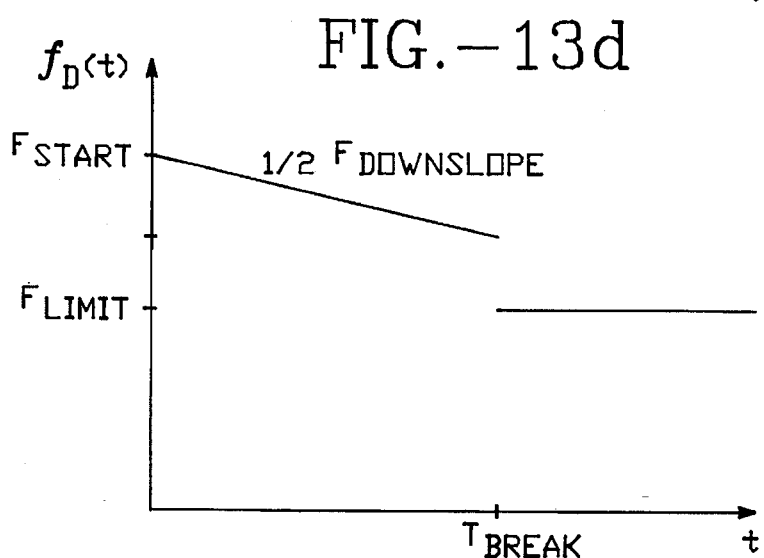
FIG.—13e
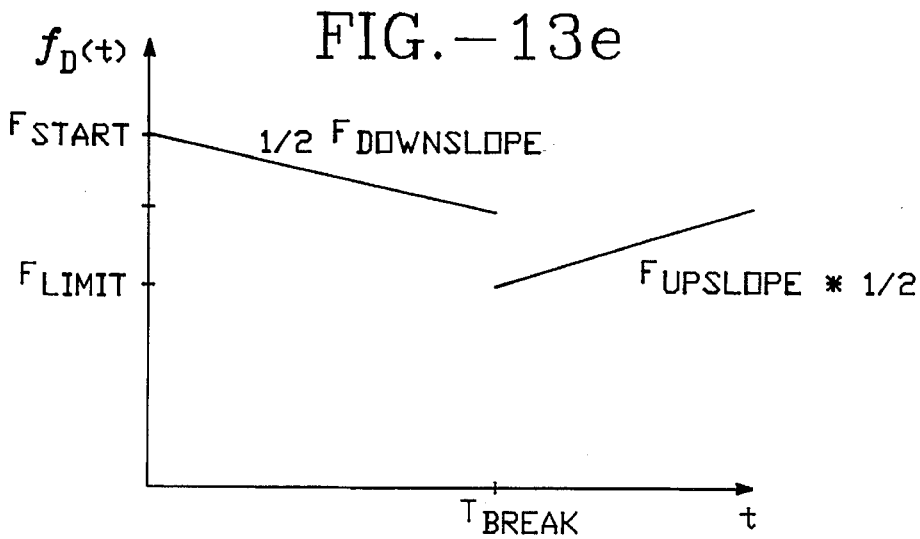
FIG.—13f

METHOD AND APPARATUS FOR FOCUS CONTROL OF TRANSMIT AND RECEIVE BEAMFORMER SYSTEMS

REFERENCE TO RELATED APPLICATION

This application is a continuation in part of Ser. No. 08/286,268 filed Aug. 5, 1994, now abandoned.

CROSS-REFERENCE TO RELATED APPLICATIONS a. METHOD AND APPARATUS FOR RECEIVE BEAMFORMER SYSTEM, Wright et al., Attorney Docket No. 5055-77; Ser. No. 08/286,658 filed Aug. 5, 1994, now abandoned;

b. METHOD AND APPARATUS FOR TRANSMIT BEAMFORMER SYSTEM, Cole et al., Attorney Docket No. 5055--78; Ser. No. 08/286,652 filed Aug. 5, 1994, now abandoned;

c. METHOD AND APPARATUS FOR DOPPLER RECEIVE BEAMFORMER SYSTEM, Maslak et al., Attorney Docket No. 5055-80; Ser. No. 08/286,648 filed on Aug. 5, 1994, now abandoned;

d. METHOD AND APPARATUS FOR ADJUSTABLE FREQUENCY SCANNING IN ULTRASOUND IMAGING, Wright et al., Attorney Docket No. 5055-83; Ser. No. 08/286,524 filed on Aug. 5, 1994, now abandoned;

e. METHOD AND APPARATUS FOR A BASEBAND PROCESSOR OF A RECEIVE BEAMFORMER SYSTEM, Wright et al., Attorney Docket No. 5055-84; Ser. No. 08/432,868 filed on Aug. 5, 1994.

f. METHOD AND APPARATUS FOR BEAMFORMER SYSTEM WITH VARIABLE APERTURE, Cole et al., Attorney Docket No. 5055-85; Ser. No. 08/432,547 filed on Aug. 5, 1994.

The above patent applications are all commonly assigned with the present application, filed concurrently with the present application, and are all incorporated herein by reference.

The present application is also related to the following previously filed applications:

a. METHOD AND APPARATUS FOR REAL-TIME, CONCURRENT ADAPTIVE FOCUSING IN AN ULTRASOUND BEAMFORMER IMAGING SYSTEM, Wright et al., Ser. No. 08/286,528, filed Aug. 5, 1994;

b. METHOD AND APPARATUS FOR A GEOMETRIC ABERRATION TRANSFORM IN AN ADAPTIVE FOCUSING ULTRASOUND BEAMFORMER SYSTEM, Wright et al., Ser. No. 08/286,664, filed Aug. 5, 1994;

c. METHOD AND APPARATUS FOR COHERENT IMAGE FORMATION, Wright et al., Ser. No. 08/286,510, filed Aug. 5, 1994, now abandoned.

REFERENCE TO MICROFICHE APPENDIX

This application includes a microfiche appendix of 195 sheets of microfiche having 19,058 frames. A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

This invention relates to coherent imaging systems including, for example, radar, sonar, seismic, and ultrasound systems, using vibratory energy, and in particular, but not limited to, phased array ultrasound imaging systems for scan formats such as linear, steered linear, sector, circular, Vector®, steered Vector® and other types of scan formats in imaging modes such as B-mode (gray-scale imaging mode), F-mode (flow or color Doppler imaging mode), M-mode (motion mode) and D-mode (spectral Doppler mode). Although the invention will be discussed with respect to an ultrasound system, the invention can be implemented with other types of coherent imaging systems.

BACKGROUND OF THE INVENTION

A. Literature

The open literature, which presents issues relevant to imaging systems in general, includes the following documents which are incorporated herein by reference:

1. Dan E. Dudgeon, "Fundamentals of Digital Array Processing," *Proceedings of the IEEE,* volume 65, pp. 898–904, June 1977.

2. Dan E. Dudgeon and Russell M. Mersereau, *Multidimensional Digital Signal Processing,* Chapter 6, Section 2, "Beamforming," Prentice Hall, 1984.

3. William C. Knight, Roger G. Pridham, and Steven M. Kay, "Digital Signal Processing for Sonar," *Proceedings of the IEEE,* volume 69, pages 1451–1506, November 1981. (Digital beamformers for use in sonar described on pages 1465–1471.)

4. Roger G. Pridham and Ronald A. Mucci, "A Novel Approach to Digital Beamforming," *Journal of the Acoustical Society of America,* volume 63, pages 425–434, February 1978.

5. Roger G. Pridham and Ronald A. Mucci, "Digital Interpolation Beamforming for Low-Pass and Bandpass Signals," *Proceedings of the IEEE,* volume 67, pages 904–919, June 1979.

6. P. Barton, "Digital Beamforming for Radar," IEE Proceedings, volume 127, part F, Number 4, August 1980.

7. P. D. Carl, G. S. Kino, C. S. Desilets and P. M. Grant, "A Digital Synthetic Focus Acoustic Imaging System," *Acoustic Imaging,* vol. 8, pp. 39–53, 1978.

8. B. D. Steinberg, "Digital Beamforming in Ultrasound," *IEEE Transactions on Ultrasonics, Ferroelectrics, and Frequency Control,* vol. 39, pp. 716–721, November 1992.

9. Hans Steyskal, "Digital Beamforming Antennas," *Microwave Journal,* Vol. 30, No. 1, pp. 107–124, January 1987.

10. R. E. Crochiere and L. R. Rabiner, "Multirate Digital Signal Processing," Chapter 2, Prentice Hall, 1983.

B. Analog and Hybrid (Analog-Digital) Beamformer Systems

Relevant analog and hybrid (digital-analog) phased array beamformer system prior art can be found in the following patents which are incorporated herein by reference.

C. Digital Beamformer Systems

The concept of a digital receive beamformer system has been proposed in the art with respect to ultrasound systems. By way of example, the following U.S. patents, all of which are incorporated herein by reference, discuss various aspects of such systems. The patents include:

| U.S. Pat. No. : | Title: | Inventor(s): |
| --- | --- | --- |
| 4,140,022 | MULTIPLE TRANSDUCER ACOUSTIC IMAGING APPARATUS | Samuel H. Maslak |
| 4,550,607 | PHASED ARRAY ACOUSTIC IMAGING SYSTEM | Samuel H. Maslak J. Nelson Wright |
| 4,699,009 | DYNAMICALLY FOCUSED LINEAR PHASED ARRAY ACOUSTIC IMAGING SYSTEM | Samuel H. Maslak Hugh G. Larsen |
| 5,014,710 and 5,165,413 | STEERED LINEAR COLOR DOPPLER IMAGING | Samuel H. Maslak Donald J. Burch J. Nelson Wright Hugh G. Larsen Donald R. Langdon Joel S. Chaffin Grant Fash, III |

| U.S. Pat. No. : | Title: | Inventor(s): |
| --- | --- | --- |
| 4,809,184 | METHOD AND APPARATUS FOR FULLY DIGITAL BEAM FORMATION IN A PHASED ARRAY COHERENT IMAGING SYSTEM | Matthew O'Donnell Mark Magrane |
| 4,839,652 | METHOD AND APPARATUS FOR HIGH SPEED DIGITAL PHASED ARRAY COHERENT IMAGING SYSTEM | Matthew O'Donnell William E. Engeler Thomas L. Vogelsong Steven G. Karr Sharbel E. Noujaim |
| 4,886,069 | METHOD OF, AND APPARATUS FOR, OBTAINING A PLURALITY OF DIFFERENT RETURN ENERGY IMAGING BEAMS RESPONSIVE TO A SINGLE EXCITATION EVENT | Matthew O'Donnell |
| 4,893,284 | CALIBRATION OF PHASED ARRAY ULTRASOUND PROBE | Mark G. Magrane |
| 4,896,287 | CORDIC COMPLEX MULTIPLIER | Matthew O'Donnell William E. Engeler |
| 4,975,885 | DIGITAL INPUT STAGE FOR AN ULTRASOUND APPARATUS | Dietrich Hassler Erhard Schmidt Peter Wegener |
| 4,983,970 | METHOD AND APPARATUS FOR DIGITAL PHASED ARRAY IMAGING | Matthew O'Donnell William E. Engeler John J. Bloomer John T. Pedicone |
| 5,005,419 | METHOD AND APPARATUS FOR COHERENT IMAGING SYSTEM | Matthew O'Donnell Kenneth B. Welles, II Carl R. Crawford Norbert J. Plec Steven G. Karr |
| 5,111,695 | DYNAMIC PHASE FOCUS FOR COHERENT IMAGING BEAM | William E. Engeler Matthew O'Donnell John T. Pedicone |
| 5,142,649 | FORMATION ULTRASONIC IMAGING SYSTEM WITH MULTIPLE, DYNAMIC FOCUSED TRANSMIT BEAMS | John J. Bloomer Matthew O'Donnell |
| 5,235,982 | DYNAMIC TRANSMIT FOCUSING OF A STEERED ULTRASONIC BEAM | Matthew O'Donnell |

The concept of a digital transmit beamformer system has not been explicitly cited in the art.

D. Dual-Receive Beamformer Systems

The current state of hardware technology does not permit a single programmable beamformer apparatus to be optimally configured for all ultrasound applications. By way of example, an ultrasound receive beamformer apparatus optimized for gray-scale imaging requires superior spatial resolution and moderate signal dynamic range, whereas an ultrasound receive beamformer apparatus optimized for Doppler velocity measurements requires a superior (very wide) signal dynamic range and moderate spatial resolution. It has been suggested (see pp. 69–72 of L. Hatle and B. Angelsen, *Doppler Ultrasound in Cardiology,* 2nd Ed., Lea & Febiger, publisher, 1985) that separate imaging and Doppler beamformers are therefore needed to achieve optimal performance. Prior art has not considered beamformer systems consisting of combinations of two or more receive beamformers sharing a common front end, with each beamformer using hardware apparatus optimized for its particular application.

E. Present Invention

The art above demonstrates beamformer controls for use in controlling a single transmit beamformer system and/or a single receive beamformer system. However, as a presently contemplated novel combination of a digital transmit beamformer system, an imaging digital receive beamformer system and a Doppler receive beamformer system have not been available in the past, such prior art beamformer controls do not teach or demonstrate the ability for simultaneously and dynamically controlling and generating the focusing parameters of such a combination system in such a manner for optimal performance.

SUMMARY OF THE INVENTION

A. Coordination of Control for Transmit and Receive Beamformer Systems

As a first object and advantage, the present invention provides a central or primary beamformer control method and apparatus which effectively coordinates the operations of a digital transmit beamformer system, a digital receive beamformer system, and a Doppler receive beamformer system. Such coordinated operations preferably use for advantageous implementation common beamformation parameter data sets which are provided by the beamformer control system, although such common data sets are not a requirement. Accordingly, another object and advantage of the present invention is its ability to support both transmit and receive beamformation simultaneously, exploiting common parameters in data sets for both transmit and receive functions.

The present invention takes significant advantage of the fact that the beamformer parameter data sets are programmable into the signal processing operations of the transmit beamformer and both receive beamformer systems.

Further, a digital transmit beamformer system and a digital receive beamformer system can, in a preferred embodiment, perform interrelated signal processing functions. The beamformer control of the present invention can effectively coordinate these interrelated signal processing functions in order to provide optimal image quality. Still further, while this control system uses common parameter data sets, the parameter values programmed into the transmit and receive beamformer systems can be different, allowing the transmit and receive beamformer systems to operate independently, but with interrelated signal processing functions.

A further advantage of the present invention is that the beamformer central control system stores sparsely sampled base parameter data sets. The central or primary control in coordination with each local or secondary control optimally expands the parameter data sets in order to provide dynamic, real-time focusing parameters. Focusing provides the appropriate delay, phase, and apodization to a beamformer apparatus which then uses these parameters to form a focused beam.

Another advantage of the present invention is the ability to support arbitrary scan formats including arbitrary number of scan lines, arbitrary scan line origins, arbitrary scan line angles, arbitrary frequency control and arbitrary signal shaping. This is due to the fact that the base parameter data sets are independent of these scan conditions. The expansion algorithms modify the base parameter sets for the scan conditions.

A further object and advantage of the present invention is the ability to provide for phase-aligned coherent scan lines in the digital receive beamformer system, such that at any point in the system full information about the beam is maintained, enhancing the ability of the system to provide an image.

Still a further advantage is optimized gain control parameter data sets communicated to a post-beamformation processor of the digital receive beamformation system in order to, for example, manage gain as a function of angle steered.

A still further object and advantage of the present invention is the ability of the control to coordinate and incorporate adaptive focusing operations, adaptive beamformation operations and adaptive signal operations.

Another object and advantage of the present invention is the ability for the control system to coordinate and incorporate calibration techniques in the transmit and receive beamformation systems.

B. Distributed Control System: Central Control and Local Controls

As an object and advantage of the present invention, the beamformer control system is distributed between a primary or central control, with primary delay and apodization processors, and a plurality of secondary or local controls, with secondary delay, phase, and apodization processors. Preferably there is a separate secondary control associated with each signal path of (1) the digital transmit beamformer system, (2) the digital receive beamformer system, and (3) the Doppler receive beamformer system.

Such a control system provides for dynamic beam focusing capabilities for three beamformer systems that is not available in the prior art. In the present control system, the primary central control preferably stores sparsely sampled sets of base delay and apodization profiles (a profile is a set of delay or apodization values as a function of all elements in the aperture and one or more other variables, such as azimuth or range) associated with system parameters such as scan format, processing modes and the like. The processing modes include advantageous combinations of variables including the number of beams $N_B$, nominal center frequency $F_O$ for transmit or receive, and the normalized spatial range resolution $\gamma_B/\lambda_O$ (receive) (inversely related to signal bandwidth) or normalized initial waveform sampling rate $\gamma_E/\lambda_O$ (transmit). The primary control operates on the sparsely sampled set of delay and apodization profiles with interpolation and/or extrapolation methods and apparatus in order to partially expand the data set at the primary control. In addition, the primary control can store pre-calculated interpolation and/or extrapolation coefficients used to expand the sparse data sets.

A partially expanded beamformation parameter data set, final expansion coefficients, and other imaging parameters are then communicated to each secondary or local control which may include secondary delay processors, secondary phase and frequency processors, and secondary apodization processors. In a preferred embodiment, such individual processors, associated with each beamformer local control, enable dynamic focused beamforming. The secondary control processors receive the partially expanded delay and apodization values and the related interpolation and/or extrapolation coefficients from the primary control. The secondary control then proceeds on a real-time basis to further expand the partially expanded delay and apodization values using either (1) interpolation and/or extrapolation techniques with coefficients provided either by (a) the primary control or (b) internally computed by the secondary control, or (2) other numerical techniques in order to generate local per-sample delay and apodization values as appropriate. Such a system has a distinct advantage in that the need for large memory capacity, both at the primary control and/or at the secondary control, is greatly reduced. Further, there is a reduced need for a wide, high data rate bus for communication between the primary control and the secondary control.

C. Dynamic Focusing: Real-Time Delay and Apodization Value Generation

As another object and advantage of the method and apparatus, the present control system provides for dynamic focus in the form of dynamic delay and dynamic apodization value generation. Preferably a central focus control initiates these tasks using a separate delay processor and a separate apodization processor. Such dynamic focusing is utilized by the digital transmit beamformer system, the digital receive beamformer system and the Doppler receive beamformer system. The same focus processor hardware can expand data sets for all three beamformation systems.

The present invention provides for continuous and smoothly varying delay and apodization profiles across the aperture and in range. The focus control of the primary control can operate on and expand such base delay and apodization reference delay and apodizations profiles at a number of reference ranges, in accordance with parameters such as scan line origin, scan line angle, and focal range. With respect to the reference range profiles sent to the receive beamformer system, in a preferred embodiment, range interpolation and/or extrapolation, for final per-sample delay and apodization values, is performed entirely by the secondary control as receive beamformation is dynamically focused along each scan line. Thus, unique delay and apodization values can be dynamically calculated for each receive beam data sample. For a transmit beamformer system, in a preferred embodiment, portions of the range interpolation and/or extrapolation for at least delay values is preferably partitioned between the primary control and the secondary control in order to reduce the computational requirements of local control as focusing occurs at one or relatively few transmit focal points. For a Doppler receive beamformer system the delay values and range gate duration values are computed by the central control.

Accordingly, sparsely sampled delay and apodization data sets organized by origin, azimuth, and range are expanded in real-time by a central control processor by adjusting each channel for desired origin, azimuth, range by a sequence of interpolation operations in origin, azimuth, and range. The final range interpolation operation is carried out by the local processors. The delay and apodization reference range profiles are selected so that each channel uses a reference range profile, which keeps the update rates to individual channels to a low bandwidth. The final delay interpolation for range is a single interpolation for each focal point in a scan line in the case of the digital transmit beamformer and for each range gate for the Doppler receive beamformer, and is continuously updated in the digital receive beamformer due to dynamic focusing with range. The invention uses an expansion method such that a single broadcast interpolation coefficient can be used in common for all digital receive channels.

Another object and advantage of the present invention is the ability of the primary and secondary control to operate both the transmit and receive beamformation systems to form multiple simultaneous beams by specifying delay, phase, and apodization values per sample for each beam along with other parameters for each beam. Accordingly, the central and local controls allow the transmit and receive beamformation systems to operate independently as such controls can specify the same or different delay, phase, and apodization values, corresponding to different processing modes (including different number of beams), to each of the transmit and receive beamformation systems.

As a further object and advantage, the control system can program interpolation and/or extrapolation coefficients, decimation factors, and filter characteristics specified by, for example, filter coefficients and filter lengths, to the transmit and receive beamformer systems in order to selectively process the signal path samples. Programmability means that the filter coefficients may be permanently stored in the filters with, for example, the central control selecting among such stored values, or these values can be downloaded from, for example, central control. Thus, as used herein, a device or function which is programmable includes those which can be programmed either (1) by providing as required a set of specific values (downloaded from, for example, a central control) for use by the device or function, or (2) by selecting such values from a pre-determined set of available values which are pre-stored by the device or function. Similarly, the acts of programming carry the same meanings.

In addition to coordinating delay, phase and apodization processing on a channel-by-channel basis, both for transmit and receive processors, the present invention affords the ability to control the digital receive beamformer system and particularly the phase alignment and spectral content of beams formed thereby from summing the individual channels. Such control is afforded through the communication of a parameter data set to a baseband processor control.

D. System Architecture: Maximum Computational Capacity Utilization

Another object and advantage of the present invention is that the control system can effectively control the computational efficiency of the digital transmit and receive beamformer systems by programming the processing modes which make computational trade-offs among (1) the number of beams $N_B$ per transmit or receive system, (2) the nominal center frequency $F_0$ for transmit or receive, and (3) the normalized spatial range resolution $\gamma_B/\lambda_O$ (receive) (inversely related to signal bandwidth) or normalized initial waveform sampling rate $\gamma_E/\lambda_O$ (transmit), and other parameters required for each beamforming situation. These processing modes are programmed by the control system based on, for example, the type of transducer and the scan format selected by the user.

Expanding on this concept, through the processing modes, the present invention affords the beamformer control system the ability to program the number of beams generated by the digital transmit beamformer system and the number of beams received by the digital receive beamformer system. Specification of the number of beams for each digital transmit and receive system is independent and the number of beams can be either the same, or different.

Further, with respect to specification of the imaging carrier frequency $F_c$ for transmit or receive, the control system can vernier carrier frequency around the nominal center frequency on a scan-line-by-scan-line basis during single beam or multiple beam operations for transmit and receive beamformation independently. From a given nominal center frequency $F_0$ and using a vernier operation, for example, in the transmit beamformer system, carrier frequencies of zero to $2F_0$ can be specified in a preferred embodiment. Additionally, such arrangements allow the beamformer system to adjust imaging frequencies in order to, for example, mitigate grating lobes. (See co-pending U.S. patent application entitled: METHOD AND APPARATUS FOR ADJUSTABLE FREQUENCY SCANNING IN ULTRASOUND IMAGING). Additionally, through tracking frequency downshifting due to attenuation on receive, an improved signal-to-noise ratio can be accomplished. Such versatility would not be possible with prior art systems.

E. Beamformation Control System With Adaptive Adjustments

A further enhancement to the present control system can include adaptive focusing based on measurements received by an adaptive focusing control from, for example, partial sums produced by the digital receive processors. Adjustments in the focusing parameters can be accomplished by an adaptive focusing beamformer control which is the subject of the copending U.S. patent application entitled: METHOD AND APPARATUS FOR REAL TIME, CONCURRENT ADAPTIVE FOCUSING IN AN ULTRASOUND BEAMFORMER IMAGING SYSTEM.

Other aspects and objects of the invention can be obtained by reviewing the specification, the claims and the figures.

BRIEF DESCRIPTION OF THE FIGURES

FIGS. 1a and 1b conceptually depict the transmission and reception of ultrasound beams to and from body tissue.

FIG. 2a depicts a high level block diagram schematic of a novel ultrasound beamformer system of an ultrasound medical imaging system including an embodiment of a beamformer central control of the invention.

FIGS. 2b and 2c taken together depict an enlarged and more detailed version of FIG. 2a. FIG. 2c depicts the processing components of the beamformer central control system.

FIG. 5c depicts the apodization magnitude profile versus element number at 9 non-equi-spaced reference ranges for a base Hamming apodization.

FIG. 5d depicts a schematical block diagram for apodization magnitude profile generation of this invention.

FIGS. 13a, 13b and 13c depict graphs of typical signal frequency profiles that are applied for signal demodulation and fine phase adjustment in the complex multiplier and for signal remodulation in the phase aligner. FIGS. 13d, 13e and 13f depict graphs of signal frequency profiles appropriate for signal demodulation.

DETAILED DESCRIPTION OF THE PREFERRED EMBODIMENT

Figure 2C:
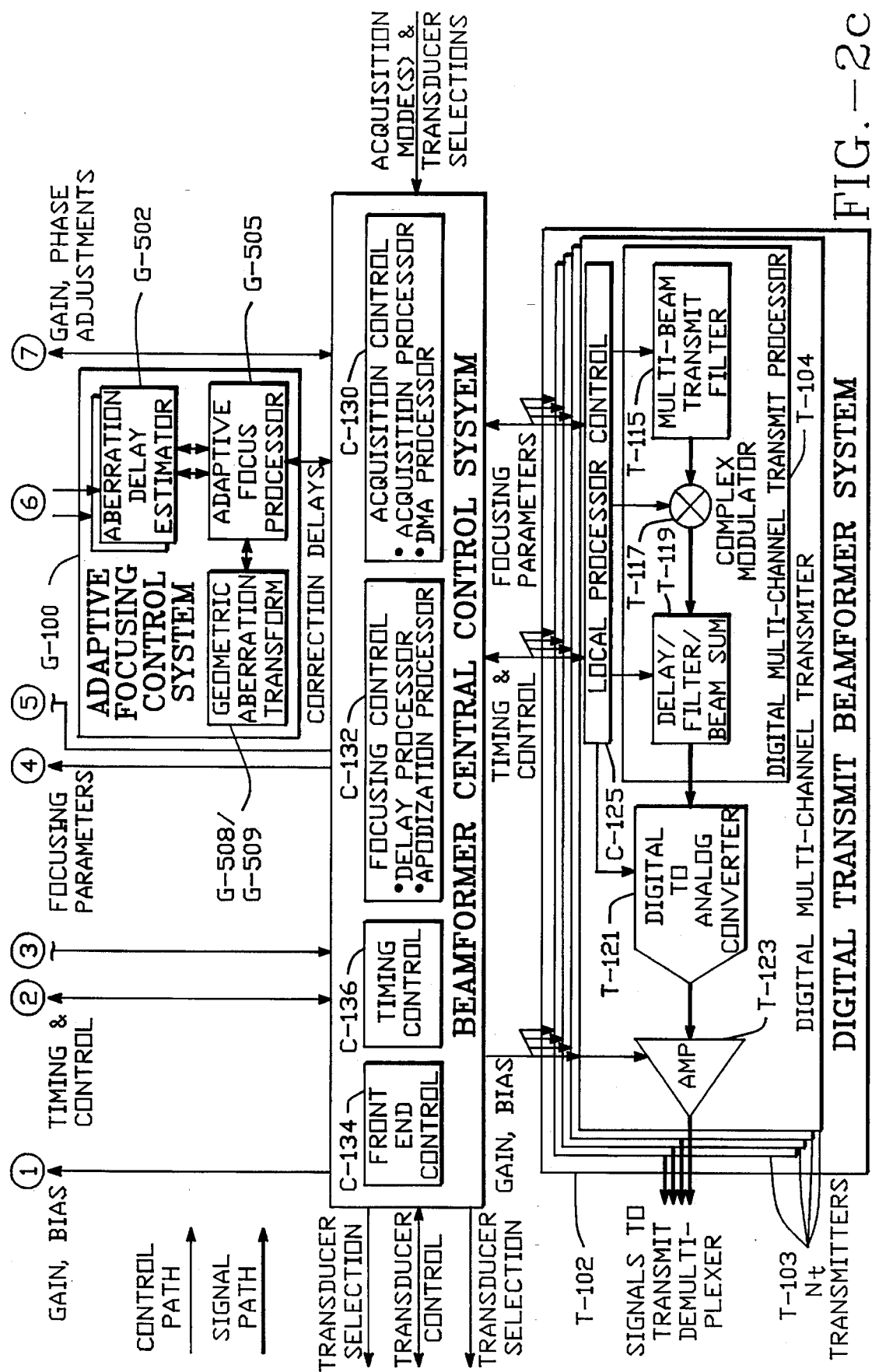

The present invention represents a component of a medical ultrasound imaging system for which additional patent applications, listed above, have been simultaneously filed in the United States Patent and Trademark Office.

A. Definitions

Scan Line L is a straight line in space uniquely defined by its Line Origin Offset $O_L$ and Steering Angle $\theta_L$.

Line Origin Offset $O_L$ is the distance of the line origin from the center of the transducer array typically in units of element spacing.

Steering Angle $\theta_L$ is the angle between the transducer array normal at the line origin and the scan line L in units of degrees, which by convention is positive for angles counter-clockwise from the array normal. The steering angle may be a single azimuth angle for 2-D scans, or azimuth and elevation angles for 3-D scans.

Point in scan space can be uniquely specified by a scan line L and a range R (distance from the line origin), designated simply as (R,L). Note that a point originating from the center of the transducer array ($O_L$=0) is equivalently expressed in polar coordinates by (R,$\theta_L$).

Time Delay for the i-th element of a transducer array focused at a point (R,L) is defined here as the time differential $$\tau(i,R,L)=[d(i,R,L)-R]/c \qquad (1)$$

where d(i,R,L) is the distance from element i to the focal point and c is the speed of sound. Note that the time delay is typically expressed in units of the period $T_0$ of the signal nominal center frequency $F_0$ (transmit or receive).

Profile is a function formed from related beamformation parameter values indexed by one or more variables (such as element position).

Time Delay Profile is a smooth function of three variables: focal range, steering angle, and element position relative to the line origin.

Reference Range Time Delay Profile is a function of the time delays $\tau(i,R,L)$ for element i over the active aperture at reference range R and reference scan line L (which has reference origin $O_L$ and reference steering angle $\theta_L$).

Apodization a(i,R,L) is the relative aperture gain of the i-th array element for a transmit beam focused at (R,L). When expressed as a function of i, R, and L, it is termed an apodization profile.

Base Apodization Templates B(i) are sampled ideal (uncorrected for range-dependency or angle-dependency) normalized apodization shapes (half-circle, Hamming, uniform, etc.) used to generate actual apodization profiles of desired widths and origins. A symmetric apodization need only be stored with samples over half the apodization shape.

B. Overview of the Preferred Beamformer System Architecture

1. Ultrasound Signal Description

With respect to the present invention, ultrasound imaging is accomplished by firing (transmitting) into body tissue or other objects to be imaged a scan sequence of focused ultrasonic beams centered along straight lines in space called transmit scan lines (FIG. 1a). The transmit scan lines are generated by a transmit beamformer and an ultrasound transducer array. The transmit scan lines are spaced to produce a planar linear, planar sector or other display of the tissue via a pre-defined firing or scanning pattern. Focused to some defined depth in the tissue, the ultrasonic transmit continuous-wave (CW) or pulse-wave (PW) signal, propagating at an assumed constant propagation velocity of nominally c=1540 m/sec through the tissue, interacts with the tissue and reflects a small portion of the signal back to the ultrasound transducer array that initiated the ultrasound signal. The round trip delay time is shortest for those targets closest to the ultrasound transducer array, and longest for those targets farthest from the transducer array. With the application of appropriate time delays, the receive beamformer (FIG. 1b) can dynamically focus receive beams along straight lines in space called receive scan lines commencing, for example, with the shallowest range (depth) of interest and evolving toward the deepest range of interest.

FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-66 corresponding to a dynamically focused first receive beam and a dynamically focused second receive beam, respectively. The beams are sampled in range at a plurality of focal depths ($r_1, r_2, r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle θ) and the focus depth or range (r). The ultrasound imaging system of the present invention stores a pre-computed sparse data set of focusing time delay and aperture apodization values indexed by these parameters (based on geometric considerations as is known in the art) and expands the values by real-time computational means to control the transmit and receive beamformation systems that produce the desired scan lines.

2. Beamformer System

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40.

In FIGS. 2a, 2b, or 2c, the beamformer system R-22 includes inventive and novel (1) digital transmit beamformer system T-102, (2) digital receive beamformer system R-100, (3) beamformer central control system C-104, (4) adaptive focusing control system G-100, (5) Doppler receive beamformer system A-400, (6) baseband multi-beam processor R-125, and (7) coherent sample synthesizer S-100. These systems are depicted as high level, functional block diagrams. The blocks are abstracted from the actual implementation of a preferred embodiment in order to better illustrate the signal processing functions performed.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1) brightness image and motion processor R-30 for B-mode (gray-scale imaging) and M-mode (motion display), (2) color Doppler image processor R-32 for flow imaging, and (3) spectral Doppler processor R-34 for wide dynamic nonimaging Doppler velocity vs. time displays. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

As used herein, the term ultrasonic refers to frequencies above the range of human hearing. However, the transducer arrays T-112 are optimized for frequencies typically within the range of 2–10 MHz.

The transducer array T-112 is interchangeable with a variety of different kinds of transducer arrays, including but not limited to linear, curved, curvilinear and annular transducer arrays. A variety of transducer array shapes and frequencies are desirable in order to satisfy the requirements of a variety of different clinical settings. However, the transducer arrays T-112 are typically optimized for frequencies within the above specified range of 2–10 MHz. The medical ultrasound system R-20 performs the three major functions of driving the ultrasonic transducer array of elements T-114 to transmit focused ultrasound energy, receiving and focusing back-scattered ultrasound energy impinging on the transducer array T-114, and controlling the transmit and receive functions to scan a field of view in scan formats including (but not limited to) linear, sector or Vector® format.

In FIGS. 2a, 2b, 2c, the control signals are communicated over the light lead lines while the signal paths are depicted with heavy lead lines.

3. Digital Transmit Beamformer System

The digital transmit beamformer T-102 (FIG. 2c) is the subject of the above cited co-pending application entitled: METHOD AND APPARATUS FOR TRANSMIT BEAMFORMER SYSTEM. It is to be understood that in a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C-104.

4. Digital Receive Beamformer System

The digital receive beamformer R-100 (FIG. 2b) is the subject of the above-identified application entitled: METHOD AND APPARATUS FOR RECEIVE BEAMFORMER SYSTEM which has been incorporated herein by reference.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together with summer R-126 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the high level function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The digital multi-channel receivers R-101 communicate with summer R-126 where the signal samples associated with each beam from each receive processor are summed to form final receive scan line samples, and the resulting complex samples provided to baseband processor R-125. The exact functioning and composition of each of these blocks will be more fully described hereinbelow with respect to the remaining figures.

A local or secondary control C-210 is associated with each digital multi-channel receiver R-101. Local processor control C-210 is controlled by central or primary control C-104 and provides timing, control and parameter values to each said receiver R-101. The parameter values include focusing time delay profiles and apodization profiles.

5. Doppler Receive Beamformer System

The Doppler receive beamformer system A-400 for wide dynamic range, nonimaging Doppler acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, the analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of the above identified co-pending patent application entitled: METHOD AND APPARATUS FOR DOPPLER RECEIVE BEAMFORMER SYSTEM which has been incorporated herein by reference.

Associated with all Doppler receivers A-402 is a single local or secondary Doppler beamformer control C-127. Doppler beamformer control C-127 is controlled by central or primary control system C-104 and provides control and focusing parameter values to the Doppler receive beamformer system A-400.

As pointed out in the above patent application describing the Doppler receive beamformer system A-400, the present beamformer system R-22 advantageously combines an imaging digital receive beamformation system R-100 and a nonimaging Doppler receive beamformation system A-400 in a manner which uses the same digital transmit beamformation system T-102 and the same transducer array and allows the digital receive beamformation system R-100 to be optimized for imaging modes such as B-mode and color Doppler imaging, and therefore has high spatial resolution, while the accompanying Doppler receive beamformation system has a wide dynamic range and is optimized for use in acquiring signals for nonimaging Doppler processing.

6. Beamformer Central Control System

The beamformer central control system C-104 of the present invention controls the operation of the digital transmit beamformer system T-102, the digital receive beamformer system R-100, the Doppler receive beamformer system A-400, the adaptive focusing control system G-100, and the baseband processor R-125. The beamformer control is the subject of the present application.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-108, interfaces with the transducer connectors T-110, and sets the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated as a profile of values across the transducer aperture to the local processor controls, where the delay and apodization data expansion in range is completed to per-transducer-element, per-sample, per-beam values.

7. Adaptive Focusing Control System

Adaptive focusing control system G-100 provides for real time concurrent adaptive focusing. Adaptive focusing control system G-100 is comprised of an adaptive focus processor G-505 which provides focus correction delay values to the focus control C-132 of the central control C-104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described in the above identified co-pending patent application entitled: METHOD AND APPARATUS FOR REAL TIME, CONCURRENT ADAPTIVE FOCUSING IN AN ULTRASOUND BEAMFORMER IMAGING SYSTEM.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in G-508/509. G-508/509 retrieves values from the delay table according to look-up rules of the geometric aberration transform to form focusing delay correction profiles across the aperture valid for depths, scan geometries, and acquisition modes other than the depth, scan geometry, and mode for which aberration correction values were measured. The geometric aberration transform device G-508/509 is the subject of the above identified co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

8. Baseband Processor System

The baseband processor R-125 provides for filtering, and receive-scan-line-to-receive-scan-line (beam-to-beam) amplitude and phase adjustments as discussed herein and in the above-referenced and incorporated patent applications entitled: METHOD AND APPARATUS FOR BASEBAND PROCESSOR OF A RECEIVE BEAMFORMER SYSTEM and METHOD AND APPARATUS FOR ADJUSTABLE FREQUENCY SCANNING IN ULTRASOUND IMAGING, and the above-referenced patent application entitled METHOD AND APPARATUS FOR COHERENT IMAGE FORMATION.

The baseband processor R-125 additionally includes a baseband filter, a complex multiplier, and a baseband processor control which controls the operation of the baseband filter and complex multiplier. The baseband processor control is controlled by central control C-104.

9. Coherent Sample Synthesizer System

The coherent sample synthesizer system S-100 (FIG. 2a) is the subject of the above-identified application entitled: METHOD AND APPARATUS FOR COHERENT IMAGE FORMATION.

This system exploits the multi-beam transmit and multi-beam receive capability of the invention to acquire and store coherent (pre-detection) samples of receive beam data along actual scan lines and to perform interpolation of the stored coherent samples to synthesize new coherent samples at new range locations along existing scan lines or along synthetically-created scan lines. Both acquired and synthesized samples are passed to the display processing system R-26.

10. Transmit and Receive Multiplexers

The connectivity between the transducer array elements T-114 and the processors T-103, R-101, A-402 of the digital transmit, digital receive, and Doppler receive beamformer systems is established through a transmit demultiplexer T-106 and a separate receive multiplexer R-108, as shown in FIG. 2a. The multiple-transducer multiplexer configuration shown in FIG. 2a permits selection of transmit and receive apertures lying entirely within a single transducer array or straddling across two transducer arrays. The two multiplexers are independently controlled by the beamformer central control system C-104 and may be programmed to support a number of acquisition modes, including sliding aperture and synthetic aperture modes. The multiplexers and their connectivity are the subject of the above-cited co-pending application entitled: METHOD AND APPARATUS FOR BEAMFORMER SYSTEM WITH VARIABLE APERTURE.

C. Beamformer Control Method

This section describes the algorithms used to expand scan geometry-independent, sparsely sampled delay and apodization-related reference profiles, that are typically functions of range, steering angle, and array element position, in order to generate ultimate scan geometry-dependent time delay profiles and apodization profiles applicable to each transmit beamformer focal point, each Doppler receive beamformer focal point, and each focal point in range (depth) along an imaging receive beamformer scan line. The transmit and receive algorithms are essentially identical, except where noted, and may use separate or shared common reference profiles when generating the ultimate delay and apodization profiles.

The sparsely sampled base delay data consists of Reference Delay Profiles (in units of $T_0$, the period of the nominal center frequency) which are pre-computed relative to the center of the array which has a focusing time delay of zero; delays for other elements use the convention that time delay is a negative value and time advance is a positive value. Delay profiles represent values for a number of beams that originate from the center of the array, steered at the Delay Reference Angles and focused at the Delay Reference Ranges.

Figure 3A:
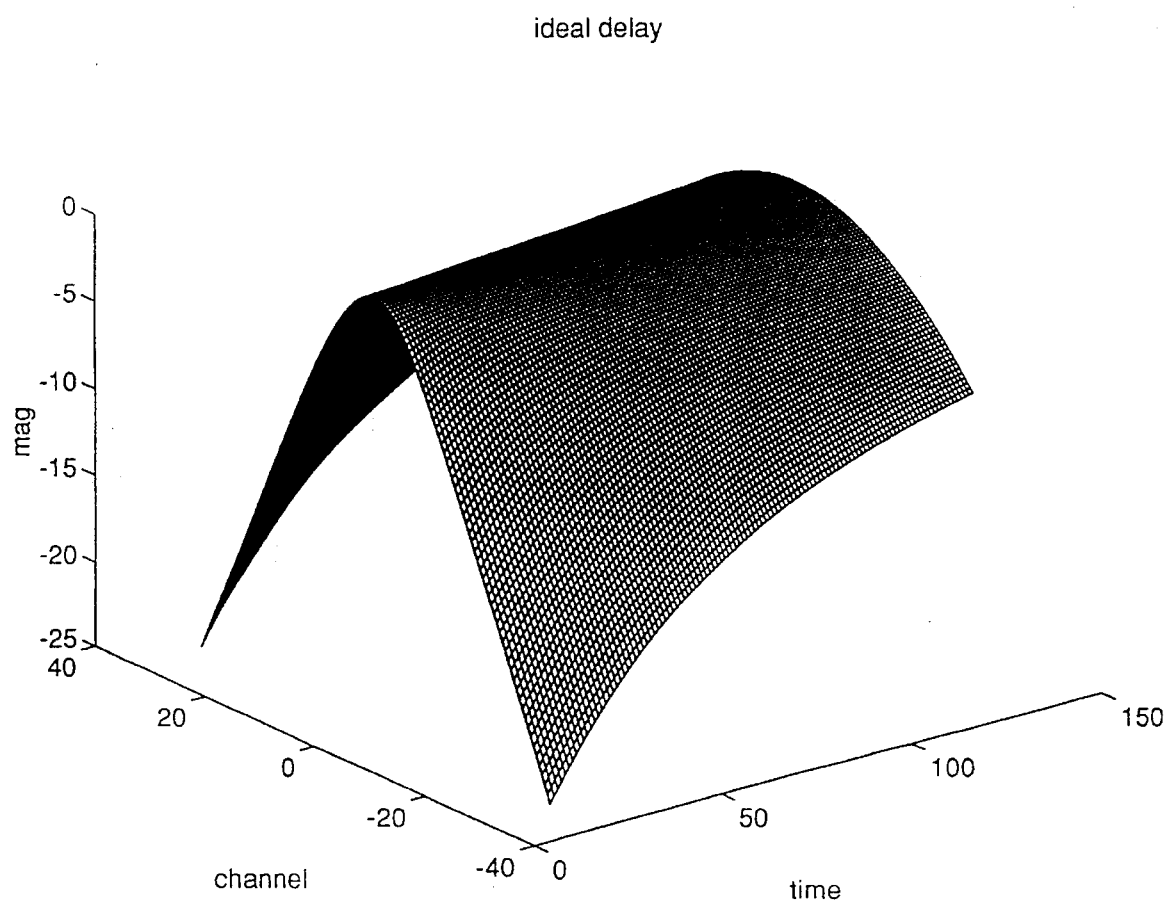
FIG. 3a depicts an ideal focus time delay profile versus element number and range for a beam steered to 0° azimuth using a 64-element linear array.

A delay profile is typically a smooth function of three variables (focal range, steering angle, and element position), such as that depicted in FIG. 3a, which means delay profiles for arbitrary focal points can be constructed accurately by interpolation from a set of sparsely sampled ideal delay profiles, called Reference Delay Profiles, which can be pre-computed and stored on disk or computed in real time by the system processing resources. The sampling grid is called the Reference Focal Points (indexed by Delay Reference Ranges and Delay Reference Angles) and is sampled at integer element positions. The Delay Reference Angles preferably include both 0 degrees and at least the maximum steering angle anticipated. By interpolating, preferably linearly, in angle and range between Reference Delay Profiles and translating the delay profile (interpolating between elements if necessary), it is possible to form a complete delay profile at the desired focal point(s).

Figure 3B:
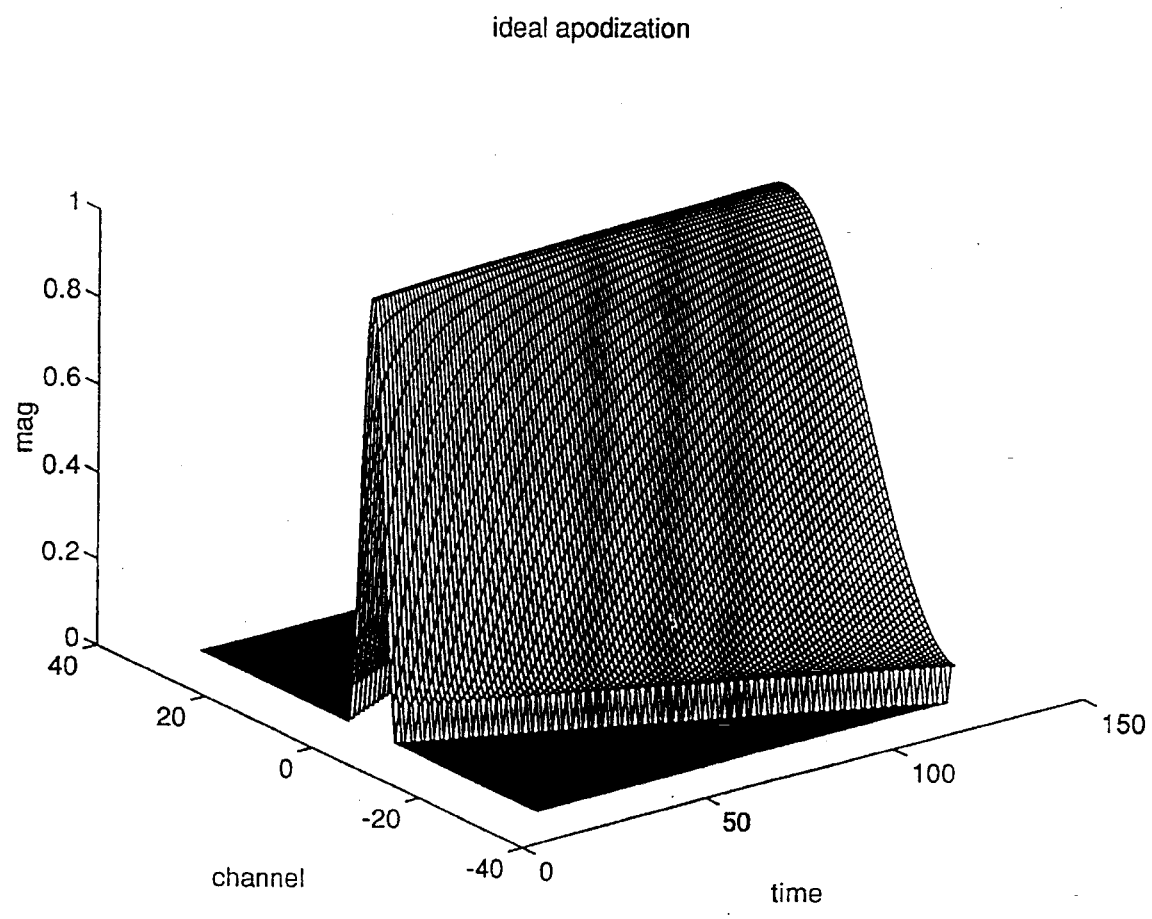
FIG. 3b depicts an ideal apodization magnitude profile versus element number and range for a Hamming apodization with constant F-number of 2.

The sparsely sampled apodization-related profiles consist of Apodization Width profile, Apodization Original Reference profile, Base Apodization Templates, and Correction Profiles. FIG. 3b illustrates an ultimate ideal apodization profile to be approximated by interpolative means from the four apodization-related profiles with this invention. Apodization Width and Origin profiles are specified on a sampling grid defined by a number of scan lines (Reference Lines) and a number of ranges (Reference Ranges). Correction Profiles, on the other hand, are specified on a grid defined by a number of steering angles (Reference Angles) and ranges (the same as the Reference Ranges for the Apodization Width and Apodization Origin profiles). Correction Profiles are also sparsely sampled functions of the array elements. To form apodization profiles for scan lines other than the Reference Lines and ranges other than the Reference Ranges, interpolation, preferably linear, between the Apodization Width and Origin profiles and Correction and Base Apodization profiles is performed.

1. Delay Profile Generation

Transmit and imaging receive delay profiles are formed jointly by the central control system and the imaging receiver and transmitter local processor controls. Doppler receive delay profiles are preferably formed entirely by the central control system due to the hardware simplicity of the Doppler receive beamformer relative to the imaging receive and transmit beamformers. For each scan line, at each Reference Range, the central control generates a Delay Profile by a process of interpolation and shifting. Reference Delay Profiles samples at Delay Reference Angles are interpolated across angle to form the delay profile for a beam steered at the desired angle and originating at the center of the transducer. This delay profile is then translated across the aperture to the desired Nominal Line Origin to form the appropriate ideal delay profile. This ideal profile is then optionally corrected by the Aberration Delay Correction Profile for the effects of tissue aberrations, and then adding an optional fixed offset delay to all channels. This resultant profile is transferred to the receiver local processor controls, which then linearly interpolate between Reference Ranges using the Range Interpolation Coefficients supplied by the central control to find a unique delay profile for each sampling range and to provide a smooth and continuous progression from one delay profile to the next, and applies the delay (using both an actual delay and a phase rotation) to the received ultrasound signals. The transmit Range Interpolation Coefficient is, in contrast to the receive process, applied by the central control before passing to the local control for final addition. This scheme is used for B, F, and M imaging modes as well as multiple beam, synthetic scan line, and synthetic aperture modes (see co-pending U.S. patent application entitled: METHOD AND APPARATUS FOR COHERENT IMAGE FORMATION). Calculation of synthetic aperture delays cause variation from the basic calculation only in the placement of the Reference Delay Profiles across the face of the transducer. The central control system generates delay profiles independently for each beam and each Reference Range.

Figure 4:
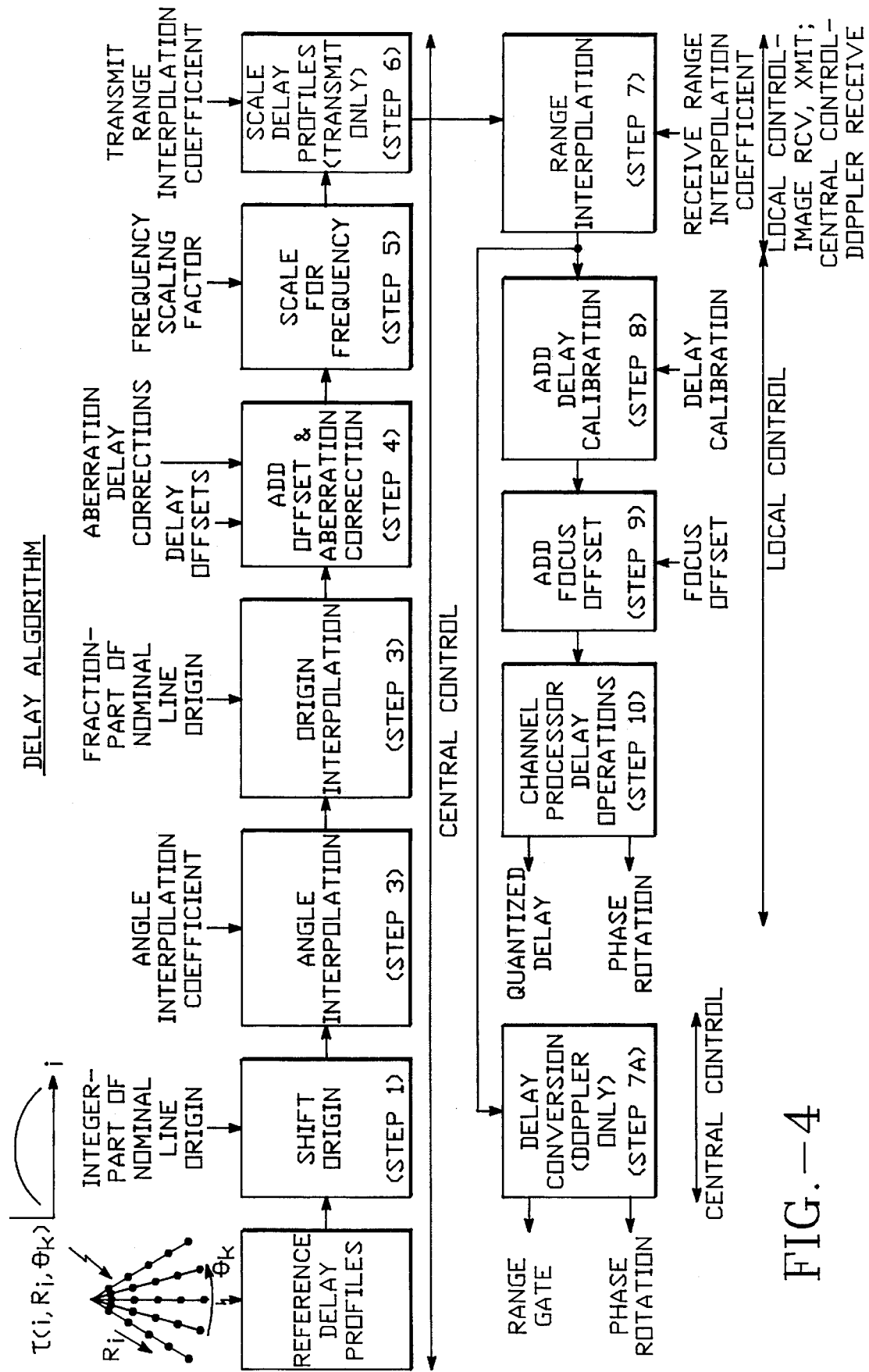
FIG. 4 depicts a schematic block diagram for focusing delay profile generation applicable to both transmit and receive beamformation systems.

Refer to FIG. 4 for a schematical block diagram demonstrating the generation of the delay profile generation algorithm.

a. Central Control System Delay Profile Generation

Figure 5A:
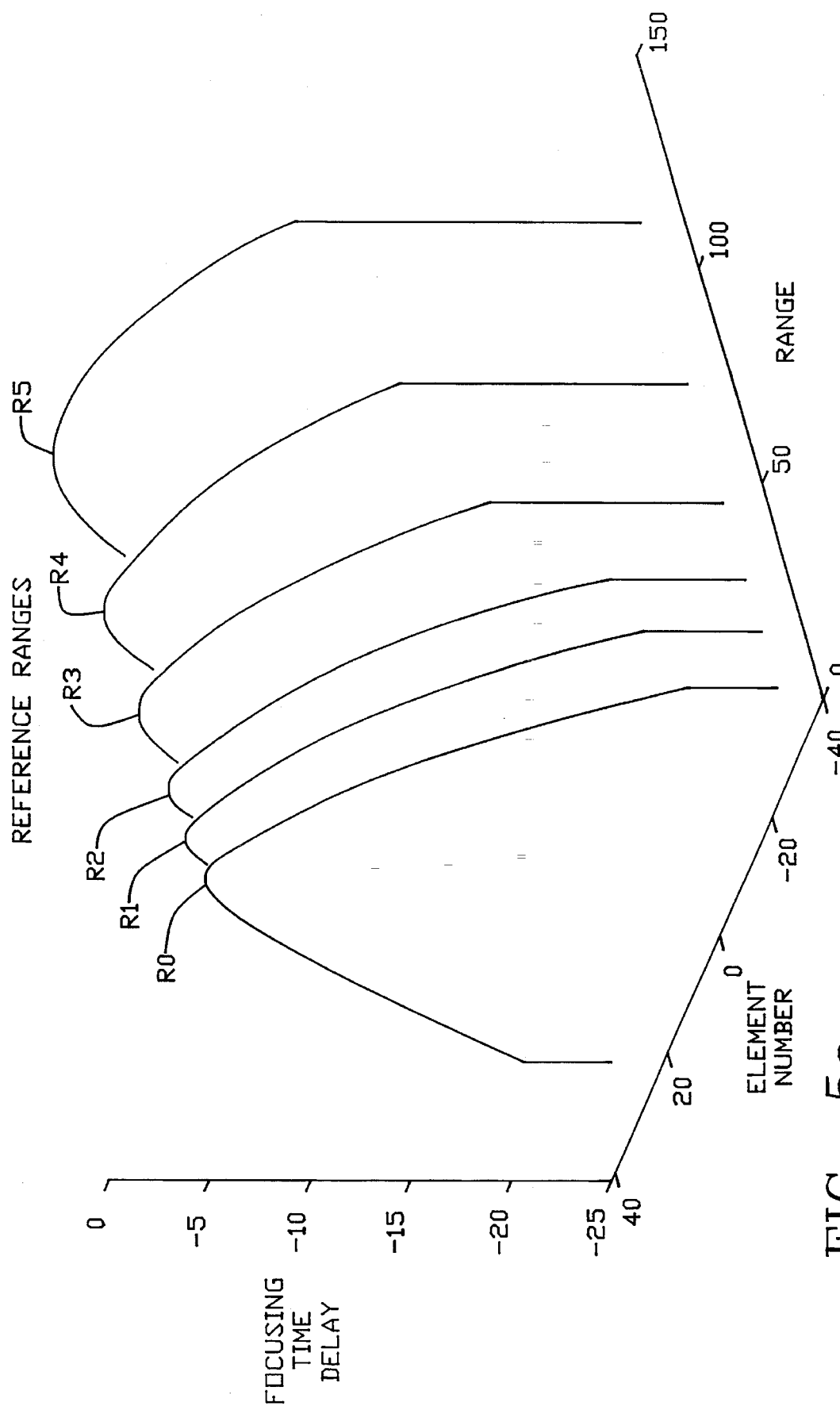
FIG. 5a depicts the focus time delay profile versus element number at 6 non-equi-spaced reference ranges $R_0$ to $R_5$.

Assume that a delay profile for a transmit or receive beam focused at location (R,L) is to be generated, and R falls on or between Delay Reference Ranges $R_j$ and $R_{j+1}$, and angle $\theta_L$ of scan line L falls on or between Delay Reference Angles $\theta_k$ and $\theta_{k+1}$. The central control system performs the following six processing steps for each reference range and each beam (in multiple beam modes):

STEP [1]: shift the Reference Delay Profiles over element index i as shown in FIG. 5a $\tau_{ref}(i,R_j,\theta_k)$ and $\tau_{ref}(i,R_{j+1},\theta_k)$ by the integer part of the Line Origin Offset $O_L$.

$$\tau_1(i,R_j,\theta_k) = \tau_{ref}(\text{int }\{\theta_L\}, R_j, \theta_k)$$

$$\tau_1(i,R_j, \theta_{k+1}) = \tau_{ref}(\text{int}\{\theta_L\}, R_j,\theta_{k+1}) \tag{2}$$

STEP [2]: interpolate, preferably linearly, in angle between the shifted Reference Delay Profiles to obtain the delay profile for the intermediate scan line L' defined by (int $\{O_L\}, \theta_L$)

$$\tau_2(i,R_j,L') = \tau_1(i,R_j,\theta_k) + \alpha_{\theta_L}[\tau_1(i,R_j,\theta_{k+1}) - \tau_1(i,R_j,\theta_k)] \tag{3}$$

where $\alpha_{\theta_L}$ is the Angle Interpolation Coefficient for scan line L. If the steering angles are uniformly distributed in sine of the steering angle, then $\alpha_{\theta_L}$ would have the form $$\alpha_{\theta_L} = \frac{[\sin(\theta_L) - \sin(\theta_k)]}{[\sin(\theta_{k+1}) - \sin(\theta_k)]} \tag{4}$$

STEP [3]: shift the origin of the angle-interpolated delay profile by $\alpha_{O_L}$, the fractional part of the Line Origin Offset (or Nominal Line Origin) $O_L$, by preferably linear interpolation between the adjacent elements, to get the delay profile for the desired scan line L $$\tau_3(i,R_j,L) = \tau_2(i+1,R_j,L') + (1-\alpha_{O_L})\tau_2(i,R_j,L') \tag{5}$$

where $\alpha_{O_L}$ and $(1-\alpha_{O_L})$ are the Origin Interpolation Coefficients.

STEP [4]: add a constant Delay Offset $\Delta\tau$ and the aberration delay correction $\Delta\tau_{aber}$ (i,R,L) from the Adaptive Focusing Control System to the origin-shifted delay profile $$\tau_4(i,R_j,L) = \tau_3(i,R_j,L) + \Delta\tau + \Delta\tau_{aber}(i,R_j,L) \tag{6}$$

The adaptive correction is supplied by the adaption processor G-100 which is the subject of the above-referenced patent application entitled: METHOD AND APPARATUS FOR REAL TIME, CONCURRENT ADAPTIVE FOCUSING IN AN ULTRASOUND BEAMFORMER IMAGING SYSTEM.

Delay offsets are delays or advances used to cancel fixed and known analog propagation delays not included in the Reference Delays (note that unknown or element-dependent delays are corrected via calibration), pipeline delays, and filter delays in the transmitter or receiver processing. It also may be used to add (on transmit) or cancel (on receive) multiple beam stagger intentionally introduced during transmit to provide temporal beam separation.

STEP [5]: multiply the delay profile of the previous step by Frequency Scaling Multiplier $\alpha_F$ if the delay profile time unit of the Reference Profile is not the inverse of the nominal center frequency $$\tau_5(i,R_j,L) = \alpha_F \tau_4(i, R_j,L) \tag{7}$$

This scaling makes it possible to use the same set of pre-computed delay profiles for different center frequency operations.

STEP [6] Transmit beamforming only: if the desired transmit range R is not one of the reference ranges, the central control system scales the computed delay profiles for the Reference Ranges $R_j$ and $R_{j+1}$ by the Range Interpolation Coefficient, yielding the two values $\alpha_R\tau_5(i,R_{j+1},L)$ and $(1-\alpha_R)\tau_5(i,R_j,L)$, which are then passed to the transmitter local processor control associated with each channel of each beam. One algorithm for calculating $\alpha_R$ is to assume linearity in 1/R, $$\alpha_R = \frac{\frac{1}{R} - \frac{1}{R_j}}{\frac{1}{R_{j+1}} - \frac{1}{R_j}} \tag{8}$$

The above steps [1] to [6] are repeated for all multiple beam operations of the multi-channel transmitters and receivers.

STEP [7] Doppler receive beamforming only: as with the transmit beamforming delay, the profiles $\alpha_R\tau_5(i,R_{j+1},L)$ and $(1-\alpha_R)\tau_5(i,R_j,L)$ are computed, and then the sum is computed $$\tau(i,R,L) = (1-\alpha_R)\tau_5(i,R_j,L) + \alpha_R\tau_5(i,R_{j+1},L) \tag{9}$$

to complete the range interpolation.

STEP [7A] Doppler receive beamforming—continued: This delay is converted into a range gate enable and fine focus phase rotation. The range gate start and end times are $$\tau_{start} = \text{int}\left[t_{nom} - \frac{[\tau(2i,R,L) + \tau(2i+1,R,L)]}{2}\right] + \frac{T_D}{2} \tag{10}$$

$$\tau_{end} = \tau_{start} + T_D \tag{11}$$

to which $T_D$ is the range gate duration width (user selectable) and $T_{nom}$ is the nominal delay time associated with a Doppler receive focal range that accounts for the propagation time along the scan line to and from the center of the range gate and for any system delays not compensated in the delay profile. Note that the start time is a function of the average of two adjacent element delay profiles. In the preferred embodiment, a common range gate is applied to a pair of active transducer elements. For CW acquisition, the range gate enable is held active for each receive channel during CW transmission. The range gate parameters are communicated to the Doppler local control as a vector of "on" and "off" range gate sample values representative of receive time (corresponding to depth). The residual focusing delay per channel (receiver) is implemented as the phase rotation $$\phi(i) = \text{frac}\,[\tau(i,R,L)] \qquad (12)$$

quantized to ⅛ cycle (45°) intervals of the nominal center frequency.

b. Local Processor Control Delay Profile Generation

The final focusing for each beam is accomplished by the following additional steps performed by the local processor control associated with each transmitter or receiver of the imaging beamformer.

STEP [7]: Transmit beamforming only: complete the linear range interpolation by adding the two scaled delayed profiles from step [6] (transmit beamforming) above to compute the final desired profile as a function of array element i $$\tau(i,R,L) = (1-\alpha_R)\tau_S(i,R_j,L) + \alpha_R \tau_S(i,R_{j+1},L) \qquad (13)$$

STEP [7] Imaging receive beamforming only: The profiles $\alpha_R \tau_S(i,R_{j+1},L)$ and $(1-\alpha_R)\tau_S(i,R_j,L)$ are computed entirely by the imaging receive local controls, and then the sum is computed $$\tau(i,R,L) = (1-\alpha_R)\tau_S(i,R_j,L) + \alpha_R \tau_S(i,R_{j+1},L) \qquad (13)$$

to complete the imaging receive beamformer range interpolation.

Figure 5B:
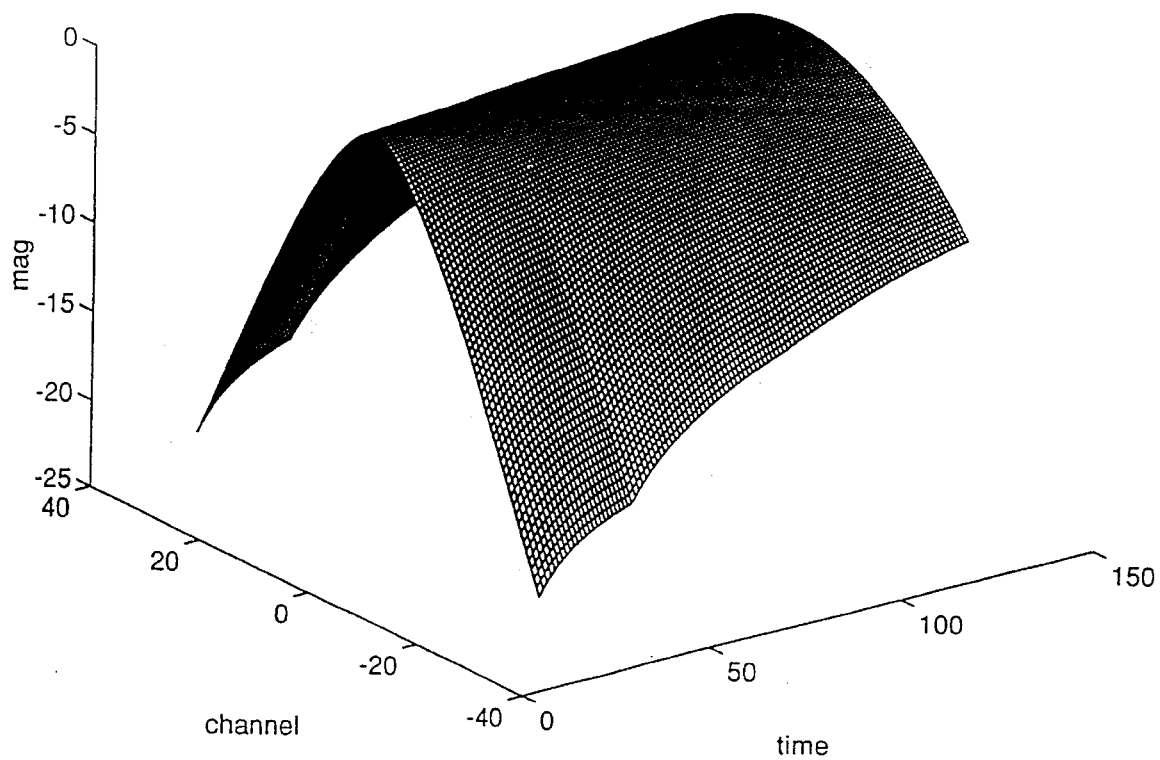
FIG. 5b depicts the focus time delay profile interpolated by the method of this invention.

FIG. 5b illustrates typical interpolated time delay profiles at a number of reference ranges performed by this algorithm.

STEP [8] Transmit and Imaging Receive Beamformer Only: calibrate the desired delay profile $\tau(i,R,L)$ for transmitter or receiver analog path delay differences by subtracting the Delay Calibration Factor $\Delta\tau_{cal}(i)$ $$\tau_{cal}(i,R,L) = \tau(i,R,L) - \Delta\tau_{cal}(i) \qquad (14)$$

STEP [9] Transmit and Imaging Receive Beamformers Only: add an element-dependent and beam-dependent Focusing Offset term $\Delta\tau_{offset}(i)$ to the calibrated delay profile $$\tau_{offset}(i,R,L) = \tau_{cal}(i,R,L) + \Delta\tau_{offset}(i) \qquad (15)$$

which is used (a) to compensate for the effect of pipeline, filter, and envelope processing delays, (b) to customize the delay profile for special focusing requirements such as defocusing in D or F modes, or (c) to stagger multiple transmit beams in order to reduce beam interference, or to unstagger multiple receive beams after transmit staggering.

STEP [10] Transmit and Imaging Receive Beamformers Only: apply the final delay computed in the previous step as: a delay quantized to one-quarter cycle resolution of the nominal center frequency, and the residual delay quantized to ¹⁄₆₄-cycle resolution and approximated by a phase rotation.

2. Apodization Profile Generation

Transmit and imaging receive apodization profiles are formed jointly by the central control processor and the imaging receive and transmit local processor controls. The Doppler receive beamformer preferably uses uniform apodization at a single range focal point and therefore does not require apodization profile generation. Only the aperture size and location is required in order to determine the active elements of the Doppler beamformer, which is simply precomputed and stored without requiring the full apodization apparatus of the central control system, although other Doppler beamformer embodiments that use apodization could utilize the apodization profiles generated by the central control apodization.

Figure 6:
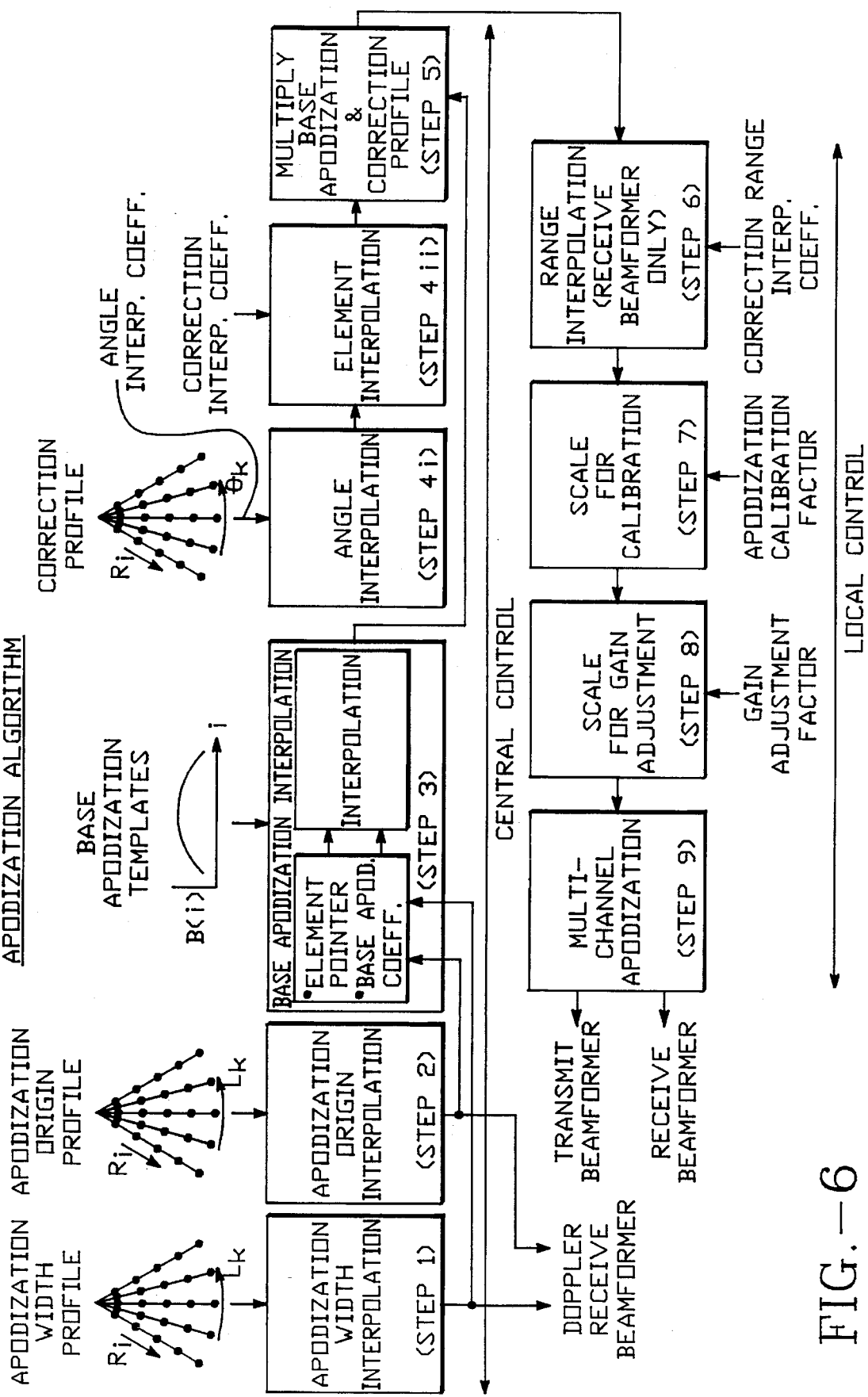
FIG. 6 depicts the focusing apodization delay profile generation method applicable to both transmit and receive beamformation systems.

For each scan line at each Reference Range, the central control processor uses information describing the desired aperture growth to stretch and slide normalized apodization shapes (the Base Apodization Templates). These nominal apodizations are then corrected for range and angle dependencies (multiplied by Correction Profiles) and transferred to individual transmitter or receiver local processor controls, which linearly interpolate in range to provide a continuous progression from one apodization to the next, and apply the apodizations to the transmit or receive signals. This scheme is used for all imaging and Doppler modes as well as multiple beam, synthetic scan line, and synthetic aperture modes. Calculation of synthetic aperture delays cause variation from the basic calculation only in that the Correction Profiles are placed in multiple locations across the face of the transducer. The central control system generates delay profiles independently for each beam and each Reference Range. Refer to FIG. 6 for a schematical block diagram depicting generation of the apodization profiles.

a. Central Control System Apodization Profile Generation

Assume that an apodization profile $a(i,R,L)$ for a transmit or receive beam focused at location $(R,L)$ is to be generated, and R falls between Apodization Reference Ranges $R_j$ and $R_{j+1}$, scan line L falls between Apodization Reference Lines $L_K$ and $L_{K+1}$, and angle $\theta_L$ of scan line L falls between Apodization Reference Angles $\theta_k$ and $\theta_{k+1}$. Apodization Origin is the offset of the Base Apodization center from the center of the transducer array. Apodization Width is the desired width of the base apodization profile when truncation at the edge of the physical aperture is ignored. Because Origin and Width vary smoothly in range and azimuth, the central control can calculate origin and width values for desired transmit or receive focal points by linear interpolation from a sparse set of Origin and Width grid samples. Apodization Reference Ranges are used to sample the Apodization Origin profile, Width profile, and Correction Profile. With symmetric scan geometries, the Reference Scan Lines need only cover one-half the scan angle as symmetry will determine the Apodization Origin and Width profiles for the remaining scan lines. Because the Correction Profile is a smooth function of steering angle, focal range, and element position, it is possible to calculate correction profiles for arbitrary steering angles, focal ranges, and arbitrary line origins by interpolation from a pre-calculated and stored, or real-time calculated, sparse profiles sparsely sampled in angle, range, and elements. Because it is a smooth function, the Correction Profile can be sub-sampled across the aperture. The central control system performs the following five processing steps for each Reference Range and each beam:

STEP [1]: calculate the Apodization Width profile $W_{apod}(R,L)$ by interpolating linearly in line and range between Apodization Width profile grid samples at $R_j$, $R_{j+1}$, $L_K$, and $L_{K+1}$ transmit:

$$W_{apod}(R,L)=\alpha_1 W_{apod}(R_j,L_k)+\alpha_2 W_{apod}(R_j,L_{k+1})+\alpha_3 W_{apod}(R_{j+1},L_k)+\alpha_4 W_{apod}(R_{j+1},L_{k+1}) \quad (16)$$

receive (imaging and Doppler):

$$W_{apod}(R_j,L)=(1-\alpha_L)W_{apod}(R_j,L_K)+\alpha_L W_{apod}(R_j,L_{K+1}) \quad (17)$$

where the Line-Range Interpolation Coefficients are pre-calculated as $$\alpha_1=\alpha_R\alpha_L$$

$$\alpha_2=(1-\alpha_R)\alpha_L$$

$$\alpha_3=\alpha_R(1-\alpha_L)$$

$$\alpha_4=(1-\alpha_R)(1-\alpha_L) \quad (18)$$

where $\alpha_L$ is the Line Interpolation Coefficient for scan line L and $\alpha_R$ is the Range Interpolation Coefficient for focal range R. The Line Interpolation Coefficient can be pre-computed based on many possible algorithms; for example if the interpolation is performed linearly in the sine of the steering angle (assuming the scan lines are distributed uniformly in the sine of the scan line angle), then $$\alpha_L = \frac{[\sin(\theta_L) - \sin(\theta_k)]}{[\sin(\theta_{k+1}) - \sin(\theta_k)]} \quad (19)$$

One choice for the Range Interpolation Coefficient is to assume that the grid is spaced linearly in range, so that $$\alpha_R = \frac{[R - R_j]}{[R_{j+1} - R_j]} \quad (20)$$

Alternative to the interpolative calculation of $W_{apod}(R,L)$, it may also be precomputed by the central control system.

STEP [2]: calculate the Apodization Origin profile $O_{apod}(R,L)$ by interpolating linearly in line and range between Apodization Origin profile grid samples at $R_j$, $R_{j+1}$, $L_K$, and $L_{K+1}$ transmit:

$$O_{apod}(R,L)=\alpha_1 O_{apod}(R_j, L_K)+\alpha_2 O_{apod}(R_j,L_{K+1})+\alpha_3 O_{apod}(R_{j+1}, L_K)+\alpha_4 O_{apod}(R_{j+1}, L_{K+1}) \quad (21)$$

receive (imaging and Doppler):

$$O_{apod}(R_j,L)=(1-\alpha_L)O_{apod}(R_j,L_K)+\alpha_L(R_j,L_{K+1}) \quad (22)$$

where the Line-Range Interpolation Coefficients are as defined above. Alternative to the interpolative calculation of $O_{apod}(R,L)$, it may also be precomputed by the central control system.

STEP [3]: generate the Base Apodization profile $b(i,R,L)$ using the Base Apodization Templates (used for both transmit and receive for all imaging modes [B,M,F,D] and all scan geometries [Vector™, linear, sector, etc.]) and the Width and Origin calculated in steps [1] and [2] by (i) selecting the Base Apodization Template B(i) that is assigned to the focal range R; (ii) interpolating linearly between origin-shifted and width-scaled Base Apodization Template profile to form the Base Apodization profile b(i, R,L). The origin is shifted by the integer part of the Apodization Origin and the template width is scaled by the integer-truncated, normalized (to integer part of $W_{apod}(R,L)$ divided by the number of elements in the Base Apodization Template) apodization width transmit:

$$b(i,R,L)=B(i')+\alpha_{base}(i)[B(i'+1)-B(i')] \quad (23)$$

receive (imaging):

$$b(i,R_j,L)=B(i')+\alpha_{base}(i)[B(i'+1)-B(i')] \quad (24)$$

where i is an element in the active aperture (determined by the central control system based on the number of ultrasound system channels, the Apodization Width, and the Apodization Origin) and pointer i':

transmit: (25)

$$i' = int\left\{ \frac{[i - O_{apod}(R,L) - 1/2]}{int\{W_{apod}(R,L)\}} \times [\text{\# elements in Base Apod. Template}] \right\}$$

receive (imaging): (26)

$$i' = int\left\{ \frac{[i - O_{apod}(R_j,L) - 1/2]}{int\{W_{apod}(R_j,L)\}} \times [\text{\# elements in Base Apod. Template}] \right\}$$

performs the integer sample shifting and width scaling. Interpolating with the Base Interpolation Coefficient $\alpha_{base}(i)$ achieves the fine origin shifting and is obtained as the fractional component of the argument of the function above used above to compute i'; (iii) optionally forming the average b(i,R,L)+b(i+1,R,L) with an adjacent element in order to guarantee that the center of mass of the shifted profile lies at the Apodization Origin. FIG. 5c illustrates a typical set of reference range base profiles.

STEP [4]: generate the correction profile for the steering angle $\theta_L$ and depths $R_j$ and $R_{j+1}$ by (i) interpolating linearly in angle between origin-shifted Correction Profiles $C(i,R_j,\theta_k)$ and $C(i,R_j,\theta_{k+1})$ $$C(i,R_j, \theta_L)=C(i',R_j, \theta_k)+\alpha_{\theta_L}[C)i',R_j,\theta_{k+1})-C(i',R_j, \theta_k)] \quad (27)$$

to form the Correction Profile for the steering angle $\theta_L$, where $\alpha_{\theta_L}$ is the pre-computed Angle Interpolation Coefficient $$\alpha_{\theta_L} = \frac{[\sin(\theta_L) - \sin(\theta_k)]}{[\sin(\theta_{k+1}) - \sin(\theta_k)]} \quad (28)$$

which applies assuming linearity in the sine of the steering angle, and i'=int {i–$O_L$)/(Correction Profile element sample spacing)} is a pointer that performs the integral origin shifting and indexing; (ii) interpolating linearly between the elements of $C(i,R_j,O_L)$ to shift the Correction Profile to the exact element positions $$c(i,R_j,\theta_L)=C(i,R_j,\theta_L)+\alpha_{corr}(i)[C(i+1,R_j,\theta_L)-C(i,R_j, \theta_L)] \quad (29)$$

where i is in the active aperture and the Correction Interpolation Coefficient $\alpha_{corr}(i)$ is the fractional part of the argument used to generate i'.

STEP [5]: generate the corrected apodization profile for angle $\theta_L$ and depths $R_j$ and $R_{+1}$ by multiplying the Base Apodization profile with the Correction Profile transmit:

$$a(i,R,L)=b(i,R,L)c(i,R,\theta_L) \quad (30)$$

receive (imaging):

$$a(i,R_j,L)=b(i,R_j,L)c(i,R_j,\theta_L) \quad (31)$$

Either b or c can to set respectively to all ones for all i. Apodization correction profiles can be used to account for element factor, tissue attenuation, and/or 1/r type propagation losses (transmit only). A typical apodization profile by this algorithm is shown in FIG. 5d.

Note that steps [3] and [4] above indicate that the computations are performed for every element. It is also possible to save memory, especially for receive, by performing the calculation only for every other element and then interpolating between these elements for the other elements. Once the central control has performed the above steps for all beams, an apodization value per channel per beam is sent to all the local processor controls of the transmitters or receivers.

b. Local Processor Control Apodization and Gain Management

The transmitter channel envelope or receive channel signal is scaled by the local processor control for apodization and calibration gains, and compensated for multiple beam amplitude due to number of beams summed. The following four steps are performed:

STEP [6]: Imaging receive only: if R is not Reference Range $R_j$ or $R_{j+1}$, then interpolate linearly in range to generate the apodization profile at the desired range R $$a(i,R,L) = a(i,R_j,L) + \alpha_R[a(i,R_{j+1},L) - a(i,R_j,L)] \quad (32)$$

where $\alpha_R$ is a Correction Range Interpolation Coefficient. Typically, $\alpha_R = [R-R_j]/[R_{j+1}-R_j]$, assuming linearity in range, and thus it could be simply computed in real time if the range zone widths $(R_{j+1}-R_j)$ are provided by the central control to each local processor control.

STEP [6]: Transmit only: in the present embodiment, the transmit beamformer has a fixed focus per beam, and the reference range is selected at exactly the desired focal range. Therefore, no interpolation is required for transmit beamformer. Other embodiments could employ the same range interpolation as the imaging receive beamformer.

STEP [7]: calibrate the central-control-generated apodization profile $a(i,R,L)$ by multiplying by the Apodization Calibration Factor $A_{cal}(i)$ determined during a calibration mode $$a_{cal}(i,R,L) = A_{cal}(i)a(i,R,L) \quad (33)$$

The Apodization Calibration Factor compensates for analog path gain differences, transducer element-to-element gain differences, or missing elements by readjusting the apodization of active elements.

STEP [8]: multiply profile $a_{cal}(i,R,L)$ by a Gain Adjust Factor per beam to compensate for processor filter attenuation or to performbeam-dependent gain management. STEP [9]: apodize the processing channel by multiplying, per beam, the envelope magnitude samples of the transmitter or the receive signal of the receiver of the i-th element by $a_{cal}(i,R,L)$ and, in the case of the transmitter, sum the interleaved beam samples and scale the amplitude of the resultant signal by the selected Beam Sum Gain Factor (1,½,¼,⅛).

It is to be understood that interpolation and/or extrapolation processes can be performed to expand any data set and these processes can be linear and/or non-linear in nature. Further, all known linear and/or all non-linear interpolation/extrapolation techniques, or a combination of both, can be used.

D. Beamformer Control Apparatus

1. Beamformer Central Control

Figure 7:
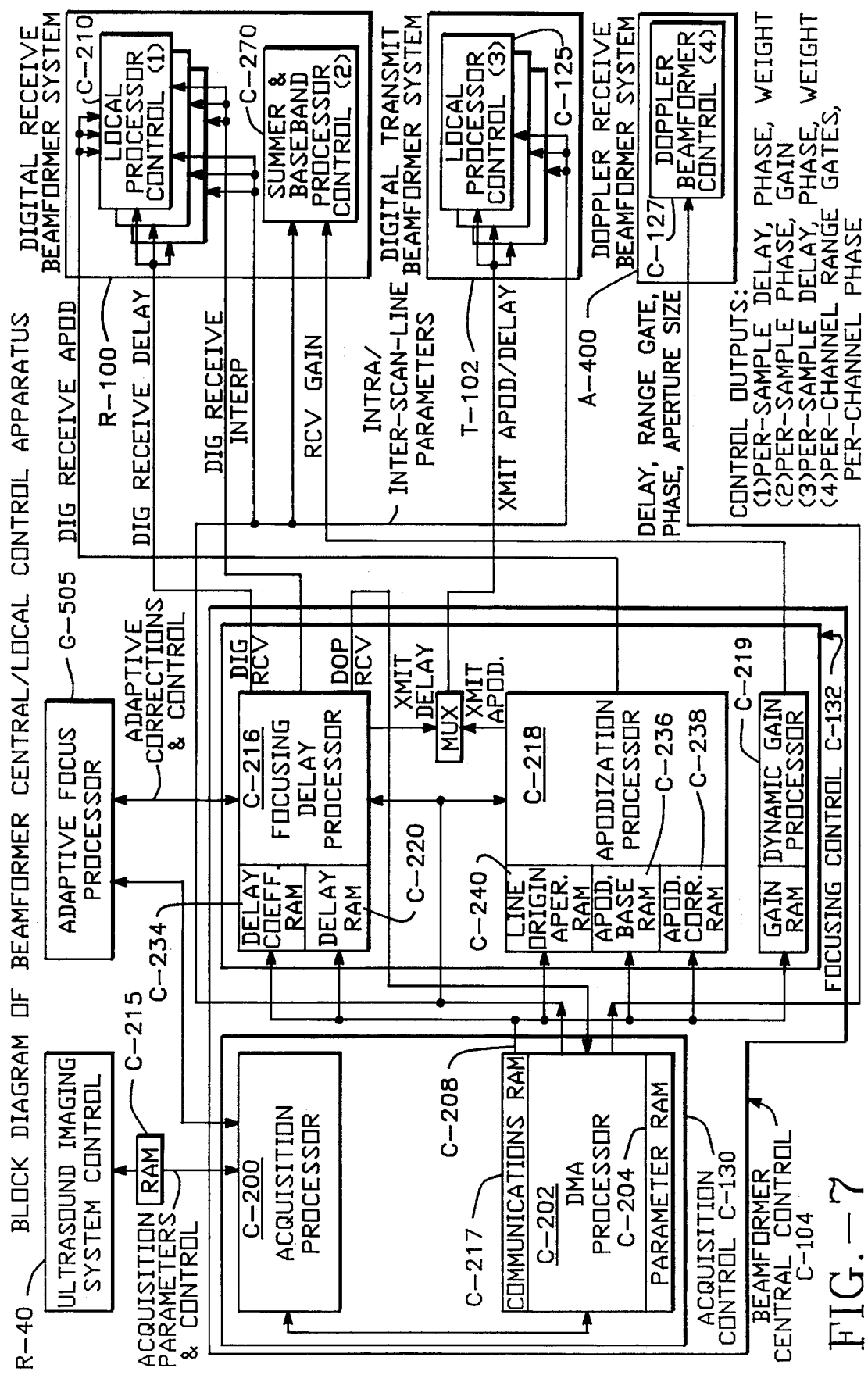
FIG. 7 depicts a block diagram of the beamformer central and local control apparatus.
Figure 8:
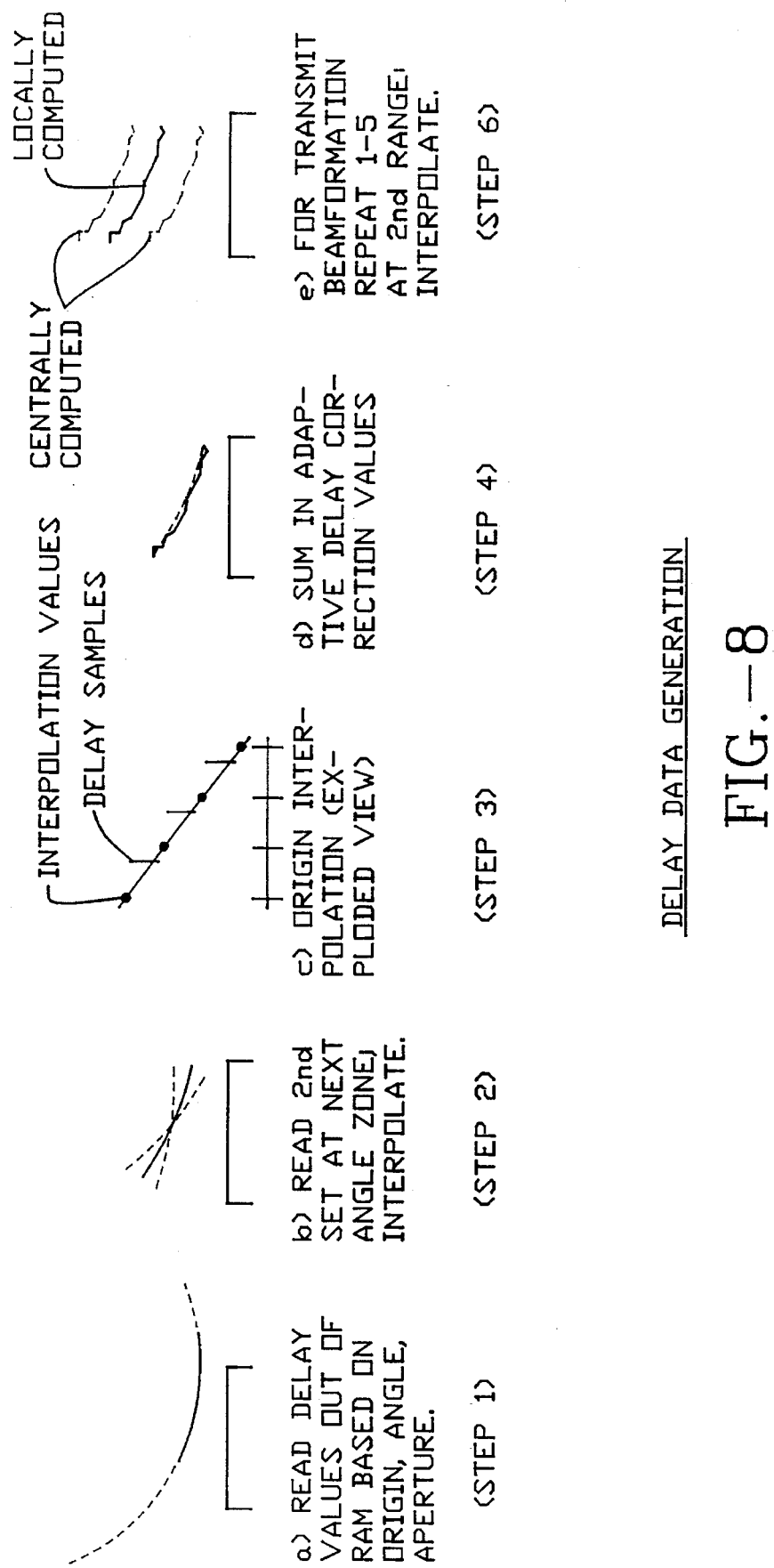
FIG. 8(a through 8e) depict graphical representations of a sample delay profile that is generated by selected stages of the delay method of FIG. 4.
Figure 9:
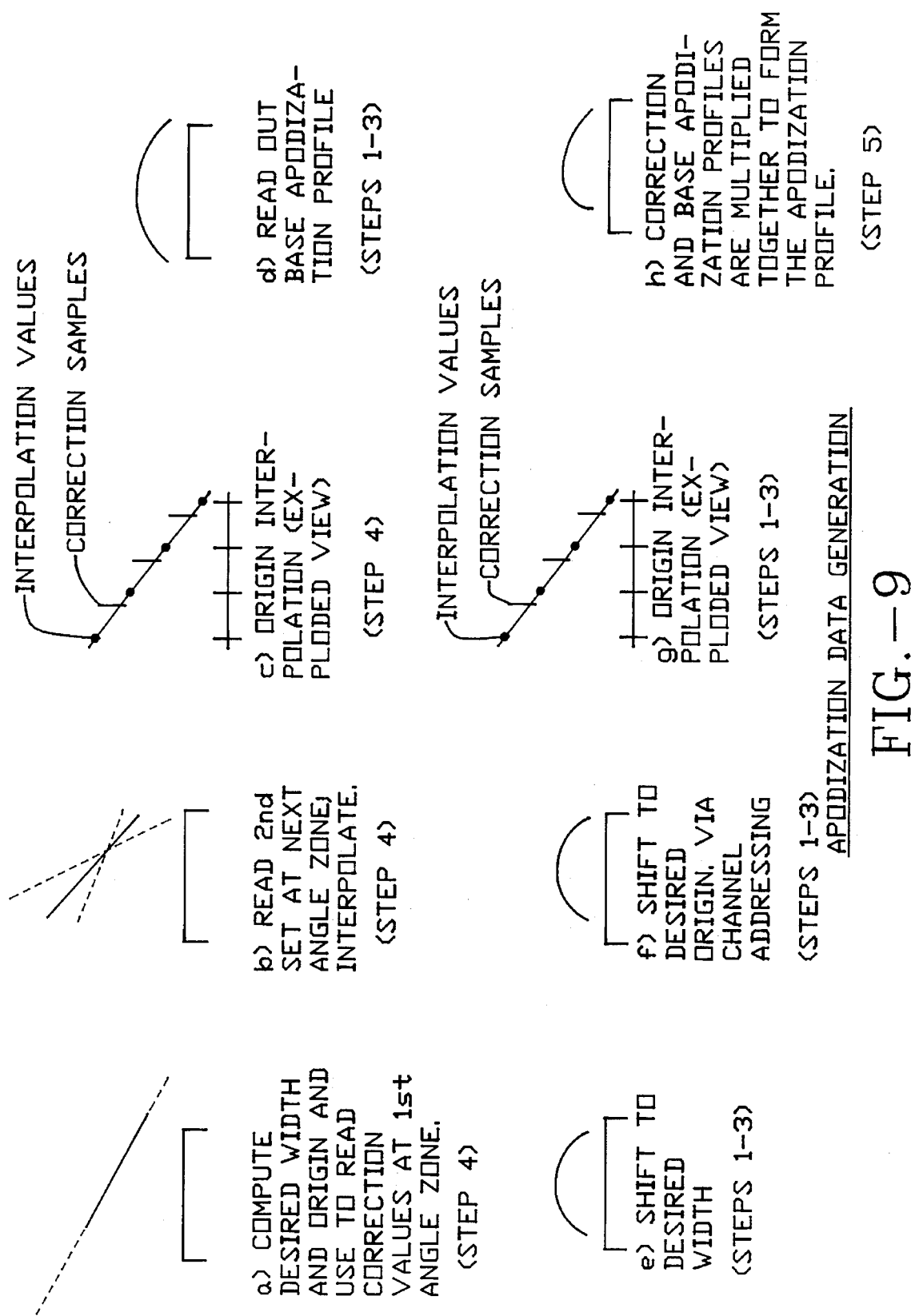
FIG. 9(a through 9h) depict graphical representations of a sample apodization profile that is generated by selected stages of the apodization method of FIG. 6.

The central or primary beamformer control C-104 is principally comprised of the acquisition control C-130 and the focusing control C-132 as shown in FIG. 2c and FIG. 7. Not shown are details of the front end control C-134, for controlling the transducer multiplexers and setting gains on the analog amplifiers, and timing control C-136, which generates the digital clocks and other timing signals needed to synchronize the digital operations. These control operators are well known to those that practice the art and are therefore not detailed in this apparatus. As apparent from the Method section, the delay and apodization expansion operations involve elementary adder and multiplier operations so that the apparatus that implements the method is composed of processor and memory storage elements well known to the art. This section on apparatus describes organization of the central and local control.

a. Acquisition Control

Acquisition control C-130 consists of two processors, an acquisition processor C-215 with acquisition RAM (random access memory) C-215 that serves as the link between the beamformer control system and the overall ultrasound imaging system control R-40, and a dedicated direct-memory-access (DMA) processor C-202 with communications RAM C-217 and parameter RAM C-204 that sustains data and parameter transfers to the focusing control and local processors at rates compatible with real-time dynamic beamforming.

The acquisition control C-130 (FIGS. 2c and 7) provides the overall control and timing for the digital transmit and receive beamformer systems, and the Doppler receive beamformer system. As can be seen in FIG. 7, the acquisition control controls the focusing control C-132 and the adaptive focus processor G-505. The acquisition control C-130 downloads data, including delay and apodization values and other parameters, to the focusing control C-132, with the adaptive focusing processor G-505 downloading aberration correction data to the focusing delay processor C-216. Data from the focusing control C-132 is communicated to the digital transmit and receive beamformer systems as more fully described below. With respect to the Doppler receive beamformer system, data is read from the focusing delay processor C-216 by the acquisition control C-130. From the acquisition control C-130 such data is sent to the Doppler receive beamformer system as described below.

i. Acquisition Processor

FIG. 7 shows the acquisition control C-130 in more detail. The acquisition control C-130 provides real-time control of the ultrasound scanning processes within the system. The primary components of the acquisition control are an acquisition processor C-200, a DMA processor C-202, and frame parameter RAM (random access memory) C-204, which stores both scan-line-varying parameters and non-scan-line-varying parameters. Parameter RAM C-204, for example, can store parameters for one transducer and for one imaging frame. The acquisition processor's acquisition RAM C-215 stores values, such as by way of example only, parameters and values for multiple transducers, multiple scan formats, including sparsely sampled focusing delay and apodization data sets, as defined below. RAM C-215 is downloaded with values which have been transferred from ultrasound system storage R-38 through the ultrasound system processor R-40 (See FIG. 2a), or other storage device which stores such pre-calculated values. In addition to retrieving data, acquisition processor C-200 can alternatively compute the parameter data based on a stored program or expand a compressed version of data taken from storage. It is to be understood that all values that are used by the system by transfer or by generation of additional values are pre-determined based on the types of transducers that can be employed, the clinical settings anticipated, the scan formats and imaging modes desired and the like. Such downloading is under the control of acquisition processor C-200. When such values are needed, acquisition processor C-200 retrieves the values and communicates these values to the local communications RAM C-217. RAM C-217 facilitates communication between acquisition processor C-200 and DMA processor C-202 such that the DMA processor can store needed values in the parameter RAM C-204 for ready access.

As explained below, in addition to the above data, parameters defining frequency profiles (FIGS. 13a to 13f) are pre-calculated externally or internally by acquisition processor C-200 and also stored on system disk R-38 for eventual access by the acquisition processor C-200. Such frequency profiles are used by the receive local processor control C-210 (FIG. 10) for signal demodulation and phase adjustment and by the receive beamformer baseband processor control C-270 for signal remodulation. Alternatively, acquisition processor C-200 can generate a frequency profile for such purposes as remodulation as performed by the receive beamformer phase aligner R-127.

ii. DMA Processor

The DMA processor C-202 provides the ability to read data out of the scan line parameter RAM C-204 and transfer it to the intra/inter-scan-line beamformer control bus C-208. The DMA processor C-202 is controlled by the acquisition processor C-200. The frame parameter RAM C-204 stores parameters and sparsely sampled base delay and apodization data sets, which are provided to the focusing control for purposes of expanding to additional values. The stored previously computed or currently computed parameters and sparsely sampled data sets can include, by way of example only, base delay and apodization profiles, interpolation and/ or extrapolation coefficients, and scan formats and scan geometries indexed by arbitrary scan line number, scan line origin, scan line angle, and range along scan lines. In addition, the parameter RAM C-204 can store processing mode parameters such as selections of number of beams, signal envelope programming, decimation and interpolation factor programming, signal resolution mode, nominal center frequency and sampling rate programming, filter profile data including filter coefficients for programming the filters of the transmit and receive beamformer systems, and frequency profile data which can, for example, compensate for return signal frequency downshift due to tissue attenuation.

Expanding on this concept, the stored previously computed or currently computed base data sets and scan parameters downloaded by the acquisition processor C-200 from system storage R-38, acquisition RAM storage, or as currently computed by the acquisition processor either are transferred via the DMA processor and communication RAM to the local processor controls (data set), are transferred to the delay or apodization RAMs in the focusing control, or are stored (scan parameters) in the parameter RAM C-204 and include, by way of example:

(1) Focus data: Base delay and apodization profile data are transferred and stored in the various delay and apodization RAMs shown in FIG. 7.

(2) Delay and apodization interpolation/extrapolation coefficient parameters: Parameters which define interpolation/extrapolation coefficients can be pre-computed and pre-stored and/or calculated when needed by the acquisition processor C-200 and transferred directly to the focusing control C-132.

(3) Scan format data: Scan lines for each scan format are preferably in a format stored in parameter RAM C-204 by (a) origin along the transducer, specified in terms of transducer element number and an origin interpolation coefficient, and (b) angle with respect to the normal to the transducer face, specified in terms of reference angles and an angle interpolation/extrapolation coefficient.

(4) Other parameters and data: Other parameters and data stored in parameter RAM C-204 include processing mode values such as selection for number of beams, decimation and interpolation factors for the transmit and receive beamformer systems, output sample resolution, per-beam channel processing rates and nominal center frequencies, sampling frequencies, filter characteristic data including coefficients for programming the transmit and receive beamformer systems, and frequency demodulation trend data which can, for example, compensate for return signal frequency downshift due to tissue attenuation. As will be discussed below, the efficiency of trading off among the per-beam processing mode values of (a) number of beams per receiver or transmitter (b) nominal center frequency, and (c) range or bandwidth resolution for maximum beamformer system performance is controlled by the beamformer central control C-104 by selectively downloading these pre-calculated values for the desired processing mode to the secondary or local controls C-210 or C-125 associated with each transmit or receive beamformer channel.

As discussed above, the parameter RAM C-204 can be updated, for example, upon the change of the desired scan format or scan mode, or upon the change of a transducer T-112 by downloading pre-computed data and parameters from preferably the acquisition RAM C-215, but also, for example, from system storage R-38, floppy disk storage, or ROM storage. As discussed in the Method section, the base delay and apodization data set sizes are minimized by storing sampled delay and apodization profiles for only a small number of reference ranges and scan line angles.

The DMA processor C-202 also performs a function which provides for system calibration, including the ability to read output values for purposes of calibration and the ability to modify calibration values in the digital transmit and receive beamformer systems. By way of example, receive system output values and/or pre-stored calibration values associated with each transducer, can be used to support calibration. Thus, the acquisition processor can acquire in-phase and quadrature samples from the output of the baseband filter and phase aligner block R-127 (FIG. 2b) and can compute amplitude and phase corrections based on such in-phase and quadrature samples.

b. Focusing Control

In an array beamformer system, dynamic focusing refers to the ability to track the return signal as a function of time (depth or range) along a desired scan line. Dynamic focusing is accomplished by updating in real time the delay and apodization values of each channel of the receive beamformer system.

The focusing control C-132 (FIGS. 2c, 7) generates, by expanding pre-computed or computed sparsely sampled base delay and apodization profiles, which expanded data sets are used and further expanded, as appropriate, by the digital transmit beamformer system T-102, the digital receive beamformer system R-100 and the Doppler receive beamformer system A-400. The focusing control C-132 allows a high degree of flexibility in scan formats by using parameters such as scan line origin, scan line angle, and focal range (or a set of implicit focal reference ranges for dynamic receive) to specify the delay and apodization profiles for each scan line.

The focusing control C-132 of the primary or central control C-104 is composed of three processors: the delay processor C-216 (FIG. 7), the apodization processor C-218 and the receive beamformer dynamic gain processor C-219. The delay and apodization profiles used by the beamformers are derived from expanding (i.e., by interpolation/extrapolation operations, as described in section C) sparsely sampled (in element position, azimuth, and range) base data sets of pre-computed or just-computed delay and apodization profiles using parameters transferred to the delay and apodization RAMs C-220, C-234, C-240, C-236, and C-238 (FIG. 7) on transducer and/or scan format changes.

i. Delay Processor

The delay processor C-216 of the focusing control C-132 calculates the six central control delay profile expansion steps (equations 2–7) of the Method section using dedicated adders and multipliers that perform exactly the operations indicated by the steps. The base Reference Delay Profiles data set selected by the acquisition processor C-200 are downloaded by DMA processor C-202, are stored for each reference range of each scan line in delay RAM C-234. The various interpolation coefficients, delay offsets, and scaling coefficients are stored in delay coefficient RAM C-220. Delay processor C-216 draws from these two RAMs as it expands the delay profile per the scan line parameters. The computed results of the delay processor C-216 are held in a delay FIFO buffer until the data can be communicated to the digital transmit local processor controls C-125, digital receive local processor controls C-210, or the Doppler receive beamformer control C-127. The receive beamformer delays computed by the delay processor C-216 will apply to either the digital receive beamformer or the Doppler receive beamformer, whichever of the two have been activated. If the Doppler beamformer is selected, the Doppler beamformer control C-127 will convert the computed delays to range time gates and one of a discrete number of phase shifts, as described in the co-pending patent application for the Doppler Receive Beamformer System. If the digital receive beamformer is selected, the local processor controls C-210 will perform the final interpolation steps [6]–[10] (Eqs. 9 to 11) in range to get the final desired time delay value(s).

Due to the dynamic nature of the digital receive beamformer system R-100 (i.e., the fact that receive beams are focused at a multiplicity of ranges for each scan line), range interpolation for the delay data is accomplished in a preferred embodiment in the secondary local control C-210 associated with each digital receive beamformer channel. In order for this to be accomplished, pre-computed range interpolation coefficients are communicated from the primary control to the secondary control. These pre-computed range interpolation coefficients are initially stored in system storage R-38 and then are downloaded from the communication RAM C-217 by the DMA processor C-202 to the delay coefficient RAM C-234. The range coefficient is stored in coefficient RAM C-234 and therefrom sent to the memory address and delay processor C-264 (FIGS. 10, 11) of the secondary control C-210 for range interpolation of the delay data sent to the secondary control C-210 of the receive beamformer system R-100 by the delay processor C-216. This range interpolation coefficient is non-linear and is precalculated. Each range zone has its own interpolation coefficient in a preferred embodiment.

Multiple beam operation is accomplished for both transmit beamformer and receive beamformer using delay profiles generated by specifying separate line parameters (e.g., line origin, line angle) for each beam. Further, the number of beams can be specified separately for transmit and receive in order to support, for example, the sample synthesis operations as taught in the above referenced patent application entitled: METHOD AND APPARATUS FOR COHERENT IMAGE FORMATION.

For multiple transmit beams, delay profiles and also the below discussed apodization profiles for each beam are transferred to the digital transmit beamformer system for each scan line. Additionally, different transmit beams may have different focus ranges, with each focus range having its own delay and apodization profiles for each beam. For multiple receive beams, unique delay and apodization profiles for each beam are transferred to the digital receive beamformer system at each reference range.

As is evident from the discussion herein, both the primary or central control C-104 (FIGS. 2c, 7) as embodied by the delay and apodization processors, and the secondary or local control C-210 (FIG. 10) as embodied, for example, by the receive memory address and delay processor C-264, and the receive apodization processor C-268, perform interpolation/ extrapolation steps such that only a sparse set of base data need be stored by acquisition control C-130. The first level of interpolation is performed by the central control and the second level of interpolation is performed locally with respect to the processors associated, for example, with each channel of the digital receive beamformer system. In this way, the system maintains speed and versatility at substantial hardware savings and does not require (1) large, high speed memory to store delay and apodization data and (2) wide, high rate data buses to communicate such data to the local control.

ii. Apodization Processor

The apodization processor C-218 of the focusing control C-132 calculates the five central control profile expansion steps of the Method section, using dedicated adders and multipliers that perform exactly the operations indicated by the steps, to generate an output apodization profile that is the product of a base apodization profile, that has been shifted and scaled, and a correction profile. The base Apodization Width profile, Apodization Origin profiles, Base Apodization Template, and Correction Profile data sets, selected by the acquisition processor C-200 and downloaded by DMA processor C-202, are stored for each reference range of each scan line in Line Origin Aperture RAM C-240, Apodization Base RAM C-236, and Apodization Correction RAM C-238, respectively. The various interpolation coefficients, offsets, and scaling coefficients are stored in Apodization Correction RAM C-238. Apodization processor C-218 draws from these three RAMs as it expands the various apodization-related base profiles per the scan line parameters. The computed results of the apodization processor C-218 are held in an apodization FIFO buffer until the data can be communicated to the digital transmit local processor controls C-125 or digital receive local processor controls C-210. The transmitter or receiver local processor control performs the final operational steps [6]–[9] detailed in the Method section.

It is to be understood that range interpolation/extrapolation for apodization values (as well as delay values) can occur in the focusing control C-132 of the central control as well as in the local control for receive and transmit systems and be within the spirit of the invention.

There is no apodization associated with the Doppler receive beamformer system other than selecting channels to be gated on or off. It is to be understood, however, that such Doppler receive beamformers can be afforded the advantages of apodization, implemented in ways addressed above, and be within the spirit of the invention.

During dynamic receive beamforming, the secondary or local control C-210 associated with each channel of the receive beamformer system performs implicit linear interpolates, in a preferred embodiment, between the current range zone boundary values of the apodization profiles as explained above with respect to the local apodization processor. Thus, in this preferred embodiment, no apodization range interpolation/extrapolation coefficient is communicated to the local receive control. Alternatively, such a coefficient could be communicated to the local control with interpolation/extrapolation occurring locally using zone boundary apodization values as supplied by the central control. In a preferred embodiment, the focusing control C-132 and the local apodization processes are pipelined such that the local apodization processor is operating on the current scan line values when the focusing control is calculating the next scan line's values.

Any above described interpolation and/or extrapolation operation can selectively be linear or non-linear and fall within the scope of the invention.

2. Digital Receive Beamformer Per Channel Local Control a. Signal Processing

The digital receive beamformer system R-100 includes a beamformer processor R-120 per channel which has a decimator one, a time delay memory, a decimator two and a complex multiplier. This digital receive beamformer system R-100 is more fully discussed in the above cited patent application entitled: METHOD AND APPARATUS FOR RECEIVE BEAMFORMER SYSTEM. The beamformer processors R-120 for each channel are summed at the summer in order to form a receive beam centered along a receive scan line. The receive beam is then phase aligned with the phase aligner as discussed below.

The beamformer control performs beamformation through dynamic focus and dynamic apodization so that the channels R-101 of the digital receive beamformer system R-100 can focus the collected scattered acoustic waves by dynamically aligning them in both time and phase as well as weighting them in amplitude across channels. Instantaneous delay and apodization values are calculated for every output sample.

Secondary or local control C-210 (FIG. 10) for the digital receive beamformer system, receives control data form the primary or central control C-104. The secondary or local control C-210 includes a controller and I/O processor C-260, a calibration processor C-262, a memory address and delay processor C-264, a phase and frequency processor C-266, and an apodization processor C-268.

Figure 10:
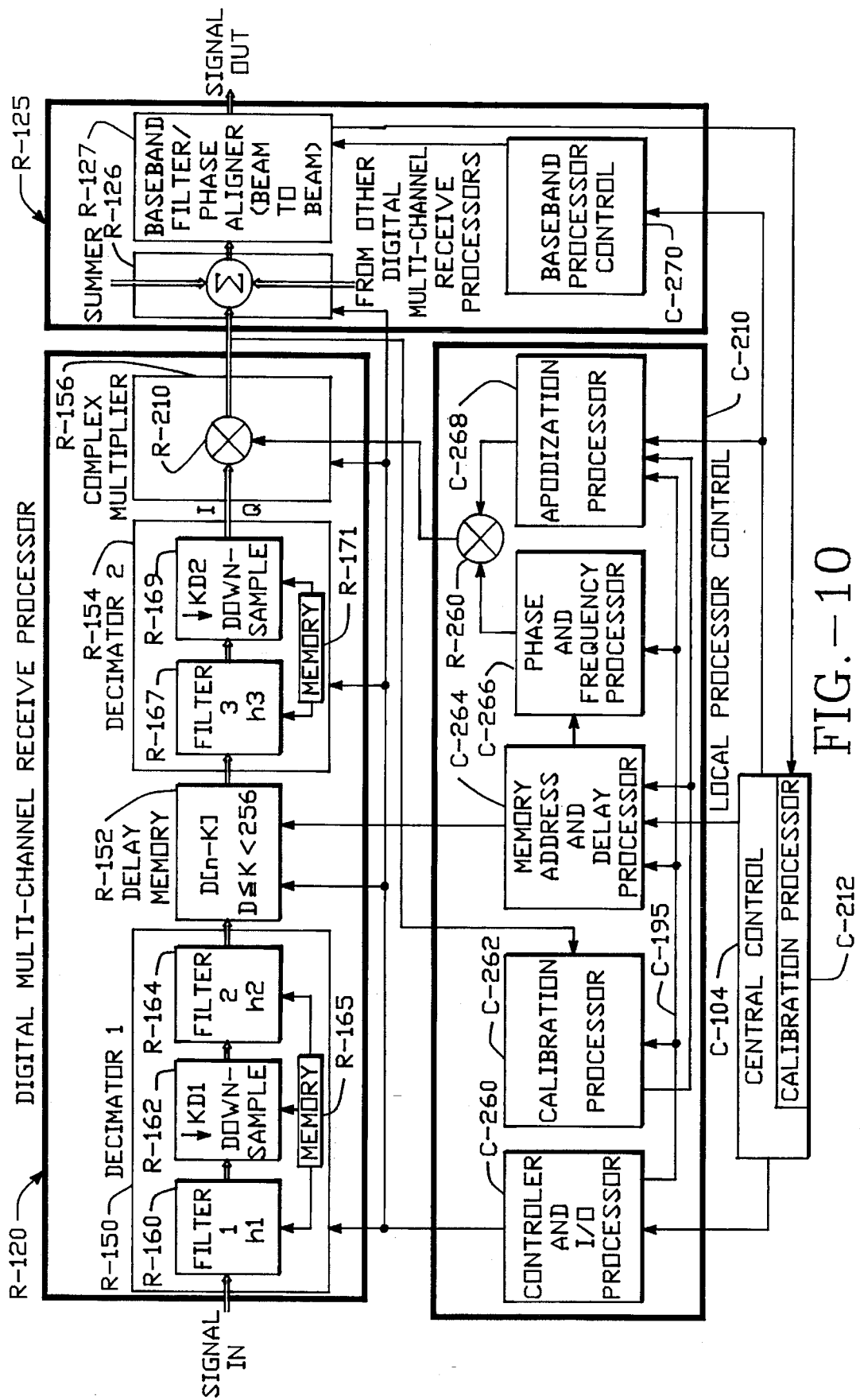
FIG. 10 depicts a more detailed block diagram of an embodiment of the multi-channel receive processor of a digital receive beamformer system of FIG. 2a with a secondary or local beamformer control of the invention.

Before describing the functional blocks in FIG. 10, it will be useful to understand the various processing modes in which each receive processor can operate. Ideally, it would be desirable for each receive processor to be able to process any number of superposed and separately delayed and apodized receive beams up to some maximum, at any receive signal nominal center frequency $F_0$ up to some maximum, specified by a receive signal spatial range resolution $\gamma_B$ (inversely related to receive signal bandwidth) up to some maximum. This would require extensive processing power, however, especially if the maximums are large. Since processing power is limited in any system, it would seem that these maximums must be kept low enough such that the hardware is able to keep up when all three parameters are specified at maximum. The present embodiment, on the other hand, makes better use of the available processing power by permitting trade-offs among these three parameters and allowing the central control system to choose among processing modes depending on the clinical setting. It is to be understood that once the user selects a transducer, a mode and scan format pursuant to the clinical setting, that preferably the method and apparatus automatically selects from the preselected and pre-stored processing modes.

Table I sets forth some of the processing modes which can be selected by central control system C-104 to be applied to all digital multi-channel receive processors R-120 of receive beamformer R-100. Different embodiments can support fewer or greater numbers of modes and fewer or greater numbers of beams. As used in the Table:

$F_s$: is the system clock frequency. The central control C-104 can set $F_s$ at any of a variety of frequencies.

$F_{ADC}$: is the ADC sampling frequency or the rate at which samples are converted by the ADC R-118 (FIG. 2b), where typically $F_{ADC}=F_s$ or $F_s/2$.

$F_0$: is a receive signal nominal center frequency. $F_0$ is equal to, or near, the actual signal carrier frequency $F_c$ and is therefore considered to be the nominal receive signal frequency. $F_o$ is specified for each digital multi-channel receiver R-101 as a fraction of $F_s$. $F_0$ is programmable by the central control C-104 for each digital multi-channel receiver R-101 based on pre-stored values.

c: is the speed of sound in the body.

$\lambda_0$: is the acoustic wavelength of $F_0$; $\lambda_0=c/F_0$.

$F_c$: is the receive signal carrier frequency (an imaging frequency). The digital multi-channel receiver R-101 can be tuned by verniering $F_0$ to $F_c$. $F_c$ and $F_o$ are related in the invention by a frequency scaling factor or frequency vernier factor v, such that $v \cdot F_o = F_c$ as pre-stored in the central control. The range of the carrier frequencies $F_c$ for which the invention can be tuned ranges theoretically between $0 \times F_o$ to $2 \times F_o$, but typically is 75% of $F_o$ to 125% of $F_o$.

$R_o$: is the per-beam complex (I/Q-pair) output sampling rate or per beam processing rate. The ratio $R_0/F_0$ represents the number of complex samples per period of the receive signal nominal center frequency $F_0$.

$\gamma_B$: is the per-beam spatial range resolution. Note that $\gamma_B = c/2R_o = \lambda_o/(2R_o/F_0)$.

Spatial Range Resolution (or bandwidth modes (BW Mode)) selected at Decimator Two: There are 6 spatial range resolutions (or bandwidth modes) in the preferred embodiment, accounting for spatial range resolution between values $F_0/2$ to $4F_0$. Values outside these values are within the spirit and scope of the invention.

Spatial range resolution (Bandwidth Modes):

BW MODE 1: $R_0=4F_0$ or $\gamma_B=\lambda_0/8$.

BW MODE 2: $R_0=2F_0$ or $\gamma_B=\lambda_0/4$.
BW MODE 3: $R_0=F_0$ or $\gamma_B=\lambda_0/2$.
BW MODE 4: $R_0=F_0/2$ or $\gamma_B=\lambda_0$.
BW MODE 5: $R_0=2F_0/3$ or $3\gamma_B=\lambda_0/4$.
BW MODE 6: $R_0=F_0/3$ or $3\gamma_B=\lambda_0/2$.

$B_B$=maximum number of simultaneously produced beams for the given processing mode. (Note that the beamformer can be operated to produce fewer than $N_B$ beams if desired; for example, in a mode for which $N_B=4$, the beamformer can be operated to produce only three beams if desired, although this would not make full use of the available hardware processing power.)

N/I=Mode not implemented in preferred embodiment.

TABLE 1

| | RECEIVE PROCESSING MODES (Output of Decimator Two) | | |
|---|---|---|---|
| $F_0$ (MHz) | $N_B = 1$ | $N_B = 2$ | $N_B = 4$ |
| $F_S/32$ | N/I | BW Mode 1<br>$R_o = 4F_0$<br>$\gamma_B = \lambda_0/8$ | BW Mode 2<br>$R_o = 2F_0$<br>$\gamma_B = \lambda_0/4$ |
| $F_S/16$ | BW Mode 1<br>$R_o = 4F_0$<br>$\gamma_B = \lambda_0/8$ | BW Mode 2<br>$R_o = 2F_0$<br>$\gamma_B = \lambda_0/4$ | BW Mode 3<br>$R_o = F_0$<br>$\gamma_B = \lambda_0/2$ |
| $F_S/8$ | BW Mode 2<br>$R_o = 2F_0$<br>$\gamma_B = \lambda_0/4$ | BW Mode 3<br>$R_o = F_0$<br>$\gamma_B = \lambda_0/2$ | BW Mode 4<br>$R_o = F_0/2$<br>$\gamma_B = \lambda_0$ |
| $F_S/4$ | BW Mode 3<br>$R_o = F_0$<br>$\gamma_B = \lambda_0/2$ | BW Mode 4<br>$R_o = F_0/2$<br>$\gamma_B = \lambda_0$ | N/I |
| $3F_S/8$ | BW Mode 5<br>$R_o = 2F_0/3$<br>$\gamma_B = 3\lambda_0/4$ | BW Mode 6<br>$R_o = F_0/3$<br>$\gamma_B = 3\lambda_0/2$ | N/I |

As can be seen by reading horizontally across Table 1, for each receive signal nominal center frequency $F_0$, the hardware permits a larger number $N_B$ of superposed beam waveforms to be traded-off against some degradation of the per-beam spatial range resolution $\gamma_B$, and vice-versa. A larger $N_B$ translates into a higher frame rate (since the entire field of view can be scanned with only half or one quarter the number of firings), while an enhanced spatial range resolution $\gamma_B$ (smaller value of $\gamma_B$) translates into a sharper image in range. For example, therefore, in a display mode which displays a color flow Doppler image superimposed on a grey-scale image, produced by interleaving B-mode and F-mode pulse firings, the central control C-104 could reprogram the receive beamformer R-100 to operate at $N_B=1$ for all B-mode imaging pulses and at $N_B=2$ or even $N_B=4$ for color flow Doppler imaging pulses, assuming both modes share the same $F_0$.

Similarly, reading vertically down Table 1, and excluding modes 5 and 6 for this example, it can be seen that for a given maximum number of beams $N_B$, processing modes having a higher carrier frequency (approximately $F_0$), have a larger relative per-beam spatial range resolution $\gamma_B$. A clinician typically selects a transducer operable at the carrier frequency appropriate for a desired depth penetration. In doing so, the clinician trades off penetration for overall image resolution (ability to distinguish two targets). (The latter trade-off is inherent in the physics of ultrasound since greater penetration is achieved by reducing the imaging frequency, which in turn reduces the overall image resolution.) For a given maximum number of beams $N_B$, the desired tissue penetration determines $F_0$ (Table 1), which in turn determines a processing mode having the optimum per-beam spatial range resolution which the hardware can provide at the selected $F_0$. That is, as $F_0$ decreases relative to $F_s$ to achieve greater penetration, the signal processing path in each receive channel R-101 need not process as many samples per second. This leaves hardware processing capacity available, which the system takes advantage of by increasing $R_0/F_0$ and hence improving the normalized per-beam relative spatial range resolution $\gamma_B/\lambda_0$.

Further, by reading diagonally across Table 1 (upward to the right), and again excluding modes 5 and 6 for this example, it can be seen that the hardware permits a lower $F_0$ to be traded off for a larger number of beams $N_B$ at a constant receive spatial resolution $\gamma_B$.

In summary the modes with which the receive channel R-101 can be specified to operate offer trade-offs among three parameters: $N_B$, $F_0$, and $\gamma_B$. Thus each processing mode defines a parameter set $\{N_B, F_0, \gamma_B\}$. In general, all of the processing modes shown in Table 1 satisfy the rule that for a given $F_s$, the product of the maximum number of beams $N_B$ and the channel processing rate $F_0$, divided by the normalized per-beam spatial range resolution $\gamma_B/\lambda_0$, is constant. Further, the preferred embodiment also supports additional processing modes not shown in Table 1, and which do not fully utilize the total processing capability of the system.

i. Decimator One

As can be seen in FIG. 3, the beamformer processor R-120 is comprised of decimator one R-150, time delay memory R-152, decimator two R-154 and complex multiplier R-156. Decimator one R-150 is programmable (as previously defined) and is also referred to as a variable rate decimator filter or a multi-rate decimator filter with a variety of programmable decimation factors and associated programmable filter coefficients. Decimator one R-150, in a preferred embodiment, is functionally comprised of a first filter (filter one) R-160 which has first programmable filter coefficients h1, a decimator R-162 which down-samples at a decimation factor of $K_{D1}$ (Table 2), and a second filter (filter two) R-164 which has second programmable filter coefficients of h2. In a preferred embodiment filter one (h1) is a FIR (finite impulse response), anti-aliasing low/high-pass filter. Filter one (h1) filters out the ADC quantization noise and odd harmonics of the receive signal nominal center frequency $F_0$. Preferably, filter two (h2) is a FIR, anti-alias, band-pass filter which filters out the even harmonics of the receive signal nominal center frequency $F_0$. The filter profiles and decimation rate values are programmable depending upon the receive signal nominal center frequency $F_0$ and the ADC sampling rate ($F_{ADC}$). Such filters can perform the additional programmable task of signal shaping.

In implementation, the functional features of the filter one (h1) R-160 and the decimator R-162 are accomplished simultaneously. It is to be understood, however, that the filtering and decimating operations can occur separately and in a less computationally efficient order in other embodiments and be within the spirit and scope of the invention.

Further it is to be understood that the present invention can be implemented with filters with a variety of lengths and using fixed or floating point operations.

Decimator filter design is known in the art such as disclosed in Rabiner and Schafer, *Multirate Signal Processing*, Prentice Hall, 1983 and *Digital Signal Processing Applications Using the ADSP*-2100 *Family*, volume 1, edited by Amy Mar of Analog Devices, DSP division, Prentice Hall 1992, which are hereby incorporated by reference.

In accordance with the same definition of programmable, the programming of filters and filter coefficients and decimation rates is accomplished by the central control C-104 which coordinates the operation of the digital multi-channel transmitter T-103 and the digital multi-channel receivers R-101. Such filter coefficients and filter values and decimation factor values can be downloaded to memory R-165 of decimator one R-150 from the central or primary control C-104. Accordingly, primary control C-104 can program memory R-165 and can select from the values programmed into memory R-165 in order to operate decimator one R-150. Alternatively such values can be permanently pre-stored in a memory such as memory R-165, with the primary control C-104 selecting among the pre-stored values depending upon the processing mode in accordance with the above definition of programmable. Further, decimation factors other than those specified in Table 2 can be selected and allow decimator one to operate within the spirit and scope of the invention.

According to the Nyquist sampling rule, a real signal must be sampled by at least a factor of two over the highest frequency of the signal in order to be able to reconstruct the signal successfully. For the signals which are received by the digital multi-channel receive processor R-120, there is a significant frequency content above the signal nominal center frequency $F_0$, and at an oversample rate of four times $F_o$ (See Table 2), these frequencies are adequately sampled. In a preferred embodiment if the data from the ADC R-118 is already at four times $F_o$, no decimation is performed. Thus, one of the normal decimation modes of decimator one R-150 is that decimator one R-150 does not decimate at all. With a beam having a signal center frequency $F_c=F_o$ of 10 Mhz, and with a sampling frequency $F_s$ of 40 Mhz, then the output of decimator one R-150 without decimation would be 40 MHz, or four times oversampled. Data from the ADC R-118, which is sampled at greater than four times the receive signal nominal center frequency $F_0$, is down-sampled to four times the receive signal nominal center frequency $4F_0$, as is evident from Table 2. The decimation factors $K_{D1}$ are selected to accomplish this rate of decimation as a function of the ADC sampling rate $F_{ADC}$.

Accordingly, in this embodiment, the relationship between the decimation factor $K_{D1}$ for decimator one and the channel processing rate or center frequency $F_0$ and the ADC sampling rate $F_{ADC}$ is $K_{D1}=F_{ADC}/4F_0$ where $F_{ADC}=F_s$ or $F_s/2$.

It is to be understood that oversampling by less than or greater than a factor of 4 (and thus with different integer and/or rational decimation factors $K_{D1}$) can be accomplished by this present invention and be within the scope of this invention.

Further, for the filter one (h1) R-160 and the filter two (h2) R-162 the filter coefficients can be selected in order to cause these filters to operate in a bypass mode (i.e., without filtering) for each of the specified decimation factors. Such bypass operation may be utilized for diagnostic purposes. Additionally for maximum wide-band processing, filter one can perform no filtering.

TABLE 2

DECIMATION FACTORS FOR DECIMATOR ONE

| $F_0$ | $K_{D1}$ Decimation Factor | Decimator One Output Rate |
|---|---|---|
| $F_s/32$ | 8 | $4F_0$ |
| $F_s/16$ | 4 | $4F_0$ |

TABLE 2-continued

DECIMATION FACTORS FOR DECIMATOR ONE

| $F_0$ | $K_{D1}$ Decimation Factor | Decimator One Output Rate |
|---|---|---|
| $F_s/8$ | 2 | $4F_0$ |
| $F_s/4$ | 1 | $4F_0$ |
| $3F_s/8$ | 2 | $4F_0/3$ | ii. Time Delay Memory

As can be seen in FIG. 3a, the time delay profile across the aperture of a transducer is a function of both the transducer element position and the range of the object to be imaged from the transducer array. Generally, for the case where the scan line is steered straight ahead, more delay is applied in the center of the aperture (FIG. 3a) than is applied to the signals at the edges of the transducer array. This is due to the fact that it takes longer for the receive (return echo) ultrasound signals from the object to be imaged to reach the outer transducer elements than to reach the more central transducer elements or elements closer to the object to be imaged.

Also as shown in FIG. 5a for the case where the scan line is steered normal to the transducer array face, the reason that the time delay profiles are flatter as a function of range (or time to the object to be imaged) is that as the range increases to infinity, the distances from any particular transducer element to the object to be imaged converge to equal values reducing the need for time delays in order to properly sum the receive signals.

In a preferred embodiment, different time delay profiles are assigned to reference range boundaries of range zones (FIG. 3a and as explained below). The spacing between the reference range boundaries may be equal and/or unequal as desired. Further, it is to be understood that these time delays represent a coarse time delay applied to the signal as explained below, with a fine focusing time delay implemented as a phase shift applied by the complex multiplier R-156 (FIG. 10).

Tracking receive beams that are steered relative to the transducer aperture is a matter of changing the time delay profile with respect to the number of the transducer element and the range, as can be seen in FIG. 5b. Thus, by changing the time delay profile which is applied to select time-indexed receive data from memory, the desired beams can be steered and focused.

It is to be understood that the time delay profile can be dynamically changed for every instance in time. Thus, any desired beam which is contained in the data can be tracked and formed out of the data stored in memory R-152.

Further emphasizing the computational flexibility of this digital receive beamformer system and referring to Table 1, if it is assumed that a single beam has a nominal center frequency $F_0$ of 10 Mhz, with a sampling rate $F_s$ of 40 MHz, then only one dynamically focused beam could be formed with a $\lambda_0/2$ spatial range resolution (BW Mode 3). If, however, the beam had a center frequency of 5 MHz, then there is sufficient computational bandwidth in the system such that two beams can be formed with $\lambda_0/2$ spatial range resolution (BW Mode 3). In a preferred embodiment, up to four time-interleaved data streams can be created from the data stored in memory R-152 by applying four sets of independent time delay profiles, one set for each beam. Other prior art systems are not as flexible and require a separate beamformer for each additional beam that is to be formed from data from the same transducer element. Such prior art systems do not have the ability to apply completely independent delay, phase and apodization values on a sample-by-sample basis for either single or multiple receive beams.

Thus, the present system affords a substantial hardware savings by not distinguishing between beams until the data is read out of memory R-152, and by efficient and maximum use of the computational capacity by a trade-off among the number of beams $N_B$ processed, the receive signal nominal center frequency $F_0$ for each beam, and the normalized per-beam relative spatial range resolution $\gamma_B/\lambda_o$.

iii. Decimator Two

The second decimator, decimator two R-154, is programmable and has a filter and decimation structure (variable rate decimation filter) that is similar to decimator one R-150, but uses programmable complex filter coefficients h3 for the third filter R-167. The third filter acts as an anti-aliasing, complex band-pass filter and selects the positive image frequencies, and filters out negative image frequencies and out-of-band noise. This process of filtering and decimating in R-154 can also, in a preferred embodiment, demodulate the signal to or near baseband and convert the signal to a complex quadrature signal pair of I (in-phase) and Q (quadrature).

As discussed below, with respect to the preferred embodiment the data output from decimator two represents data from one, two or four beams, with the data representing two or four beams being time interleaved. As demonstrated in the Tables 1, 2 and 3, decimator two R-154 is where the receive sample bandwidth trade-off becomes most evident and the spatial range resolution is finally determined through the selection of the decimation factor $K_{D2}$.

Memory R-171 (FIG. 10) is programmable (as the term programmable is defined above) by central control C-104 with multiple complex filter coefficients and multiple decimator factors. The filter coefficients and decimator factors are programmed by the central control C-104 in accordance with the particular imaging task to be accomplished in the digital multi-channel receiver.

TABLE 3

DECIMATION FACTORS FOR DECIMATOR TWO

| Decimator Two Modes | $K_{D2}$ Decimation Factor | Decimator Two Output Rate $R_o$ |
|---|---|---|
| BW Mode 1 | 1 | $4F_0$ |
| BW Mode 2 | 2 | $2F_0$ |
| BW Mode 3 | 4 | $F_0$ |
| BW Mode 4 | 8 | $F_0/2$ |
| BW Mode 5 | 2 | $2F_0/3$ |
| BW Mode 6 | 4 | $F_0/3$ |

The relationship of the decimation factor of decimator two to the nominal center frequency $F_0$ defines the output sampling rate $R_o$ as set out in Table 3 where $K_{D2}=4F_0/R_o$ for Bandwidth Modes 1 to 4 and where $K_{D2}=4F_0/3R_o$ for Bandwidth Modes 5 and 6.

Accordingly, it is evident that as the decimation factor goes down to a smaller value, the sample rate per beam increases with the decimator two R-154 working at a constant full maximum capacity in all situations. Thus, this preferred embodiment uses decimator two R-154 in order to keep the computational rate at a maximum constant.

From the above, it is evident that the beamformer processor R-120 decimates the signal to the lowest rate for maximum computational efficiency consistent with the number of beams utilized and spatial range resolution requirements.

Thus, it is evident that the above receive signal processing architecture provides for (1) a variable time delay memory, and (2) a second programmable decimator which affords the above advantage with respect to full and maximum signal processing computational bandwidth utilization. The relationship among (1) receive signal nominal center frequency $F_0$, (2) receive signal spatial range resolution $\gamma_B$, and (3) the number of simultaneously received beams $N_B$, can be programmed with decimation factors with respect to the decimators and in particular the second decimator, and with respect to the application of time delay values to the memory in order to distinguish between beams. Such advantages are independent of where signal demodulation occurs in the signal path.

iv. Complex Multiplier

Complex multiplication to handle the complex phase rotation for fine time delay is very computational intensive; however, at this point in the signal path the signal is decimated down to the lowest sample rate in the signal path, and thus complex multiplication can be handled very efficiently.

The complex multiplier R-156 accomplishes true complex multiplication with a cross-multiplication as explained below.

In the complex multiplier R-156 signal demodulation to or near baseband occurs in order to account for verniering of $F_o$ to $F_c$. However, as explained above such demodulation to or near baseband, when for example there is no verniering of $F_o$, can occur at other locations in the signal path, such as decimator two, and be within the spirit and scope of the invention.

In the complex multiplier R-156, a weighting term which is a function of the apodization value and the focusing phase shift (corresponding to a fine time delay) is multiplied by the signal input from decimator two R-154. The apodization value and the phase shift value can change dynamically on a sample-by-sample, per receive processor, per beam basis. Thus, these values can dynamically vary across the aperture of the transducer as well dynamically vary in time (See FIG. 3a). These values are supplied by the central control system C-104, which is the subject of the above referenced patent application, and the local processor control C-210.

In FIG. 10, the preferred embodiment of the complex multiplier R-156 is conceptually shown with a complex I/O signal sample multiplied in multiplier R-210 by a complex phase value and real apodization value which are combined in a complex multiplier R-260. The complex multiplier R-210 is preferably accomplished by four real multiplication operations performed by a time shared Booth multiplier. Alternatively a separate phase multiplier and a separate apodization multiplier can be used in order to focus the signal. In yet another embodiment, the separate phase multiplier can be implemented with a Cordic multiplier, and the separate apodization multiplier can be implemented by a Booth multiplier.

The output of the complex multiplier R-156 is represented as follows:

Y=Acosφ·I−Asinφ·Q+j (Acosφ·Q+Asinφ·I)

where I+jQ is the input channel sample signal to complex multiplier R-156, A is the apodization value and φ is the phase shift value.

It is evident from the above and in particular with respect to the memory R-152 and complex multiplier R-156, that the present invention implements true dynamic focusing and dynamic apodization as each data sample per beam per receive processor can be modified dynamically with delay values, phase values and apodization values as supplied by the central control system and local processor control systems. Thus, the present invention is capable of using instantaneous delay, phase and apodization values calculated by the central control system for every data sample.

As indicated above, the complex multiplier as well as the rest of the functional blocks of FIG. 10 are preferably implemented in high speed digital hardware. It is within the spirit and scope of this invention, however, that such functional blocks as, for example, for the complex multiplier, can be implemented in software with general purpose microprocessors and in a different computational order and with different algorithms other than specified above. By way of example only, in the complex multiplier the apodization value could be multiplied after the complex I and Q multiplication occurs. Further, the prior art describes other methods of implementing a complex multiplier.

b. Per Channel Local Processor Control System

Secondary or local processor control C-210 (FIG. 10) for the digital multi-channel receiver R-101, receives control data from the primary or central control C-104. The secondary or local processor control C-210 includes a controller and I/O processor C-260, a calibration processor C-262, a memory address and delay processor C-264, a phase and frequency processor C-266, and an apodization processor C-268.

The local processor control C-210 is responsible for providing to the digital multi-channel receive processor R-120 frequency values (i.e. demodulation frequency, phase correction frequency, and receive signal nominal center frequency $F_0$, delay values, phase shift values, apodization values and calibration values per digital receive sample and per beam as discussed in detail below. The central control system C-104, as discussed in the above-referenced patent application, is responsible for providing to the local processor control C-210 the following: (1) filter coefficient programming (in line with the definition of programmable above), decimation factor programming, and calibration value programming per imaging mode, (2) frequency parameters as specified below per scan line and per beam, (3) delay and apodization values per dynamic range zone and per beam and (4) delay interpolation/extrapolation coefficients per sample. The local processor control C-210 also controls the sampling rate of the ADC R-118.

i. I/O Processor

With respect to the secondary or local control C-210, the controller and I/O processor C-260 controls all of the read and write operations.

ii. Memory Address and Delay Processor

In a preferred embodiment, the memory address and delay processor C-264 calculates an interpolated and/or extrapolated delay value for each output sample of each beam of its associated beamformer processor R-120, using zone boundary delay values and the interpolation and/or extrapolation coefficients ($\alpha_{range}$) which are provided by the central control C-104 through a primary delay processor of a focus control C-132. The zone boundary delay values are defined for example by delay profiles (FIG. 3a) at specified range boundaries. The coefficients, $\alpha_{range}$, allow for interpolation (and/or extrapolation) in range between (and/or outbound of) the delay profile boundaries in order to increase the density of delay values between the range boundaries. As can be appreciated, each digital multi-channel receive processor R-120 has a memory address and delay processor C-264 associated with it in order to afford the dynamic focusing of the invention. For multiple beam operation, delay interpolations are time interleaved.

The delay processor C-264 performs local interpolation/extrapolation in order to increase the density of the sparse, decimated delay profile data set communicated to the memory address and delay processor C-264 from the focus processor C-132 of the central control C-104. After the interpolation/extrapolation step in Memory Address And Delay Processor (FIG. 10), the delay value is divided with the most significant bits (coarse delay) being sent to the time delay memory R-152 in order to facilitate the selection of samples for desired beam or beams. The least significant bits (fine time delay) of the time delay value is sent to the phase and frequency processor C-266 where it is turned into a phase value as described more fully hereinbelow.

Alternative embodiments can have less than a one-to-one relationship between beamformer processor R-120 and memory address and delay processor C-264 and be within the spirit of the invention. Further, such coefficients $\alpha_{range}$ can be locally generated by the memory address and delay processor C-264. Further it is to be understood that still different delay value generation schemes can be employed and be within the spirit of the invention. By way of example, an accumulator structure similar to accumulator C-272 of the local apodization processor C-268 can be used to generate appropriate delay values.

iii. Phase and Frequency Processor

The phase and frequency processor C-266 (FIGS. 10, 11) of local or secondary control C-210 generates demodulation phase values (to, for example, account for the verniering of $F_o$ by the transmit beamformer system), and also phase shift correction values determined by the central control system C-104. The demodulation phase values are ideally calculated as an integration of the demodulation frequency (FIGS. 13a, 13b and 13c) generated from the frequency profile generator C-141. As hardware that accomplishes such integration is expensive, the demodulation phase values are preferably calculated as the sum of (1) a product, computed in multiplier C-140 of the demodulation frequency specification profiles $f_D(t)$ FIGS. 10d, 10e, and 10f, from the frequency profile generator C-141 and a demodulation reference time from the memory address and delay processor C-264 synchronized with the input of data to the delay memory R-152 and (2) a constant value added by adder C-141, as more fully explained below.

The fine focusing phase correction values, as computed in multiplier C-138, are the product of the instantaneous phase correction frequency $f_p(t)$ from the frequency profile generator C-141 (FIGS. 13a, 13b and 13c) and the residual or fine delay time (LSBs of delay time) from the memory address and delay processor C-264. Both the demodulation frequency and the phase correction frequency used in computing the focusing phase values are computed by choosing, in a preferred embodiment, one of the respective frequency profiles generated in the frequency profile generator C-141. The two phase values, the fine phase shift value and the demodulation phase value are added by summer C-142 and communicated to a look-up table C-144 where the phase value is converted into a complex I/Q value.

In a preferred embodiment all demodulation to or near baseband occurs in the complex multiplier. However, in other situations such as by way of example only, where there are frequency offsets, such demodulation can occur alternatively in decimator two through the use of complex filter coefficients with residual demodulation occurring in the complex multiplier. Such frequency offsets can, by way of example only, result when the carrier frequency is verniered from the receive signal nominal center frequency $F_0$ by the above referenced digital transmit beamformer system T-100. Such verniered center frequency can be the same for all beams transmitted from the transmit beamformer T-100 or different for each of multiple transmit beams.

The frequency profile generator C-141 (FIG. 11) is essentially an accumulator in which output samples over time, which are representative of the frequency profiles, as summed.

The frequency for demodulation and for phase shift or rotation can be independently programmed in order to select one of the following three frequency-vs-time profiles:

(1) The frequency remains at a constant start frequency $F_{start}$ (generally the carrier frequency $F_c$) which is time independent as shown in FIG. 13a; or (2) The frequency is shifted down from the start frequency ($F_{start}$) by downshift slope $\Delta F_{downslope}$, until it either: (a) saturates at a constant limit frequency, $F_{limit}$, in one embodiment, or (b) reaches a specified time limit, $T_{break}$, and thereafter remains at a constant frequency as shown in FIG. 13b; or (3) The frequency is first shifted down from the start frequency, $F_{start}$, by a downshift slope, $\Delta F_{downslope}$, until it either: (a) saturates at a constant limit frequency, $F_{limit}$, in one embodiment, or (b) reaches a specified time limit, $T_{break}$, and thereafter is immediately shifted up by an upshift slope, $\Delta F_{upslope}$, until the frequency either: (a) saturates at the start frequency, $F_{start}$, or (b) is allowed to continue without saturating at the start frequency (FIG. 13c).

Both the demodulation frequency, $f_D(t)$, and the frequency $f_P(t)$ applied to generate the focusing phase shift value, can be selected from any of the above similar frequency profiles. Thus, the same profile can be applied to both multipliers C-138 and C-140. Different frequency profiles can also be applied to these multipliers and fall within the scope of the invention.

These profiles model frequency attenuation of ultrasound signals transmitted through tissue. Thus, for example, the longer that a broadband signal is propagated through tissue, the more that the center frequency of the signal will be downshifted due to such attenuation. In this embodiment, all the profiles began at frequency $F_{start}$. This frequency can be the carrier frequency $F_o$ of the receive beam. It is understood that although the transmit carrier frequency and the corresponding receive carrier frequency can be the same, there is no requirement that they are in fact the same. Accordingly, the start frequency of the frequency profiles can be that of the center frequency of the receive beamformer should it be different from that of the center frequency of the transmit beamformer. Accordingly $F_{start}$ can be any value. However, $F_{start}$ is preferably the transmit carrier frequency $F_c$ which is equal to the vernier factor times the center frequency, $vF_o$.

The parameters for defining the above frequency profiles are stored in the central control C-104. The frequency profile generator C-141 of the phase and frequency processor C-266 receives these parameters and calculates the frequency values on a receive-sample-by-receive-sample basis. These frequency values define the frequency profiles of FIGS. 13a, 13b and 13c.

For one embodiment, the parameters downloaded from the central control and programmed into the local control include the start frequency, the frequency limit, the frequency downslope, and the frequency upslope. As indicated above, the start frequency is generally the carrier frequency $F_c$. The frequency limit is the lowest frequency value used for the above calculations. It is understood that the numbers stored in the central control C-104 can be updated at any time based on new data which can, for example, be introduced and stored on the central control C-104 for example, from hard disk memory.

In another preferred embodiment, the downloaded parameters include the start frequency, the break time, $T_{break}$, the frequency downslope and the frequency upslope. In this embodiment, the downslope is limited not by a limit frequency but by time, $T_{break}$. Thus, the frequency profile in FIG. 13c is allowed to slope down until the $T_{break}$ has expired. At that point, the frequency profiles slopes up.

Preferably, the phase and frequency processor C-266 calculates all profiles simultaneously and then the central and/or local processor control selects the frequency profile, based on criteria pre-stored in the central control C-104, for each imaging mode, to calculate a demodulation phase value and a residual time delay phase value in order to provide the most optimally enhanced image.

Additionally, it is understood that in a multiple beam situation, each of the beams can be received with a different carrier frequency, $F_c$. The central processor could, for example, select different frequencies, slopes, and time limits for each of the beams in order to provide for an enhanced image. In such a situation, the start frequencies for each of the above three frequency profiles would depend upon the frequency for the particular beam formed by the beamformer processor. Thus the frequency profiles for each beam could be specified with entirely different parameters.

As indicated above, as preferably implemented, the demodulation phase value is the sum of (1) a product in multiplier C-140 of the demodulation frequency $f_D(t)$ (FIGS. 13d, 13e, and 13f) from the frequency profile generator C-141 and a demodulation reference time t from the memory address and delay processor C-264 and (2) a value added by adder C-141. If the reference time t is given by $0 \leq t \leq T_{break}$, then multiplexer C-143 causes t to be multiplied by $f_D(t)$ at multiplier C-140 and multiplexer C-145 causes a zero value to be added by adder C-141. Accordingly, the demodulation phase value is $f_D(t) \cdot t$. If, on the other hand, the reference time t is given by $T_{break} \leq t$ then multiplexer C-143 causes $t - T_{break}$ to be multiplied by $f_D(t)$ and multiplexer C-145 causes the constant value $f_D(T_{break}) \cdot T_{break}$ (see discontinuities in FIGS. 10e and 10f) to be added to the result. Accordingly, the demodulator phase value is $f_D(t) \cdot (t - T_{break}) + f_D(T_{break}) \cdot T_{break}$.

iv. Apodization Processor

The apodization processor C-268 (FIG. 11) obtains a sparse table of range bounded apodization values from the focus processor C-132 of the central control C-104. Also obtained from the central control C-104 is the zone width $2^B$ between the range bounded apodization value, which zone width is specified by a value B. If one zone boundary apodization value is $A_1$ and the other zone boundary apodization value is $A_2$, then the accumulator C-272 (FIG. 11) of apodization processor C-268 can generate incremented apodization values between $A_1$ and $A_2$ by preferably adding $$\frac{A_2 - A_1}{2^B} \tag{34}$$

to the accumulated apodization values (with the starting value being $A_1$). Accordingly, apodization values are generated every $2^B$ intervals between $A_1$ and $A_2$ in order to fill out the sparse data set sent by the central control. This above operation is implicitly a linear interpolation. However, non-linear techniques can also be implemented as well as extrapolation techniques.

Alternatively, it is to be understood that local apodization processor C-268 can internally calculate the interpolation/extrapolation range coefficients in a local range coefficient generator based on scan geometry parameters supplied from the central control C-104. These parameters define the particular scanning format that is being used. Further in still other embodiments such apodization interpolation/extrapolation coefficients can be pre-stored in the central control and downloaded to the local apodization processor.

The apodization processor C-268 calculates an interpolated/extrapolated apodization value for each output sample of each beam. To support multiple beam operation, the apodization processor C-268 interleaves interpolation/extrapolation calculations. As with the delay values, the apodization values, if desired, can be modified by supplying the apodization calibration values from the calibration processor before the apodization value is applied to the complex multiplier.

The complex value representation of the phase shift and the apodization values, multiplied together in multiplier R-260, are sent to the complex multiplier R-156 to be multiplied with the complex sample signal value.

v. Calibration Processor

The calibration processor C-262 is activated when a scan format or transducer is changed. During calibration, a common calibration signal from, for example, the transmit beamformer system T-100 is injected into all receive channels. The component tolerances in analog circuitry prior to digitization in ADC R-118 can result in analog-path-to-analog-path signal variances. The local calibration processor compares the output signal to a fixed calibration reference value which is stored in the local calibration processor. The local calibration processor computes delay and apodization correction values for the local control in order to drive the difference between the output signals and the reference signal to zero through an iterative process.

These correction values are sampled on an analog signal path basis and supplied by the calibration processor C-262, with respect to magnitude, to the apodization processor C-268 and, with respect to delay and phase, to the memory address and delay processor C-264.

For operations including, by way of example only, sliding aperture, random aperture and synthetic aperture, multiple fixed calibration reference values can be stored.

In addition to the above locally computed calibration values, calibration values can be downloaded from the central control. For example, calibration values for each type of transducer can be pre-stored in central control or provided to central control when a new transducer is selected. Such calibration values can then be downloaded to the local calibration processor to be combined with the locally generated calibration values, if appropriate.

c. Baseband Multi-Beam Processor i. Baseband Filter and Phase Aligner

The complex baseband signal (or signals in the multiple beam case) from the digital multi-channel receive processors R-120 which represent the summation of all the signals from the elements sampled across the face of the transducer, is communicated to a baseband filter and phase aligner block R-127. Block R-127 includes a baseband filter R-250 (FIG. 12) which performs filtering and rational sample rate conversion (interpolation and decimation). Block R-127 also includes a phase aligner R-252 (FIG. 12) which provides for (1) scan-line-dependent and range-dependent phase adjustments of the signal required to correct for phase differences resulting from line-to-line apodization changes, scan geometry, and non-aligned effective transmit and receive origins, (2) remodulation (frequency alignment) of the signal to correct for phase differences resulting from different transmit frequencies per scan line, and (3) gain adjustment per scan line. The advantage of the use of a scan-line-to-scan-line variable frequency mode on transmit and receive beamformation is the reduction of grating lobes (see co-pending application entitled: METHOD AND APPARATUS FOR ADJUSTABLE FREQUENCY SCANNING IN ULTRASOUND IMAGING, which discusses a scan-line-to-scan-line variable frequency mode).

Such phase alignment and remodulation between desired scan lines and particularly two or more adjacent scan lines is, for example, for purposes of implementing coherent image processing techniques as described in the above co-pending application entitled: METHOD AND APPARATUS FOR COHERENT IMAGE FORMATION.

Thus, the purpose of the phase aligner is to maintain scan-line-to-scan-line coherency for (1) adjustable frequency operation, (2) synthetic scan line operation, as well as for (3) synthetic aperture operation, and (4) future operations on coherent beam samples.

Baseband filter R-250 preferably includes a multi-tap FIR filter which is programmable with both real and complex coefficients h4, and a rational sample rate converter. The rational sample rate converter includes an interpolator which has an integer upsampling factor L and a decimator with an integer down sampling factor M. Baseband filter R-250 accordingly accomplishes the following tasks.

First, baseband filter R-250 increases the signal-to-noise ratio by rejecting out-of-band noise frequencies, and/or maximizing the signal-to-noise ratio with a matched filter or quasi-matched filter design, preferably for matching to substantially Gaussian transmit pulses as well as pulses of other shapes. Gaussian pulses are especially useful as they represent waveforms that do not distort during transmission through attenuative media such as the body.

Second, baseband filter R-250 enables pulse equalization and shaping by compensating for both the transducer frequency response and the analog signal path prior to the ADC R-118.

Third, baseband filter R-250 performs a sample rate conversion (decimation function) based upon the rational (non-integer) decimation factor L/M (where L and M are integers). Accordingly, the sample rate is converted to a rate that is advantageous for an image display.

Examples of such decimation can be found in the references identified with the above discussion of decimator one and decimator two. The filter coefficients and non-integer decimation factors for baseband filter R-250 are programmed into baseband filter/phase aligner R-127 by being downloaded from the central control C-104 to coefficient and rate memory C-278. The downloaded coefficients and factors can be changed at any time by introducing new coefficients and factors into the central control C-104. The coefficients and factors stored in the coefficient and rate memory C-278 are selectable by the central control C-104 for programming the filter and decimation ratio L/M of the baseband filter R-250.

The complex multiplier R-254 of phase aligner R-252 operates in a manner similar to complex multiplier R-156 (FIG. 10).

Following complex multiplier R-254 is a register C-296 which stores scan line sample data so that it can be reported to the DMA processor C-202 of the central control C-104 for providing scan-line-to-scan-line calibration.

ii. Baseband Processor Control

Figure 12:
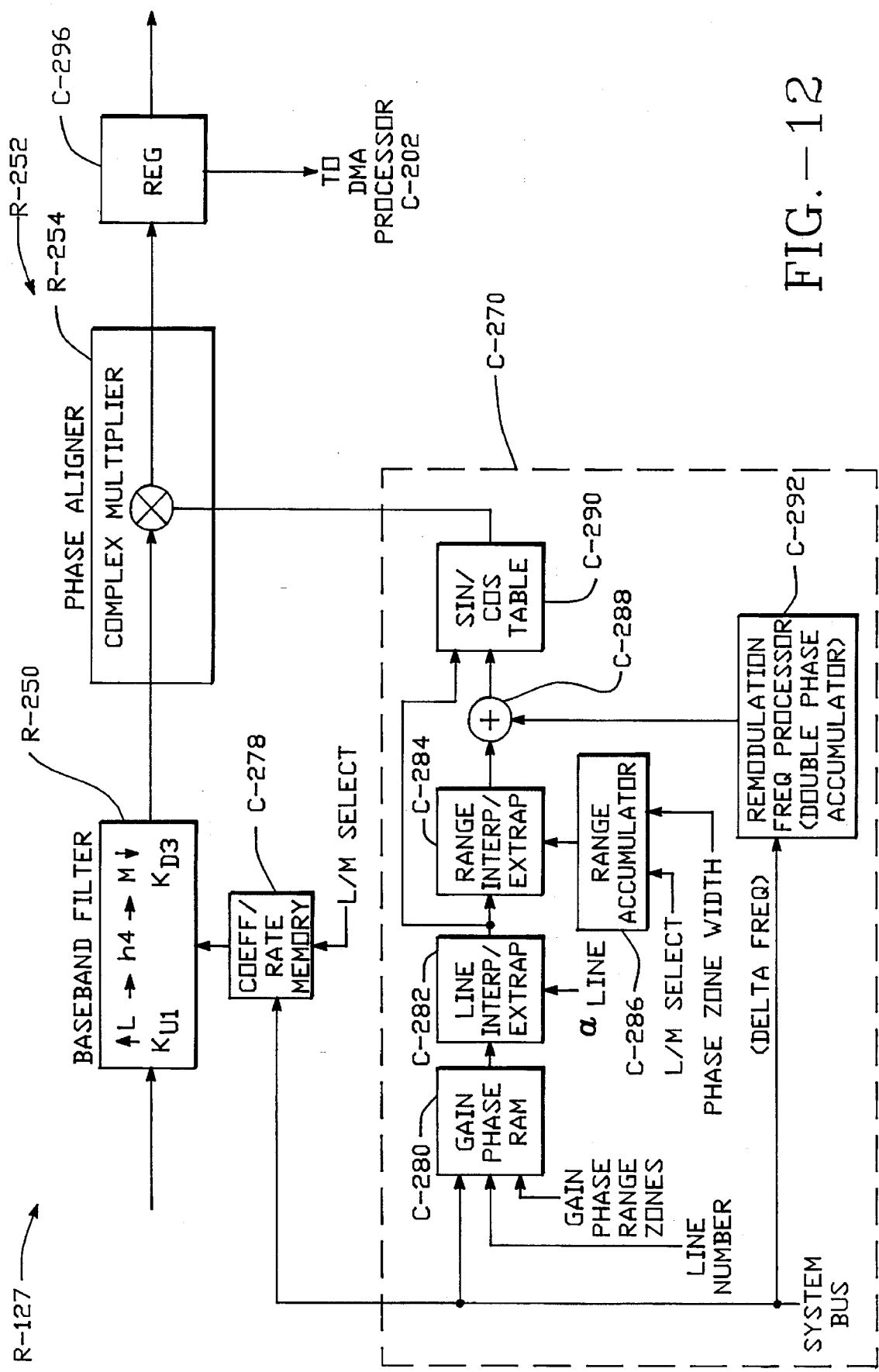
FIG. 12 is a block diagram schematic of an embodiment of a phase aligner of the invention which provides for phase alignment among receive scan lines in conjunction with a sample rate converter, and a phase aligner (gain, phase and frequency) control processor.

The phase aligner includes a control function which is contained in a baseband processor control C-270 (FIG. 12). In this baseband processor control C-270, a scan-line-to-scan-line or beam-to-beam gain adjustment value and a phase adjustment value are generated in a time interleaved manner. As discussed above, the phase correction value is the sum of the phase terms including: (1) a phase adjustment term required to correct for phase differences due to scan-line-to-scan-line apodization changes, and scan geometry which results in non-aligned effective transmit and receive origins (the scan-line-dependent and range-dependent phase adjustment term) and (2) a phase term required to remodulate the signal as though each line had used a common carrier frequency. As discussed herein and in co-pending U.S. patent applications entitled: METHOD AND APPARATUS FOR TRANSMIT BEAMFORMER SYSTEM and METHOD AND APPARATUS FOR ADJUSTABLE FREQUENCY SCANNING IN ULTRASOUND IMAGING, using a frequency scaling factor or frequency vernier factor, each beam can have a different carrier frequency. The phase aligner accordingly provides for remodulation between beams so that all beams are adjusted for differences in carrier frequencies.

In operation a source data set including scan format geometry parameters, sparse scan line gain and delay value, interpolation coefficient and non-integer decimation factors are downloaded from the central control C-104 to the baseband processor control C-270. Additionally, frequency parameters used in the frequency profile generator of the central control C-104 in accordance with FIGS. 13a, 13b and 13c are downloaded to the baseband processor control C-270.

Figure 11:
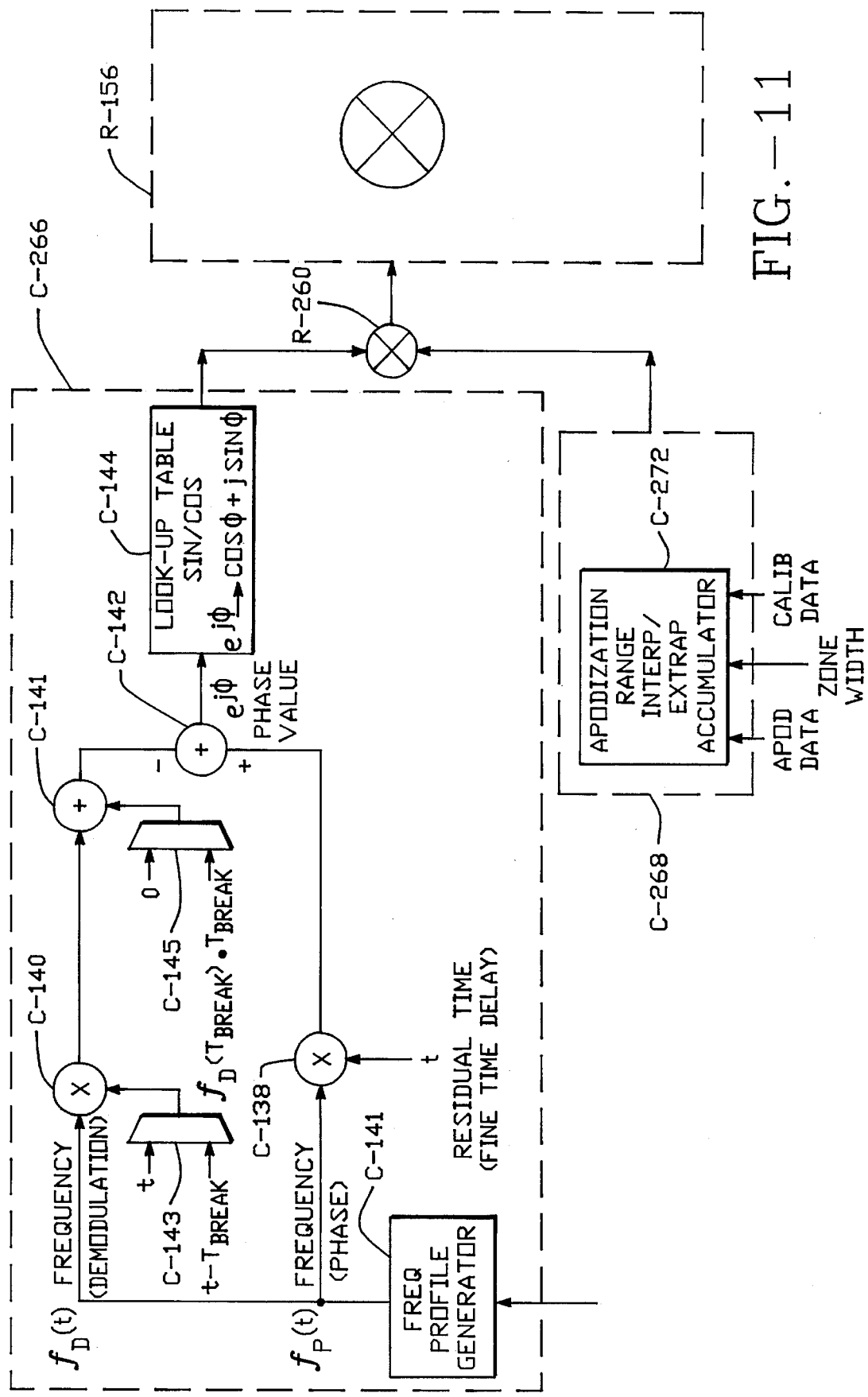
FIG. 11 depicts a schematic of an embodiment of the complex multiplier, and the phase and frequency processor and the apodization processor of the local beamformer control of the invention.

The baseband processor control C-270 of FIG. 12 includes a gain and phase RAM C-280, a line interpolator C-282 which is supplied with pre-calculated and pre-stored line interpolation coefficients ($\alpha_{line}$) by the central control C-104, and a range interpolator C-284 with a range accumulator C-286, which is supplied with a rational decimation factor L/M and a phase zone width, both of which values are pre-calculated and pre-stored in the central control C-104. The rational decimation factor L/M is the same value supplied to the baseband filter R-250. Accumulator C-286 operates in the same manner as does accumulator C-272 of the local apodization processor C-268 (FIG. 11). Additionally as is known in the art a sample rate conversion in accordance with the rational decimation factor L/M is accomplished in order to match the sample data rate of the baseband filter R-250.

Alternatively the range interpolator/extrapolator C-284 can be supplied with programmable (as defined above) interpolation/extrapolation coefficients which are, by way of example, either (1) pre-calculated and pre-stored in or calculated by the central control or (2) calculated locally in baseband processor control C-270 by a coefficient generator.

The baseband processor control C-270 also includes a remodulation frequency processor C-292 which is preferably implemented as a double phase accumulator. The double phase accumulator calculates phase adjustment values to correct for line-to-line frequency differences and thus to remodulate the signal as though a common carrier frequency had been used across all scan lines.

From the central control C-104, pre-calculated and pre-stored values representing the frequency differences between scan lines (delta frequency values) are sent to the remodulation frequency processor C-292. These frequency difference values are based on frequencies and frequency slopes such as specified in FIGS. 13a, 13b and 13c. By way of example only, let it be assumed that the frequency profiles for two scan lines look like FIG. 13b but with different start frequency, $F_{start}$, values and different downshift slope, $\Delta F_{downslope}$, values. Accordingly, downloaded to baseband processor control C-270 from the central control for the two scan lines are the difference in frequencies between the scan lines and the difference in the rate of change of the frequency profiles over time. These values are calculated by the acquisition processor C-130 based on stored parameters and dependent upon the particular rational conversion factor L/M currently being used. The first accumulator of processor C-292 accumulates the difference in the rates of change of the frequency profiles over time between scan line while the second accumulator accumulates the difference in the frequencies between the scan lines over time. If there is no difference in the rate of change of the frequency profile over time, (i.e. the profile are the same exact for initially different $F_{start}$ values, or after $T_{break}$ in FIG. 10b when the slope goes to zero) the first accumulator performs no function. With no difference in the rate changes of the frequencies between the scan lines, only the second accumulator accumulates the frequency differences over time resulting in a corrective remodulation phase value.

The phase adjustment due to scan-line-to-scan-line apodization changes, scan geometry which results in non-aligned transmit and receive origins, and the phase adjustment due to remodulating the signal to an effective common carrier frequency are added in a summer C-288 and the summed phase value is then converted in a look-up table C-290 to sine and cosine representations. As part of the look-up table C-290 function, the gain is multiplied by the sine and cosine representations. This value is applied to complex multiplier R-252.

It is to be understood that other embodiments of the baseband processor control are possible within the scope of this invention.

As indicated above the phase aligner R-127 ensures that coherent signal and sample relationships are maintained between scan lines. The transmit samples and the echo or receive samples of the signals from beams are defined as being coherent when sufficient information is stored, preserved, or maintained to enable the samples of the return signals to be phase and amplitude corrected from scan-line-to-scan-line. The process of actually making the phase and amplitude corrections need not have yet taken place, as long as sufficient information with respect to a reference is maintained.

When a signal sample is processed coherently, the processing continues to maintain sufficient information to perform phase and amplitude correction at a later time. When two or more samples are processed coherently (e.g., coherently summed), the phase and amplitude corrections necessary for phase and amplitude alignment must have previously been performed.

Coherent processing of two or more signal samples yields significant benefits, such as being able to calculate synthetic samples, as described in the above co-pending application.

Due to the beamformer control C-104 specifying and accounting for all aspects of the transmit and receive signal, the entire system maintains all signal samples as coherent samples throughout the transmit and receive signal path, until the signal is finally detected in an operation which is external to beamformation.

It is to be understood that although scan-line-to-scan-line phase alignment is accomplished by baseband filter/phase aligner R-127 after beamformation, that such phase alignment can be provided prior to beamformation in the digital multi-channel receive processor R-120. By way of example, such phase alignment can be accomplished in each complex multiplier R-156 of each processor R-120.

iii. Calibration Processor

The calibration processor C-262 of the local control can be engaged as desired by the user. Essentially, calibration processor C-262 is turned on when a scan format or transducer is changed. During calibration, a calibration signal is transmitted by the digital transmit beamformer system target and the signal received by the digital receive beamformer system. As can be appreciated, prior to the ADC R-118 there is analog circuitry. This analog circuitry can introduce channel-to-channel variances due to, for example, frequency attenuation and phase shift.

These variations are sampled on a channel-to-channel basis and supplied by the calibration processor C-262 to the control and I/O processor C-260 and therefrom applied to the memory address and delay processor C-264 and the apodization processor C-268 for each channel. As these variations affect magnitude and phase, calibration correction values are supplied with respect to magnitude to the apodization processor C-268 and with respect to phase to the memory address and delay processor C-264. Such calibration processing occurs locally and simultaneously across all receive channels.

There are principally two methods for calibration (1) transmit calibration and (2) receive calibration.

Transmit calibration is accomplished by routing each transmitter output sequentially through a common receive channel which filters and demodulates the signal. A complex sample at the phase aligner output is read by the DMA processor for each channel. A calibration software algorithm (DMA processor) is used to compute the channel-to-channel amplitude and phase variations. These calibration values are then written to respective PWG apodization and delay calibration registers.

Receive calibration is accomplished by routing a common transmit signal to all receive channels simultaneously. Each receive channel has a local feedback loop which monitors the channels. I/O outputs and tries to set the output to $FS/_2$ and $Q=\theta$ by adjusting iteratively the current value of the apodization and delay calibration values. This should be much faster than transmit calibration, since all channels are calibrated simultaneously and dedicated HW is used to compute the calibration values.

iv. Calibration for Transducers

In addition to analog path calibration, there is the capability to also include pre-measured calibration values associated with the transducer. These values are read by the acquisition processor and written to registers on the PWG and beamformer processor. Registers are available both for apodization and delay calibration.

3. Digital Transmit Beamformer System Per Channel Local Control a. Signal Processing

In the preferred embodiment, the transmit beamformer T-102 includes a substantially independent waveform generating processor for each transmit element. Transmit processors T-104 are referred to herein as multichannel processors because each of the individual transmit processors can provide multiple, programmable complex envelope waveform generation. A substantially continuous range of imaging frequencies is supported.

Overall, each transmit processor performs the primary functions of (1) waveform shaping of one or more waveforms for one or more beams, (2) apodization, and (3) insertion of steering/focusing time delays for such waveforms. To perform waveform shaping for a PW transmission, the signal path begins with initial waveform samples at a rate $R_E$ below that of the DAC T-121 sampling frequency $F_s$. The initial waveform samples can have a frequency spectrum centered at 0 Hz, or can be offset from 0 Hz. Waveform shaping in the present embodiment involves the steps of upsampling the initial waveform samples to $F_s$, as well as modulating the waveforms by the desired carrier frequency $F_c$. Amplitude weighting (apodization) can also be considered part of the waveform shaping operation. The steps of upsampling, modulating, apodizing and delaying, as well as appropriate filtering, can be performed in any sequence in a digital transmit beamformer, and individual ones of these steps may even be divided into sub-steps which are separated and performed at different parts of the signal path. Additionally, some steps or sub-steps may be combined for implementation in a single hardware unit.

Note that the output carrier frequency is considered herein to be substantially the same as the desired programmed carrier frequency $F_c$, but may not be identical because of filter effects in the signal path. $F_c$ is set by the central control system C-104 through the download of parameters.

i. Transmit Processing Modes

Before describing the functional blocks in a digital multichannel transmit processor of the preferred embodiment, it will be useful to understand the various processing modes (not to be confused with imaging modes discussed above) in which each transmit processor can operate. Ideally, it would be desirable for each transmit processor to be able to produce waveforms for any number of superposed and separately delayed and apodized transmit beams up to some maximum, at any carrier frequency up to some maximum, specified with initial waveform representations sampled at any sample rate up to some maximum. This would require extensive processing power, however, especially if the maximums are large. Since processing power is limited in any system, it would seem that these maximums must be kept low enough such that the hardware is able to keep up when all three parameters are specified at maximum. The present embodiment, on the other hand, makes better use of the available processing capacity by permitting trade-offs among these three parameters and allowing the central control system to choose to optimize different ones of them depending on the clinical setting.

Table I sets forth some of the processing modes which can be selected by central control system C-104 for a given transmit processor T-104 of transmit beamformer T-102. Different embodiments can support fewer or greater numbers of modes and fewer or greater numbers of beams. As used in the Table:

$F_s$ is the system clock frequency at which samples are converted by the DACs T-121 (FIG. 2c). The central control system C-104 can select $F_s$ from a variety of available frequencies.

$F_0$ is a transmit signal nominal center frequency. $F_0$ is specified to the multichannel transmitter as a fraction of $F_s$, and is equal to (or near) the carrier frequency.

$R_E$ is the per-beam initial waveform sampling rate. The ratio $R_E/F_0$ represents the number of real or complex samples per period of the transmit signal nominal center frequency $F_0$, at which the initial waveform can be sampled.

$\lambda_0 = c/F_0$ = the acoustic wavelength at $F_0$.

c = the speed of sound in the body.

$\gamma_E$ = per-beam initial waveform sample interval = $c/2R_E$.

$N_B$ = maximum number of simultaneously-produced beams for the given transmit processing mode. (Note that the beamformer can be operated to produce fewer than $N_B$ beams if desired; for example, in a mode for which $N_B$=4, the beamformer can be operated to produce only three beams if desired, although this would not make full use of the available hardware processing power.)

N/I = Mode not implemented in the embodiment described herein.

TABLE I

| | TRANSMIT PROCESSING MODES | | |
|---|---|---|---|
| $F_0$ | $N_B = 1$ | $N_B = 2$ | $N_B = 4$ |
| $F_s/32$ | BW Mode 0 | BW Mode 1 | BW Mode 2 |
| | $R_E = 8F_0$ | $R_E = 4F_0$ | $R_E = 2F_0$ |
| | $\gamma_E = \lambda_0/16$ | $\gamma_E = \lambda_0/8$ | $\gamma_E = \lambda_0/4$ |
| $F_s/16$ | BW Mode 1 | BW Mode 2 | BW Mode 3 |
| | $R_E = 4F_0$ | $R_E = 2F_0$ | $R_E = F_0$ |
| | $\gamma_E = \lambda_0/8$ | $\gamma_E = \lambda_0/4$ | $\gamma_E = \lambda_0/2$ |
| $F_s/8$ | BW Mode 2 | BW Mode 3 | BW Mode 4 |
| | $R_E = 2F_0$ | $R_E = F_0$ | $R_E = F_0/2$ |
| | $\gamma_E = \lambda_0/4$ | $\gamma_E = \lambda_0/2$ | $\gamma_E = \lambda_0$ |
| $F_s/4$ | BW Mode 3 | BW Mode 4 | N/I |
| | $R_E = F_0$ | $R_E = F_0/2$ | |
| | $\gamma_E = \lambda_0/2$ | $\gamma_E = \lambda_0$ | |
| $3F_s/8$ | BW Mode 5 | BW Mode 6 | N/I |
| | $R_E = 2F_0/3$ | $R_E = F_0/3$ | |
| | $\gamma_E = 3\lambda_0/4$ | $\gamma_E = 3\lambda_0/2$ | |

As can be seen by reading horizontally across the Table, for each transmit signal nominal center frequency $F_o$, the hardware permits a larger number $N_B$ of superposed waveforms to be traded off against an increased per-beam initial waveform sample interval $\gamma_E$ and vice-versa. A larger $N_B$ translates into a higher frame rate (since the entire field of view can be scanned with the same number of beams but fewer firings), while an enhanced initial waveform sample interval $\gamma_E$ (smaller value of $\gamma_E$) can translate into a sharper image in range. For example, therefore, in a display mode which displays a color flow Doppler (F-mode) image superimposed on a grey-scale (B-mode) image, produced by interleaving F-mode and B-mode pulse firings respectively, the central control system C-104 may operate transmitters T-102 at $N_B$=1 for all B-mode imaging pulses and at $N_B$=2, or $N_B$=4, for color flow Doppler imaging pulses.

Similarly, reading vertically down the Table and excluding bandwidth modes 5 and 6, it can be seen that for a given maximum number of beams $N_B$, processing modes having a higher nominal center frequency $F_0$ also have a larger (and therefore poorer) per-beam initial waveform sample interval $\gamma_E$ (relative to $\lambda_0$). (The per-beam initial waveform sample interval $\gamma_E$, when expressed as the ratio $\gamma_E/\lambda_0$, is referred to herein as the frequency-normalized per-beam initial waveform sample interval.) A clinician typically selects a transducer array operable at the imaging frequency appropriate for a desired penetration. In doing so, the clinician trades off penetration for overall image resolution (ability to distinguish two targets). The latter trade-off is inherent in the physics of ultrasound since greater penetration is achieved by reducing the imaging frequency, which in turn reduces the overall image resolution.) For a given maximum number of beams $N_B$, the desired penetration determines $F_0$ in the Table, which in turn determines a processing mode having the optimum frequency-normalized per-beam initial waveform sample interval which the hardware can provide at the selected $F_0$. That is, as $F_0$ decreases to achieve greater penetration, the signal processing path in each transmit processor T-104 need not process as many samples per second per beam (at least at early stages of the signal processing pipeline). This leaves hardware processing capacity available, which the system can exploit by increasing $R_E/F_0$ and hence improving the frequency-normalized per-beam initial waveform sample interval $\gamma_E/\lambda_0$.

Further, by reading diagonally across the Table (upward to the right), and again excluding modes 5 and 6, it can be seen that the hardware permits a lower $F_0$ to be traded off for a larger number of beams $N_B$ at a constant frequency-normalized per-beam initial waveform sample interval $\gamma_E/\lambda_0$.

Described more generally, the modes with which the multichannel transmitter T-102 can be specified to operate actually offer trade-offs between three parameters: $N_B$, $F_0$ and $\gamma_E/\lambda_0$ (or equivalently, $R_E/F_0$). Thus each processing mode defines a parameter set $\{N_B, F_0, \gamma_E/\lambda_0\}$. All of the processing modes shown in Table I satisfy the rule that, for a given $F_s$, the product of the maximum number of beams $N_B$ and the transmit signal nominal center frequency, divided by the frequency normalized per-beam initial waveform sample interval, is constant. In addition, the following relationships hold:

$\gamma_E = 2 \cdot c \cdot N_B/F_s$ and $R_E = F_s/4N_B$.

Assuming each transmitter T-102 is operated to produce the maximum number of beams $N_B$ in the selected processing mode, all of the modes in Table I fully utilize the processing capacity of the transmit processor hardware signal paths. The preferred embodiment also supports additional processing modes not shown in Table I, and which do not fully utilize the processing capacity of the system. Furthermore, while modes 5 and 6 are included in Table I for completeness of the description, they are not important for an understanding of the invention and are therefore excluded from the remainder of the discussion below.

ii. Coarse Time Delay

Figure 14:
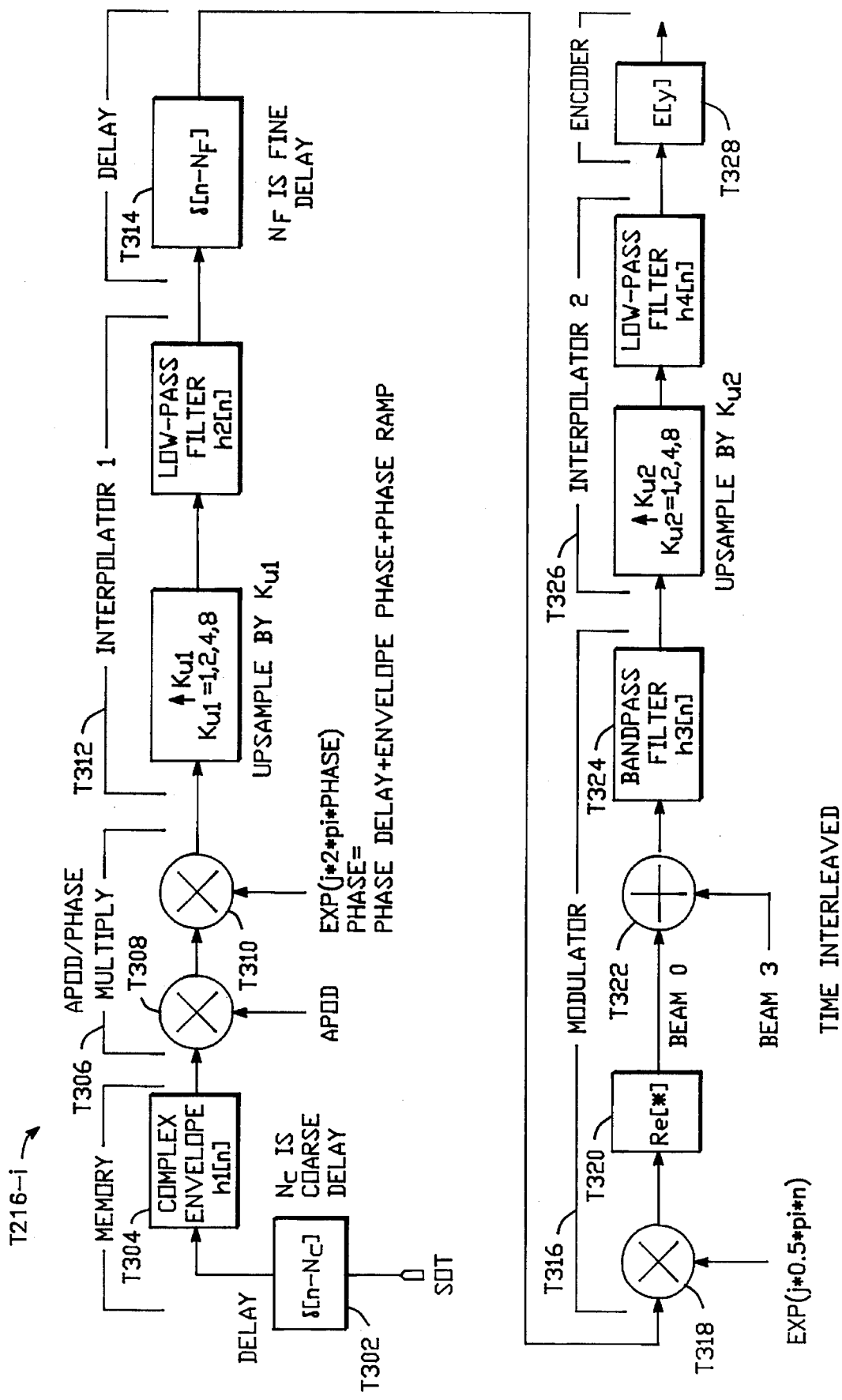
FIG. 14 is a schematical block diagram of the signal path of one of the digital multi-channel transmitters of FIG. 2c.

FIG. 14 is a functional block diagram of one of the digital multichannel transmit processors T-104. In this signal path, upsampling is accomplished in two sub-steps (interpolator 1 and interpolator 2). Modulation to the transmit carrier frequency $F_c$ is also accomplished in two sub-steps, and focusing is accomplished in three steps. The focusing function permits the waveform output produced by the transmitter for each beam to be delayed as necessary for beamforming, in accordance with a delay profile across all active processors. An overall delay word is provided for each beam by the central control system C-104 with a high precision and is expressed in integer and fractional sample units of $T_0=1/F_0$. The division of this value into three components in the preferred embodiment of the transmit processor T-104 involves roughly a separation of the delay word into three precision groupings. The high-order portion, down to a precision of one unit of envelope sampling time $T_E=1/R_E$, forms the coarse delay integer value $N_c$. The middle-order portion of the word, down to a precision of four units per nominal center-frequency period $T_0=1/F_0$, forms the fine delay integer value $N_F$. The remaining low-order bits of the delay word are used to calculate the phase portion $\phi_D$ of the delay, according to the formula $\phi_D=-2\pi v_{100} \tau_\phi$, where $\tau_\phi$ is the low-order portion of the delay word representing fractional units of $T_0$, and $v_\phi$ is the vernier frequency scaling factor $F_c/F_0$. Note that the transmit processor T-104 can also be programmed by the central control system C-104 to use an alternate value for $v_\phi$ if desired.

Referring to FIG. 14, the SOT (start-of-transmit; common for all transmit processors) signal triggers a coarse delay T-302, which delays the start of read-out of initial waveform samples by $N_c$ sample times at the sampling rate $R_E$ (period $T_E$). Thus the delay imposed by delay unit T-302 is $N_cT_E$ relative to the SOT signal.

iii. Initial Waveform Sample Memory

As can be seen in FIG. 14, the output of delay unit T-302 drives the read-out from memory T-304 of initial waveform samples. The output of initial waveform sample memory T-304 functionally is provided to one input port of a multiplexer T-305, the other input port of which receives a value of unity. For PW firings, the multiplexer selects the memory sample words to its output, whereas for generating a CW output, the multiplexer selects the constant unity input.

Waveform samples in memory T-304 may be real instead of complex, saving memory space because a complex value occupies two words, whereas a real value occupies one word. Preferably, the initial waveform is at baseband (at or near 0 Hz), in which case it represents the complex envelope of the transmitter output pulse. The only limitation on number of initial waveform samples is the total number of words available for storage in memory T-304. Other than that, any number of separate initial waveforms can be downloaded into the memory T-304, beginning at any address. Prior to a firing, the central control system C-104 can download the start address, number of samples, and actual sample values for each beam in each processor, so a wide variety of different options are available for waveform generation with each firing.

For example, a single initial waveform can entirely fill the memory T-304, or multiple waveforms can fill different parts of memory T-304. As another example, the central control system C-104 can download two different waveforms, and by programming alternate start addresses on alternate firings, can generate differently shaped transmit pulse waveform outputs on alternate firings. This last example might be useful, for example, to interleave firings for two alternating imaging modes. Specifying different initial waveforms per beam permits depth- and angle-dependent pulse shaping, whereas specifying different initial waveforms for different imaging modes permits implementation of different mode-dependent compromises for such trade-offs as spatial resolution versus signal-to-noise ratio (SNR).

The ability to program initial waveforms digitally not only permits the generation of pulses having a waveform approximating one that does not distort during transmission through attenuative media such as the body (e.g., a Gaussian shape), it also permits a waveform to be programmed which improves axial resolution by compensating for the undesired characteristics of transducer impulse response such as bi-modal response and long ring-down response. The choice of initial waveform samples can also pre-compensate for (1) distortions in the analog transmit and receive paths, (2) distortions in the digital filter responses in the transmit and receive beamformers, and (3) some distortions in the propagation path of the ultrasound signal. This latter compensation can reduce the effect of frequency-dependent attenuation on either the SNR or the lateral resolution. These are all significant advantages over the capabilities of prior art ultrasonic transmit beamformers.

If the initial waveform samples provided in memory T-304 are complex, then in some embodiments it might be provided in in-phase/quadrature form, whereas in other embodiments it might be provided in magnitude/phase form. In the implementation of the preferred embodiment described herein (see FIG. 15), it will be seen that the information is provided in magnitude/phase form.

iv. Apodization/Phasing

The initial waveform sample output of memory T-304 is connected to an apodization/phase multiply unit T-306, which multiplies the magnitude of each sample by an apodization value in multiplier T-308, and then, in multiplier T-310, rotates the phase of each sample to a phase $\phi$ given by the sum of the waveform sample phase $\phi_E$, the phase portion $\phi_D$ of the delay, and a vernier phase ramp value $\phi_R$ derived from the vernier factor $v=F_c/F_0$. $\phi_D$ is a constant during waveform generation and is calculated once during a pre-waveform-generation setup. The phase $\phi_E$ and the sample phase ramp $\phi_R$, however, change for each initial waveform sample. Thus, the sum $\phi=\phi_D+\phi_E+\phi_R$ is calculated for each initial waveform sample.

Alternatively, the low-order portion of the delay could be accomplished by an interpolation of waveform samples to create signal samples at equivalent time delays in the signal path. See section 6.3.2 of the text by Dudgeon and Mersereau for general discussion of interpolation beamforming. In this case, $\phi=\phi_E+\phi_R$ only.

In another embodiment, the low-order portion of the delay, or even the entire delay, could be accomplished using a focusing filter, as described for filter-and-sum beamforming in section 6.2.5 of the previously cited text by Dudgeon and Mersereau. Such a filter is programmed differently for each digital multichannel transmit processor, and each waveform associated with each beam within a transmit processor, to account for the desired signal delay versus frequency characteristic needed to support transmit beamformation. The filter will therefore generally have a nonlinear phase response. The focusing filter characteristics therefore contrast with the signal path filters associated with the interpolation and modulation operations shown in FIG. 14, which preferably have linear-phase responses (therefore yielding no distortion of signals passing through the filter) and which are typically set to identical characteristics in all transmit processors. The filters used for interpolation and modulation are also used for waveform shaping, not beamforming, and the same waveform (with appropriate delay and apodization) is normally created in all transmit processors, although the invention supports selection of different filters among transmit processors.

$\phi_R$ is calculated as follows. As previously mentioned, the signal path of FIG. 14 modulates the initial waveform samples by the desired carrier frequency $F_c$ in two operations. For a programmed $F_c$, the central control system C-104 (FIG. 2a) selects from a plurality of transmit signal nominal center frequencies $F_0$ (which sets the digital processing rate) close to $F_c$ and calculates a vernier factor $v=F_c/F_0$. As suggested in Table I, the available values for $F_0$ each represent one of a plurality of available fractions of the DAC sampling frequency $F_s$, which the central control system C-104 also selects from one of a plurality of available clock frequencies. Thus in selecting an $F_0$, the central control system C-104 determines which sampling frequency $F_s$ to use and which fraction of $F_s$ should determine $F_0$.

The central control system C-104 does not explicitly download $F_0$ to each transmit processor T-104; rather, it controls the frequency generator T-256 to generate $F_s$, and downloads a value for the interpolator 2 integer upsampling factor $K_{u2}$. That information implicitly specifies $F_0$ according to the relationship $F_0 = F_s/4K_{u2}$. It should be noted, however, that the information required by each transmit processor T-104 is $K_{u2}$, not $F_0$. The transmit processor T-104 does not explicitly need to know $F_0$, but only information relative to the clock frequencies.

In order to account for the difference between $F_0$ and $F_c$, the central control system C-104 downloads v to each transmit processor T-104. Each transmit processor then computes the phase ramp term $\phi_R$ according to the formula:

$$\phi_R = 2\pi K_{u1}(v-1)n/4,$$

where n is the initial waveform sample number. Each transmit processor T-104 calculates $K_{u1}$ (the upsampling factor for interpolator 1) from $K_{u1}=4N_B/K_{u2}$ based on the number of beams $N_B$ and interpolation factor $K_{u2}$, which was downloaded from the central control system C-104.

Theoretically v can range from 0 (inclusive) to 2 (exclusive) (a range which can be expressed using the shorthand notation "[0,2)"). As a practical matter, however, the filter response characteristics of the filters h2, h3 and h4 in the transmit processor signal path limit the usable range for v to some smaller range within [0,2).

The frequency vernier factor v can be specified independently for different beams being produced by the transmit beamformer system T-102, for example to reduce beam interference or to increase penetration of deeper focusing beams. Independent values of v could also be specified for mixed imaging modes, in order to achieve the desired imaging-mode-dependent compromises between resolution and sensitivity (which determines penetration depth). The central control system C-104 also has the ability to download independently-selected v for each of the plurality of transmitters T-103 (i.e., for different transducer elements T-114 in the array T-112), and can download values for v in advance of each firing if desired.

v. Interpolator 1

The output of apodization/phase multiplier T-306 is provided to a first interpolator T-312 which upsamples the sampled waveform information by the factor $K_{u1}$ and low-pass filters it using a filter h2. The factor $K_{u1}$ depends on the processing mode in which the transmit processor T-104 is operating. Specifically, $K_{u1}$ takes on whichever value is necessary to bring the sample rate on the output of interpolator T-312 to four samples per period of the transmit signal nominal center frequency $F_0$. In general, therefore, $K_{u1}=4F_0/R_E$. $K_{u1}$ is not downloaded to the transmit processor, but is derived by the transmit processor calculation $K_{u1}=4N_B/K_{u2}$ as mentioned above.

Filter h2 is used to low-pass filter the up-sampled output of the $K_{u1}$ up-sampler in order to remove replicated images of the original signal at higher frequencies. As used herein, the operations performed by an "interpolator" (or "upsampler") and "decimator" (or "downsampler") are reciprocal operations, and either can take place with a factor either larger or smaller than unity. Thus, for example, upsampling by a factor of ½ is the same as decimating by a factor of 2. Also as used herein, a digital signal processing interpolator, or simply "interpolator," performs both upsampling and filtering, as described in sections 2.3.3 and 2.4 of the previously cited text by Crochiere and Rabiner. The filter transfer function in an interpolator can be unity, in which case the interpolator is the same as an upsampler alone.

vi. Fine-Time Delay Memory

The output of the first interpolator T-312 is provided to a second delay unit T-314 which delays each sample by $N_F(T_0/4)$ ($N_F$ is an integer). As set forth above, $N_F$ is the fine delay portion of the overall desired time delay. Thus, a coarse delay of $N_cT_E$ is applied in delay unit T-302 to a resolution of one sample interval at the initial waveform sampling rate, and a fine delay $N_F(T_0/4)$ is applied by delay unit T-314 to a resolution of ¼ period of the transmit signal nominal center frequency $F_0$ for bandwidth modes 0 through 4, and ¾ period for bandwidth modes 5 and 6. If the initial waveform sample rate is equal to four samples per cycle of $F_0$ (i.e. if $R_E=4F_0$), then delay unit T-314 would introduce no additional time delay. The phase portion $\phi_D$ of the overall desired time delay (applied in the apodization/phase multiply unit) is a phase rotation at the nominal center frequency equivalent to the fractional portion of the desired time delay that is less than $(T_0/4)$.

vii. Modulator

The output of delay unit T-314 is provided to a modulator T-316. In multiplier T-318 of the modulator T-316, modulation of the initial waveform by $F_0$ is accomplished by multiplying by $\exp(jn\pi/2)$, in which n corresponds to the sample index. This embodiment's choice of an intermediate sample rate (after the first interpolator) of four samples per cycle of $F_0$ is advantageous because $\exp(jn\pi/2)$ then takes on only the values (−1, 0, 1). Multiplier T-318 thus can be implemented very simply in hardware by appropriate add and subtract operations. In a different embodiment, the intermediate sample rate could be made equal to two samples per cycle of $F_0$.

In functional block T-320 of the modulator T-316, the transmit processor takes the real part of the modulated signal output of the multiplier T-318. In hardware implementation, blocks T-318 and T-320 can be combined by having the multiplier T-318 simply not generate any of the in-phase or quadrature samples which would be discarded by block T-320.

The signal path in FIG. 14 from the SOT signal through block T-320 is conceptually paralleled for each beam being produced by the transducer array, effectively providing separate channels. (In implementation, the different beams are interleaved through a common set of hardware.) In summer T-322 of the modulator T-316, all the beams are de-interleaved and superposed together. The result is band-pass filtered through a filter h3, annotated as block T-324 of the modulator T-316. Filter h3 is a band-pass filter used to attenuate energy at 0 Hz and at image frequencies that were not sufficiently reduced by filter h2.

viii. Interpolator 2

The output of modulator T-316 is then upsampled by a second interpolator T-326 to the DAC input sample frequency $F_s$. Interpolation is accomplished by upsampling the signal by the factor $K_{u2}$ and low-pass filtering the result through a filter h4. In general, $K_{u2}=F_s/4F_0=F_s/K_{u1}R_E$. Filter h4 is used to filter out unwanted images after the signal has been upsampled to the DAC sample frequency. The design of interpolation filters and interpolators is well known in the art and need not be further described herein (see the previously cited text Multirate Digital Signal Processing by Crochiere and Rabiner).

ix. DAC Encoder

The output of interpolator T-326 is encoded by encoder T-328 to the form required for DAC T-121 (FIG. 2b) and provided thereto. The encoder T-328 also hard limits the filtered data into the available DAC range.

Note that the signal path of FIG. 14 forms a pipeline in which downstream units may be processing earlier samples of the waveform at the same time that upstream units are processing later samples of the waveform. Even though such operations run in parallel and overlap in processing time, the upstream units are still referred to herein as performing their functions "before" the downstream units. Also, while the pipelining of functions is preferred, it will be understood that in another embodiment, a digital transmit beamformer can be implemented sequentially in which each step is performed in its entirety for the entire pulse waveform before the next step is performed. Intermediate embodiments are possible as well.

b. Hardware Implementation of Signal Processing Path

As previously mentioned, several of the functions of various ones of the functional units illustrated in FIG. 14 can be combined on implementation to reduce the amount of hardware required to accomplish the joint functions. Also, in some situations, the conceptual function depicted in FIG. 14 reduces to a simple degenerate case that can be implemented using little or no hardware at all. Before describing the local control processors for the signal path of FIG. 14, it will be useful to understand some aspects of the hardware implementation of the signal path.

Figure 15:
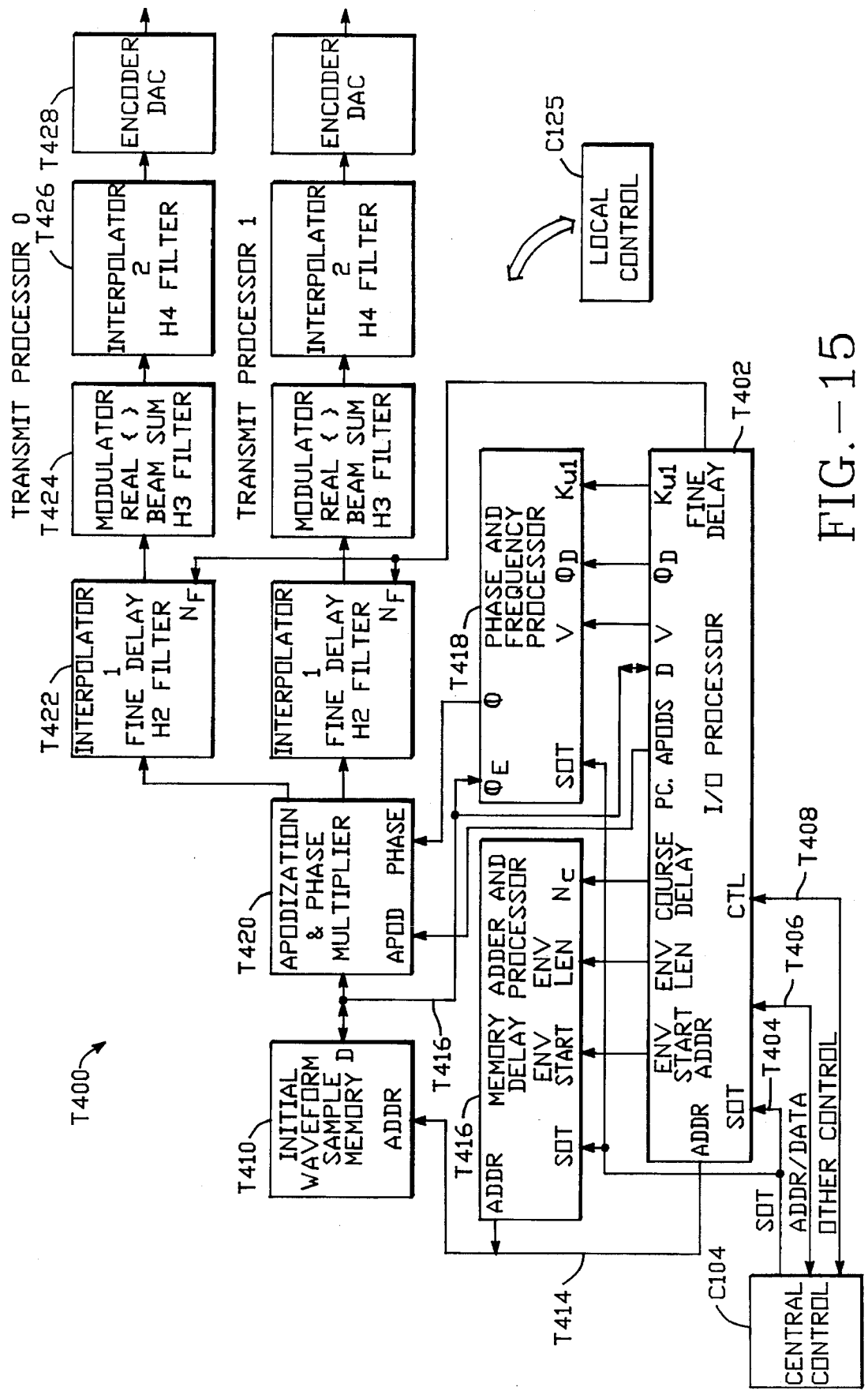
FIG. 15 is a block diagram schematic of an embodiment of the digital transmit beamformer system of FIG. 2 which depicts two adjacent channels of the digital transmit beamformer and a secondary or local beamformer control of the invention.

FIG. 15 is a block diagram of a preferred implementation of apparatus T-400 which implements two digital multichannel transmit processors of the transmit beamformer system T-102. The pairing of processors permits advantageous sharing of certain hardware as will be seen below. A portion of the transmitter pair in FIG. 15 is fabricated on a single chip.

Referring to FIG. 15, the initial waveform sample memory T-410 contains the initial waveform information for all beams in both transmit processors. The sample values are written to initial waveform sample memory T-410 by an I/O processor T-402 (described below) in response to the downloading of the samples by central control system C-104. The memory T-410 is organized as a plurality of double-words or as twice as many single-words, and as viewed by the central control system, is memory-mapped in the same address space as the parameter registers in the I/O processor T-402, also described below. The memory can contain any combination of real and/or complex waveforms of varying lengths as long as the total length occupied by the waveforms stored is less than or equal to the total memory space available.

Individual initial waveform samples are read out of memory T-410 at the initial waveform sample rate $R_E$, which is the same for every beam of both transmit processors and is dependent on $F_0$ and $N_B$. Since multi-beam waveform samples are read from the memory T-410 in a time-interleaved manner, all processing modes shown in Table I maximize hardware usage by using the maximum memory data rate of $R_D=2R_EN_B$ samples per unit time.

While the phase portion of each complex sample read from memory T-410 is provided to the $\phi_E$ input of phase and frequency processor T-418 as described below, the magnitude portion $M_E$ is provided to apodization and phase multiplier T-420. Apodization and phase multiplier T-420 also receives pre-computed apodization values from I/O processor T-402 (interleaved by transmit processor and beam number) and phase outputs $\phi$ of phase and frequency processor T-418 in in-phase/quadrature (I/Q) format (interleaved by transmit processor and beam number). Functionally, apodization and phase multiplier T-420 converts each sample value from magnitude/phase format $M_E\exp(j\phi_E)$ to I/Q format $M_E\cos(\phi_E)+jM_E\sin(\phi_E)$ at the same time that it multiplies the magnitude $M_E$ by the apodization value and adds to the phase to account for the delays and phase ramp. The output of apodization and phase multiplier T-420 is produced at a rate of $4R_EN_B$ values per unit time, with values interleaved by I and Q values, by transmit processor and by beam number. These values are separated at this point into two parallel sequences, the values for transmit processor 0 being used by the transmit processor 0 path and the values for transmit processor 1 being used by the transmit processor 1 path. The individual transmit processor outputs are therefore each provided at a rate of $2R_EN_B$, in a form which is interleaved by beam number and I/Q values. At this point, only the functional blocks for the remainder of transmit processor 0 will be described since the functional blocks for the remainder of transmit processor 1 are identical.

The output of apodization and phase-multiplier T-420 for transmit processor 0 is provided to a block T-422 which performs the functions of both the first interpolator T-312 and the fine delay unit T-314 (FIG. 14), including low-pass filter h2. Specifically, it performs upsampling by $K_{u1}$, fine delay by $N_F$, and filtering by h2, and a portion of the Re{ } (real part) function, all together. Upsampling by $K_{u1}$, which theoretically requires the insertion of $(K_{u1}-1)$ zeros between samples of each waveform of each beam, is accomplished simply by observing the contents of internal pipeline registers at a rate of $K_{u1}$ times the rate at which they are being loaded.

Note that the processing block T-422 does not need to generate both an in-phase (I) and quadrature (Q) component for each output sample. Due to the choice of modulation frequency described hereinafter and the sufficiency of computing only the in-phase values required by the Re{} function, it will be appreciated by those skilled in the art that, depending on the output sample, only an I or a Q component needs alternately to be generated for each output sample.

The output of block T-422 carries $K_{u1}R_E N_B = 4F_0 N_B$ samples per unit time, interleaved by beam number. Again, the processing modes of transmit processors T-104 permit a trade-off at this point between the transmit signal nominal center frequency $F_0$ and the number of beams $N_B$.

Processing block T-424 performs all of the functions of modulator T-316 (FIG. 14). Modulation by $F_0$, as well as the Re{} function, are accomplished entirely by a selective negation operation (not shown) in the signal path. This is possible because the modulation frequency was fixed at four times the sample rate at this point.

The output of the processing block T-424 is interleaved by beam. It still has a data rate of $4F_0 N_B$ samples per unit time, which by now are all real values. The processing block T-424 then sums the interleaved values for the different beams to produce a composite sample for the transmit processor. All $N_B$ waveforms being produced by the transmit processor are at this point superposed. Processing block T-424 then performs filtering by h3 on the composite sample stream in a conventional manner.

The output of processing block T-424, which occurs at a real-valued sample rate of $4F_0$, is provided to the second interpolator block T-426. As with the upsampler in processing block T-422, the interpolator T-426 upsamples the input sample rate to $4K_{u2}F_0 = F_s$ simply by creating the output values at a rate of $F_s$ from the input values which were clocked into pipeline registers (not shown) in the block T-426 at the input sample rate $4F_0$. The signal is then filtered by h4.

The output of the second interpolator T-426 is connected to the input of an encoder/DAC block T-428 and provided at the full DAC sampling frequency of $F_s$. The encoder/DAC T-426 is described in more detail below.

c. Local Control Processors

The apparatus of FIG. 15 also includes an I/O processor T-402, which handles the reads and writes to all programmable resources in the apparatus. In addition, the I/O processor calculates some parameters during a pre-compute operation prior to each transmit firing. All downloading of parameters to the apparatus T-400 occurs from the central control system C-104 through an address/data multiplexed bus T-406 to memory-mapped parameter registers located functionally within the I/O processor T-402. Some of the registers are programmable by the central control system C-104 per beam and per transmit processor, whereas others are programmable only for the transmit processor pair. Still other parameter registers in I/O processor T-402 (such as $K_{u1}, N_c, N_F$ and $\phi_D$) have their contents pre-computed by the I/O processor T-402 prior to each firing.

The two processors in the processor pair T-400 also share a common memory address and delay processor T-416 and a common phase and frequency processor T-418. The memory address and delay processor T-416 receives the SOT signal, as well as the initial waveform sample start addresses (per beam and per transmit processor), the waveform length information (per beam and per transmit processor) and the coarse delays $N_c$ (per beam and per transmit processor) from the I/O processor T-402. It provides addresses on a sample memory address bus T-414 in order to read out initial waveform samples in a manner which is interleaved by transmit processor, by beam and by magnitude/phase values.

The phase and frequency processor T-418 receives the SOT signal from central control system C-104, as well as the input sample phases $\phi_E$ arriving from sample memory T-410. From I/O processor T-402, it receives the frequency vernier factors v (per beam and per transmit processor), the phase portion $\phi_D$ of the delay values (per beam and per transmit processor), and $K_{u1}$ (constant for all beams in both transmit processors). The input sample phase values arrive from waveform sample memory T-410 at a rate of $2R_E N_B$, interleaved by transmit processor and beam. The phase and frequency processor T-418 multiplexes the v factors in a manner which matches the interleaved arrangement of $\phi_E$'s, and multiplexes the $\phi_D$'s in the same manner.

The control processors T-402, T-416 and T-418 will now be described in more detail. Control logic block C-125 represents the timing and control logic which operates the various low-level signal path components in the hardware embodiment of FIG. 15. This logic is conventional and need not be described.

i. I/O Processor

Figure 16:
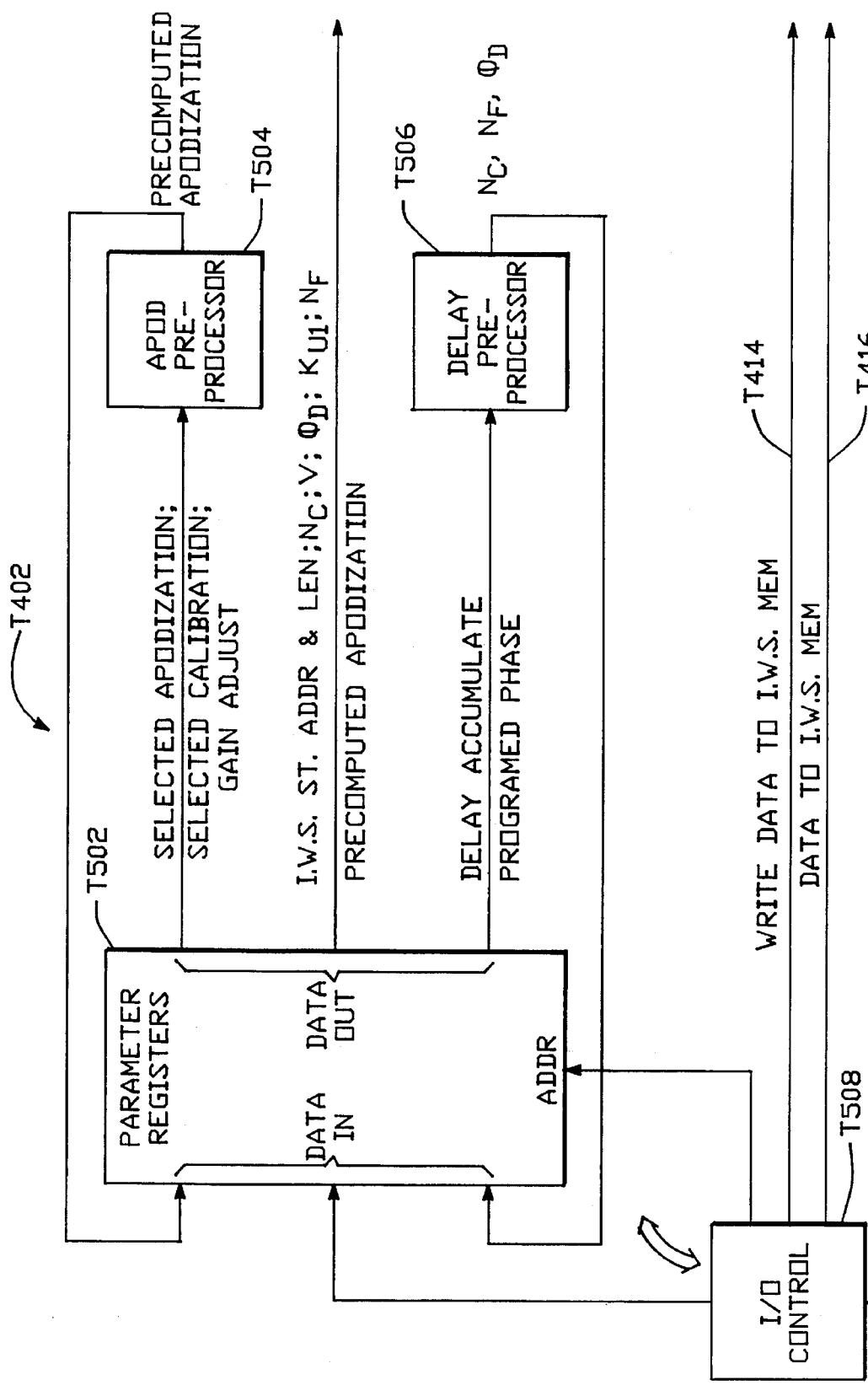
FIG. 16 is a schematical block diagram of the I/O processor of FIG. 15.

FIG. 16 is a functional block diagram of I/O processor T-402 (FIG. 15). It comprises a parameter register bank T-502, an apodization preprocessor T-504, a delay preprocessor T-506 and an I/O control unit T-508. All of the parameter registers T-502 and all of the waveform sample memory T-410 locations in all transmitters are memory-mapped in the same address space as seen by central control system C-104 (FIG. 15). The central control system C-104 communicates with the transmit processors (as well as with other components in the beamformer system R22) via a pair of system buses, and interface logic (not shown) combines downloaded information from both system buses onto the address/data bus T-406 for individual transmit processor pairs.

The procedures for downloading parameters employ a number of techniques which minimize the overhead time required, thereby minimizing the time required to update the parameters between firings and maximizing the frame rate. For example, central control system C-104 can operate in a broadcast mode in which the same information is written to all the transmit processor pairs T-400. The broadcast mode is useful, for example, for downloading initial waveform samples to all transmit processors in cases where the data is to be the same for all such transmit processors. As another example, central control system C-104 can write the same data simultaneously to registers associated with all beams of one or both transmit processors in a transmit processor pair. The transmit processor pair T-400 also includes a register address auto-increment feature in which central control system C-104 can write to sequential addresses without having to specify a new address for each write. The addresses for the parameter registers are chosen to take advantage of this feature. Parameter information can be downloaded to the transmit processors only between firings.

The parameters downloaded by central control system C-104 to the I/O processor include the initial waveform samples (separately per beam and per transmit processor); initial waveform sample start address, length and type (real or complex) (one set per beam per transmit processor); interpolation factor $K_{u2}$ and number of beams $N_B$ (one set per transmit processor pair); filter programing for filters h2, h3 and h4 (one programming per filter per transmit processor pair); the frequency vernier factor v and an alternate frequency vernier factor $v_d$, together with a selection of which to use for calculation of the phase ramp term $\phi_R$ (one set per beam per transmit processor); a common delay offset term (one value per transmit processor pair); a delay value and an arbitrary additional programmed phase value (one set per beam per transmit processor); an apodization value (one value per beam per transmit processor); delay calibration values (eight values per beam per transmit processor); apodization calibration values (eight values per beam per transmit processor); a selection of which delay and apodization calibration values to use (one selection per transmit processor); overall transmit processor gain management values; and a selection of either PW or CW signal operation (one selection per transmit processor pair). Calibration is described below.

Note that each of the per-beam delay values has two register addresses: one for initializing a "delay accumulate register" with the downloaded value, and one for accumulating the downloaded value with the prior contents of the parameter register. The central control system translates a desired focal range and steering angle into a delay profile by using delay offsets which are predefined on a sparse grid of ranges and steering angles. The grid is predefined only for beams originating from the center of the transducer array, so the central control system performs computations to shift the grid to the desired beam origin, interpolating between transmit elements as necessary. The central control system also interpolates between steering angles on the sparse grid if the desired steering angle falls between grid angles. Interpolation is performed also in range if the desired focal range falls between ranges on the grid, but the computations of this interpolation are shared partially by the central control system and partially by each transmit processor. Specifically, the central control system scales the two nearest (in range) delay profiles by the appropriate interpolation coefficients, sums them by transmitting them to the delay accumulate registers in the parameter register bank T-502.

Initial waveform samples being downloaded are received by the I/O processor T-402 in the same manner as it receives parameter information. The I/O control unit T-508 determines a local sample memory address from the address specified by the central control system C-104, and provides that address on sample memory address bus T-414. It drives the sample data onto sample memory data bus T-416.

Each pulse firing by transmitter pair T-400 is preceded by a pre-computation period. During the pre-computation period, the apodization pre-processor T-504 is provided with the selected apodization values for the individual waveforms to be produced, the selected apodization calibration values for such waveforms, and a gain adjust value (one of the downloaded gain management values). The apodization pre-processor T-504 multiplies these together in a conventional manner to produce "pre-computed apodization" values for each waveform to be generated by each transmit processor. These values are written into respective additional ones of the parameter registers T-502.

Also during the pre-computation period, I/O processor T-402 computes $K_{u1}$ from $K_{u1}=4N_B/K_{u2}$ by means not shown in FIG. 16.

Also during the pre-computation period, delay pre-processor T-506 computes the three delay components $N_c$, $N_F$ and $\phi_D$, one set per beam per transmit processor. It does so by taking into account the accumulated delay value in the delay accumulate register, the programmed phase value, and the individual per-transmit processor, per-beam pipeline and filter delays of the signal path. Ignoring the signal path delays for simplicity, the delay pre-processor calculates the delay portions $N_c$, $N_F$ and $\phi_D$ by division into high-order, mid-order and low-order bit words, as previously discussed.

Thus all of the parameter registers T-502 which are needed to generate $N_B$ properly shaped, delayed, apodized and modulated waveforms in each transmit processor have been downloaded or pre-computed before waveform generation begins.

ii. Memory Address and Delay Processor

Figure 17:
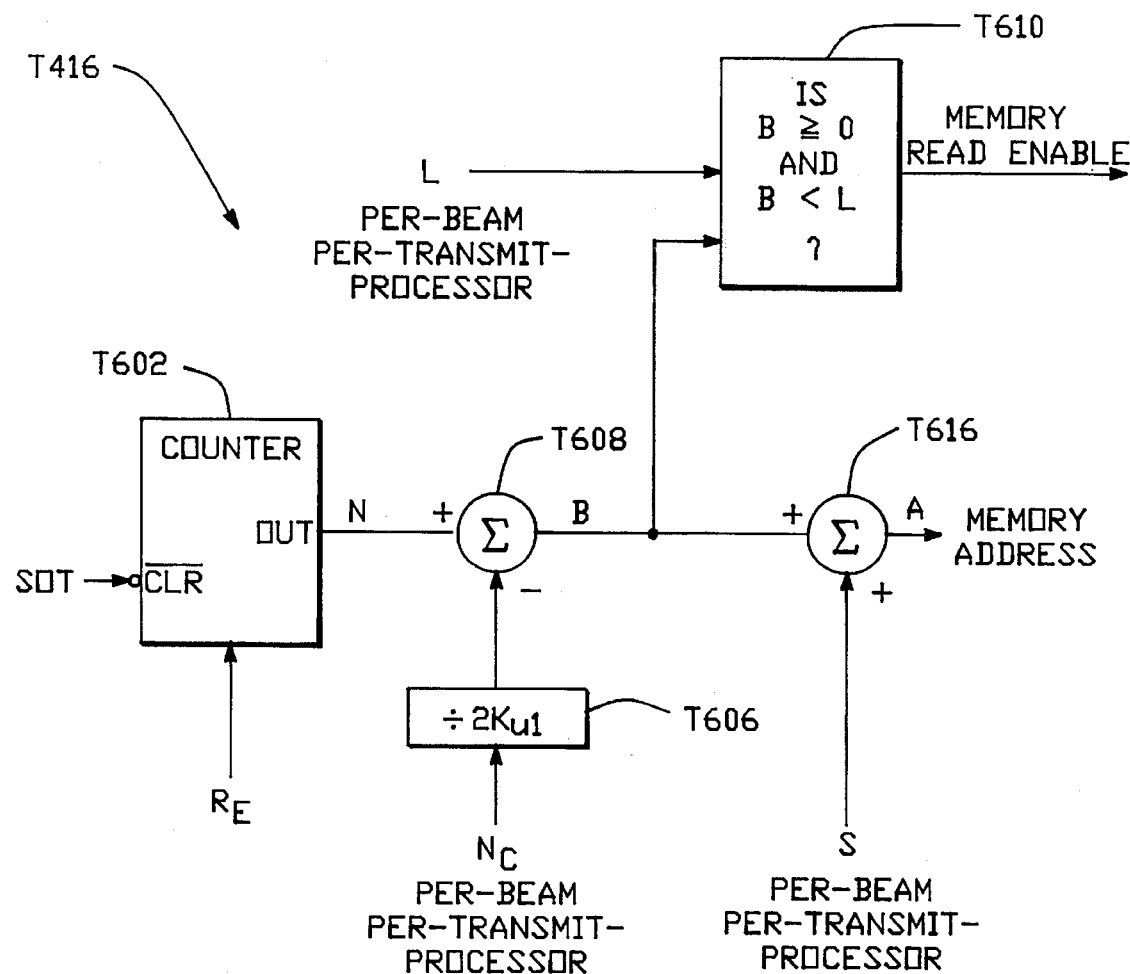
FIG. 17 is a schematical block diagram illustrating computations made by the memory address and delay processor of FIG. 15.

FIG. 17 functionally illustrates the computations made by memory address and delay processor T-416. As shown in the diagram, the address processor T-416 performs the following functions. At the SOT signal, a counter T-602 begins counting in units of $T_E=1/R_E$. Both transmit processors have the same number of beams and upsampling rates, and therefore share the same count. Call the current count N. The $N_c$ term for all beams and both transmit processors are then selected in interleaved fashion. A complete cycle of beams and processors is made for each N (i.e., for each period of $R_E$). The $N_c$'s are divided by $2K_{u1}$ (divider T-606) and subtracted (T-608) from the count in a time-multiplexed fashon. Call this sum B, given by $B=N-N_c/2K_{u1}$. B is compared with zero (comparator T-610) and with the initial waveform length L to determine if memory should be read. A sample is not read if B<O or B≧L. If reading out of memory, the memory address is given by A=B+S, where S is the start address of the initial waveform. This sum is performed by summer T-616.

Each address of the envelope memory T-410 corresponds to a double-word. In normal operation, the most significant bits (MSBs) represent amplitude and the least significant bits (LSBs) represent phase. Initial waveform samples may also be stored as real samples only, in which case the MSBs represent one real sample and the LSBs represent the next real sample. The memory is thus accessed at a rate of $R_E$ samples (real or complex samples) per unit time for each beam of each transmit processor, which is a total data rate of $R_D=2\cdot N_B\cdot R_E$ samples per unit time.

The memory read enable (T-610) could be used directly as the source of initial waveform samples instead of the memory output if the flexibility of programmed waveform samples is not desired. Also, other more complicated real-time computational schemes could be used to provide the initial waveform samples instead of the memory. However, the use of a memory for the source of waveform samples is preferred.

Note that the calculation of address A does not take into account the sign bit of B. This is acceptable since samples will not be read out of memory when B is negative. Also note that the sum may overflow. An initial waveform representation may therefore wrap around the waveform memory.

iii. Phase and Frequency Processor

Figure 18:
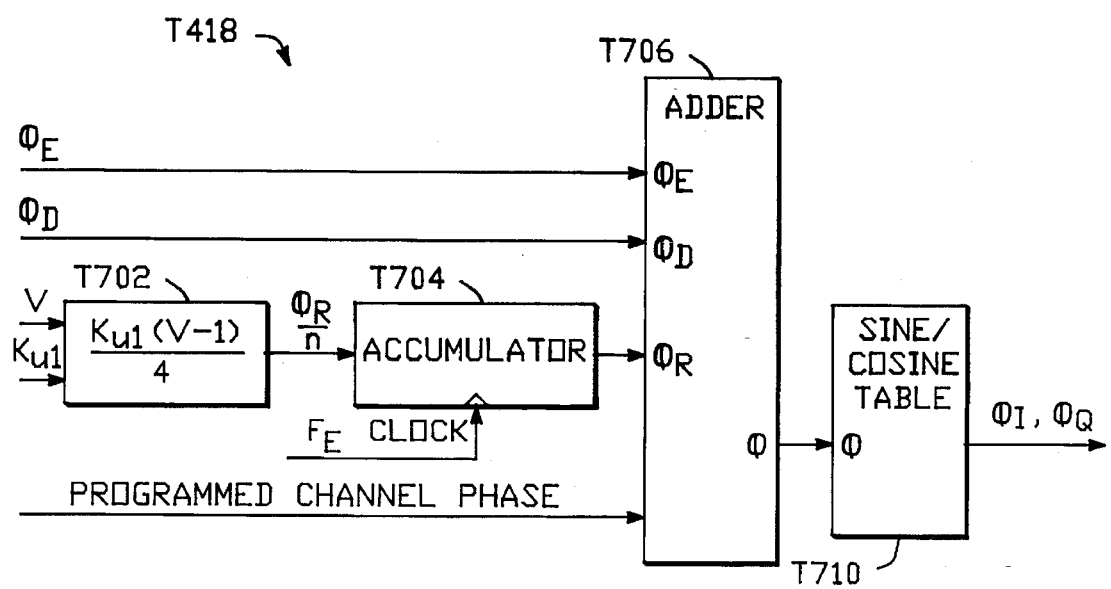
FIG. 18 is a schematical block diagram illustrating computations performed by the phase and frequency processor of FIG. 15.

FIG. 18 functionally illustrates the calculations performed by phase and frequency processor T-418 on one beam of one transmit processor. In implementation, the hardware can be multiplexed in the same manner as the interleaving of $\phi_E$'s, similarly to FIG. 17. Phase and frequency processor T-418 includes a block T-702, which calculates the per-sample phase ramp increment from $\phi_R/n=K_{u1}(v-1)/4$ and provides the result to an accumulator T-704. The accumulator T-704 adds to itself the output of block T-702 once every $R_E$ clock cycle, which corresponds to once for each initial waveform information sample for the beam and transmit processor. The output of accumulator T-704 is $\phi_R$, and is provided to one input of a 4-port adder T-706. The other three ports of adder T-706 receive $\phi_E$, $\phi_D$ and the programmed transmit processor phase. The sum output of adder T-706 is $\phi$, which is then provided to a sine/cosine table T-710. The sine/cosine table T-710 is operated alternately as a sine table and as a cosine table. The output of sine/cosine table T-710 is the quadrature portion $\sin(\phi)$ of $\exp(j\phi)$ interleaved with the in-phase portion $\cos(\phi)$ of $\exp(j\phi)$. Because of the multiplexing of the hardware in phase processor T-418, $\sin(\phi)$ and $\cos(\phi)$ are provided interleaved with each other at a data rate of $2R_E N_B$ full $\phi$'s per unit time. Overall, the $\phi$'s are interleaved by $\sin(\phi)$ and $\cos(\phi)$, by transmit processor number and by beam number.

4. Doppler Receive Beamformer Control

Focusing during D-mode acquisition is achieved in each receiver's demodulator/range gate A-402 under the control of local control C-127 of FIG. 2*b*, which obtains its focus timing from the DMA processor of acquisition control C-130 of FIG. 2*c*. Focusing control C-132 of the central control system C-104 develops all transmit and Doppler receive focusing parameters for the user selected Doppler beam orientation (CW and PW pulse wave cases) range interval PW case from common sparsely sampled delay and apodization profiles that are expanded into fully-sampled delay and apodization profiles, which are then passed to each beamformer for final local control processing. The Doppler receive beamformer of the present embodiment supports only uniform apodization, so the full apodization profile available from central control system C-104 is not, in the preferred embodiment, required for this beamformer. Only the aperture size and location operations (steps 1 and 2 of FIG. 6) are required in order to determine the active elements of the Doppler beamformer, which is simply precomputed and stored without requiring the full apodization apparatus of the central control system, although other Doppler beamformer embodiments that use apodization could use the values generated by the central control apodization processor. The delays to be used by the Doppler beamformer, produced by the delay processor of focusing control C-132 apparatus common to all ultrasound system beamformers, are not communicated directly to the Doppler local control as is done with the transmit beamformer system T-102 or imaging receive beamformer system R-100. Rather, they are passed to the DMA processor of acquisition control C-130 for additional processing to convert each per-channel focusing delay (for active elements in aperture) into a delay to start of range gate (PW only), a range gate duration (PW only), and a focusing phase rotation component (CW and PW). For each channel determined to be active, the range gate start and duration times associated with the channel are used to create a vector, indexed according to sequential ranges along a beam, that indicate whether the gate is enabled or disabled. Vectors for inactive channel would have all positions selected for disable. The totality of vectors for all channels form a logical map of the range gate on and off times in each channel that is communicated and stored in RAM in the local control A-410. The phase rotation is quantized by the DMA processor to one of eight phases for each range before communicating the phase information to the Doppler receive beamformer local control. For CW operation, the range gate enable is held active during the CW acquisition interval and only the phase rotator is applied to the baseband demodulated signal for focusing.

According to the specification of the preferred embodiment, the present beamformer control invention affords significant advantage in that the control is distributed between a primary control and a secondary control. The beamformer control affords the dynamic application of delay and apodization profiles. Further, the present invention can simultaneously and advantageously control both transmit and receive beamformation and enhance the image through the selection of the number of beams, the center frequency of the beams and the resolution. Multiple beam operations are supported as well as variable frequency operations and synthetic sample generation. The system maintains fully coherent data on transmit and receive. The system affords the ability to accomplish adaptive beamforming.

Other aspects and advantages of the present invention can be obtained from a review of the figures and the claims.

It is to be understood that embodiments other than those presented here can be fabricated and fall within the spirit and scope of the present invention.

We claim:

1. An ultrasound beamformer system comprising:
    a transmit beamformer system for generating a transmit signal;
    a receive beamformer system for processing a signal received from a target which results from the transmit signal interacting with the target; and
    a beamformer control system for controlling the computational capability of the transmit beamformer system and the receive beamformer system by adjusting at least two of (1) a number of beams, (2) a nominal center frequency, and (3) a resolution per beam as processed by the transmit and receive beamformer systems.

2. The beamformer system of claim 1 wherein:
    said receive beamformer system includes an imaging receive beamformer system and a Doppler receive beamformer system.

3. The beamformer system of claim 1 wherein:
    said control system can select a number of concurrent beams for processing by said transmit beamformer system that is independent of a number of concurrent beams selected for processing by said receive beamformer system.

4. The beamformer system of claim 1 wherein:
    said control system can select a carrier frequency per beam for processing by said transmit beamformer system that is independent of a carrier frequency per beam selected for processing by said receive beamformer system.

5. The beamformer system of claim 4 wherein:
    said control system can select independent carrier frequencies for each beam processed by the transmit beamformer system, and independent carrier frequencies for each beam processed by the receive beamformer system.

6. The beamformer system of claim 1 wherein:
    said control system can select a resolution per beam for processing by said transmit beamformer system that is independent of a resolution per beam selected for processing by said receive beamformer system.

7. The beamformer system of claim 1 wherein:

said receive and transmit beamformer systems communicate with a transducer array which has elements;

said transmit beamformer system includes multiple transmit processors, said transmit processors operative to process signals for elements of the transducer array;

said receive beamformer system includes multiple receive processors, said receive processors operative to process signals from elements of the transducer array;

and further wherein said control system includes a primary control system and a distributed secondary control system;

and wherein said distributed secondary control system comprises a separate secondary control for said transmit processors and a separate secondary control for each receive processor.

8. The beamformer system of claim 7 wherein:

said primary control uses at least one common control parameter profile for generating additional control parameter profiles for use with the secondary controls of both the transmit processors and the receive processors.

9. The beamformer system of claim 7 wherein:

said primary control system generates a primary control parameter set and communicates the primary control parameter set to the distributed secondary control system;

wherein at least in a first part the primary control parameter set determines the number of beams, and the resolution per beam; and each of said secondary controls use at least a second part of the primary control parameter set to generate secondary control parameter sets appropriate for the transmit processor or the receive processor with which the individual secondary control is associated.

10. The apparatus of claim 1 wherein:

the resolution comprises an initial waveform sample interval for a transmit beam and a spatial range resolution for a receive beam.

11. The beamformer system of claim 4 wherein:

said control system selects a carrier frequency which varies from the nominal center frequency by a vernier factor.

12. An ultrasound beamformer system comprising:

a transmit beamformer system for generating a transmit signal;

a receive beamformer system for processing a signal received from a target which results from the transmit signal interacting with the target; and a beamformer control system for controlling both the transmit beamformer system and the receive beamformer system, said control system including:

(1) a primary control for generating primary parameter profiles for controlling both the transmit beamformer system and the receive beamformer system, and (2) a secondary control for generating secondary parameter profiles based on the primary parameter profiles for controlling at least one of the receive beamformer system and the transmit beamformer system.

13. The beamformer system of claim 12 wherein:

said receive beamformer system includes an imaging receive beamformer system and a Doppler receive beamformer system.

14. The beamformer system of claim 12 wherein:

said secondary control expands the primary parameter profiles using at least one of interpolation and extrapolation.

15. The beamformer system of claim 12 wherein:

said primary control stores at least one sparsely-sampled parameter profile and expands said profile before communicating said expanded parameter profile to said secondary control;

said secondary control further expands the expanded parameter profiles.

16. The beamformer system of claim 12 wherein said primary control expands sparsely-sampled parameter profiles using at least one of interpolation and extrapolation.

17. The beamformer system of claim 12 wherein:

said receive beamformer system includes a plurality of receive processors, each receive processor associated with at least one element of a transducer array;

said secondary control includes a plurality of individual secondary controls, one individual secondary control associated with each receive processor.

18. The beamformer system of claim 12 wherein:

said transmit beamformer system includes a plurality of transmit processors, each transmit processor associated with at least one element of a transducer array;

said secondary control includes a plurality of individual secondary controls, one individual secondary control associated with each transmit processor.

19. The beamformer system of claim 12 wherein:

said receive beamformer system includes a plurality of receive processors, each receive processor associated with at least one element of a transducer array;

said secondary control includes a plurality of individual receive secondary controls, one individual receive secondary control associated with each receive processor;

said transmit beamformer system includes a plurality of transmit processors, each transmit processor associated with at least one element of said transducer array;

said secondary control includes a plurality of individual transmit secondary controls, one individual transmit secondary control associated with each transmit processor;

and wherein said primary parameter profiles are used by the individual secondary controls of both the receive processors and the transmit processors.

20. The beamformer system of claim 19 in which said receive beamformer system is an imaging receive beamformer system;

and in which said beamformer system further comprises: a Doppler receive beamformer system; and in which said primary parameter profiles are used by both the imaging receive and the Doppler receive beamformer systems.

21. An ultrasound beamformer system comprising:

a programmable transmit beamformer system for generating a transmit signal;

a programmable receive beamformer system for processing a signal received from a target which results from the transmit signal interacting with the target; and a beamformer control system for controlling both the programmable transmit beamformer system and the programmable receive beamformer system by distributing the generation of a parameter set, for controlling the transmit beamformer system and the receive beamformer system, between a primary control system and a distributed secondary control system, and wherein said programmable transmit beamformer system includes multiple transmit processors, each transmit processor being operative to process signals for elements of a transducer array;

said programmable receive beamformer system includes multiple receive processors, each receive processor being operative to process signals from elements of said transducer array, and said distributed secondary control system including a separate secondary control for each transmit processor and a separate secondary control for each receive processor.

22. The beamformer system of claim 21 wherein:

said primary control system generates a primary control parameter set and communicates the primary control parameter set to the distributed secondary control system; and each of said secondary controls use the primary control parameter set to generate secondary control parameter sets appropriate for the transmit and receive processors with which the individual secondary controls are associated.

23. The beamformer system of claim 21 wherein:

said primary control system uses at least one sparsely-sampled parameter set and generates the primary control parameter sets by expanding said sparsely-sampled parameter set.

24. The beamformer system of claim 23 wherein:

said secondary control system further expands the primary control parameter sets expanded by the primary control system.

25. The beamformer system of claim 23 wherein:

said sparsely-sampled parameter set used by the primary control system is common to both the transmit beamformer system and the receive beamformer system.

26. The beamformer system of claim 21 wherein:

said primary control system uses at least one sparsely-sampled parameter set, each set comprised of one of focusing time delay profiles and apodization-related profiles;

said primary control system uses at least one of interpolation and extrapolation coefficients; and said primary control system expands said sparsely-sampled parameter set by at least one of interpolating and extrapolating the profiles of the sparsely-sampled parameter set using the interpolation and extrapolation coefficients.

27. The beamformer system of claim 26 wherein said apodization-related profiles include apodization width profiles, apodization origin profiles, base apodization templates, and apodization correction profiles.

28. An ultrasound beamformer control system for use with (1) a transmit beamformer system for generating a transmit signal and (2) a receive beamformer system for processing a signal received from a target which results from the transmit signal interacting with the target, the control system comprising:

a beamformer control for controlling both the transmit beamformer system and the receive beamformer system, said control including:

(1) a primary control for generating primary parameter profiles for controlling both the transmit beamformer system and the receive beamformer system; and (2) a secondary control for generating secondary parameter profiles based on the primary parameter profiles generated by the primary control for controlling the transmit beamformer system and the receive beamformer system.

29. The beamformer control system of claim 28 wherein:

said primary control generates focusing time delay profiles and apodization-related profiles.

30. The beamformer control system of claim 28 wherein:

said primary control generates focusing time delay profiles and apodization profiles and said secondary control generates per channel time delay values, per channel focusing phase values, and per channel apodization values.

31. The beamformer control system of claim 28 wherein:

said secondary control interpolates between values of the primary profile in order to generate secondary profiles.

32. The beamformer control system of claim 28 wherein said secondary control interpolates between values of at least two primary profiles in order to generate at least one secondary profile.

33. The beamformer control system of claim 28 wherein:

said primary control uses at least one sparsely-sampled parameter profile determined by at least one of (1) a transducer to be used and (2) a scan format to be used;

said primary control generates additional values from at least one of the sparsely-sampled parameter profiles in order to generate additional parameter profiles; and said secondary control generates the additional parameter profiles for generating secondary parameter profiles.

34. The beamformer control system of claim 28 wherein:

said primary control uses a scan line origin, a scan line angle, and a focus range in order to specify focusing time delay profiles and apodization-related profiles.

35. The beamformer control system of claim 34 wherein:

said secondary control specifies focusing time delay profiles and apodization profiles on a per-range-sample, per-scan-line basis.

36. The beamformer control system of claim 34 wherein:

said primary control uses separate scan line parameters, including separate specification of scan line origins and scan line angles for each beam in a multiple simultaneous beam operation.

37. The beamformer control system of claim 28 wherein:

said primary control communicates primary parameter profiles to at least one of the transmit beamformer system and the receive beamformer system on a per-transmit-event basis.

38. The beamformer control system of claim 28 wherein:

said primary control specifies a number of simultaneous beams transmitted by the transmit beamformer system independently from a number of simultaneous beams processed by the receive beamformer system.

39. The beamformer control system of claim 34 wherein:

said primary control uses a plurality of reference ranges in order to specify focusing time delay profiles and apodization-related profiles for secondary control of at least one of the transmit beamformer system and the receive beamformer system.

40. The beamformer control system of claim 28 wherein:

said primary control specifies multiple focusing time delay profiles and multiple apodization-related profiles at least at reference ranges for at least one of single beam operation and multiple simultaneous beam operation.

41. The beamformer control system of claim 28 wherein:

said primary control specifies multiple focusing time delay profiles and multiple apodization-related profiles for each beam for at least one of single and multiple simultaneous beam operation for at least one of the transmit beamformer system and the receive beamformer system.

42. The beamformer control system of claim 28 wherein:

said primary control specifies reference ranges common to each beam in a multiple simultaneous beam operation.

43. The beamformer control system of claim 28 wherein:

said primary control independently selects reference ranges for each of (1) transmit focusing time delay profiles, (2) transmit apodization-related profiles, (3) receive focusing time delay profiles, and (4) receive apodization-related profiles.

44. The beamformer control system of claim 28 wherein:

said beamformer control system uses the focusing time delay profiles and the apodization-related profiles at one or more reference ranges in order to generate focusing time delay profiles and apodization-related profiles at range locations other than on reference ranges.

45. The beamformer control system of claim 28 wherein:

said beamformer control system includes a processor for expanding sparsely-sampled focusing time delay profiles and for expanding sparsely-sampled apodization-related profiles.

46. The beamformer control system of claim 45 wherein:

said processor includes an interpolator for interpolation among focusing time delay profiles and among apodization-related profiles.

47. The beamformer control system of claim 28 wherein:

said primary control includes a focusing delay processor for first interpolating focusing time delay profiles for a desired scan line angle and then second interpolating the first interpolated focusing time delay profiles for a selected scan line origin.

48. The beamformer control system of claim 47 wherein:

said primary control additionally provides to the secondary control focusing delay range interpolation coefficients that are (1) broadcast common to all elements of a transducer array and (2) at range sampling rates.

49. The beamformer control of claim 47 wherein for the transmit beamformer system, the beamformer control further comprising:

means for scaling first and second time delay profiles at first and second reference ranges respectively in the primary control;

means for communicating the scaled first and second time delay profiles to the secondary control; and means for summing the scaled first and second time delay profiles in the secondary control in order to compute a range interpolated time delay profile, with a transmit range at other than a reference range.

50. The beamformer control of claim 49 wherein the transmit beamformer system comprises a plurality of transmit processors, and wherein the beamformer control comprises:

said means for scaling and said means for communicating; and wherein each transmit processor comprises said means for summing.

51. The beamformer control of claim 49 wherein:

said means for scaling uses a range interpolation coefficient to scale the first and the second delay profiles.

52. The beamformer control of claim 47 wherein the receive beamformer system includes an imaging receive beamformer system, and the beamformer control further includes:

means for communicating first and second time delay profiles at first and second reference ranges respectively from the primary control to the secondary control;

and wherein said communicating means communicates a range interpolation coefficient from the primary control to the secondary control;

means for interpolating in the secondary control between the first and the second time delay profiles using the range interpolation coefficient in order to compute an interpolated time delay profile for a receive range located at other than a reference range.

53. The beamformer control of claim 52 wherein the receive beamformer system includes a plurality of imaging receive processors, said beamformer control including:

said communicating means and interpolating means for each imaging receive processor.

54. The beamformer control claim 53 wherein the imaging receive processors are multi-channel receive processors, and wherein said communicating means also broadcasts a common range interpolation coefficient to all channels of receive processors associated with a beam.

55. The beamformer control of claim 47 wherein the receive beamformer system comprises a Doppler receive beamformer system, the beamformer control includes:

means for interpolating in the primary control between first and second time delay profiles using a range interpolation coefficient in order to compute an interpolated time delay profile for a receive range at a location other than a reference range; and means for converting the interpolated time delay profile into a range gate enable profile and a phase rotation profile for approximating a fine time delay.

56. The beamformer control claim 55 wherein:

said means for converting is located in primary control.

57. The beamformer control of claim 55 including:

means for communicating the range gate enable profile to the Doppler receive beamformer as a vector of on and off range gate sample values representative of receive times corresponding to depth.

58. The beamformer control of claim 47 wherein the receive beamformer system is an imaging receive beamformer system, the beamformer control including:

means for communicating first and second apodization profiles at first and second reference ranges respectively from the primary control to the secondary control;

and wherein said communicating means additionally communicates one of (1) a range interpolation coefficient and (2) a range zone width between reference ranges from the primary control to the secondary control; and means for interpolating in the secondary control between first and second apodization profiles using one of (1) the range interpolation coefficient and (2) a range zone width in order to compute an interpolated apodization profile, with a receive range located other at a reference range.

59. The beamformer control system of claim 47 wherein:

said focusing delay processor sums aberration correction delay profiles from an adaptive focus processor.

60. The beamformer control system of claim 47 wherein:
said focusing delay processor scales focusing time delay profiles for a different nominal center frequency than a nominal center frequency used as a basis for a sparsely-sampled reference delay profile.

61. The beamformer control system of claim 47 wherein:
said focusing delay processor interpolates focusing time delay profiles for selected ranges.

62. The beamformer control system of claim 28 wherein:
said primary control includes an apodization processor which generates an apodization profile obtained by modifying a base apodization profile with an apodization correction profile.

63. The beamformer control system of claim 47 wherein:
said secondary control includes an interpolator for interpolating among focusing time delay profiles supplied by the primary control at reference ranges.

64. The beamformer control system of claim 62 wherein:
said secondary control includes an interpolator for interpolating among apodization profiles supplied by the primary control at reference ranges.

65. The beamformer control system of claim 63 wherein:
said primary control additionally provides to the secondary control a time delay range interpolation coefficient for interpolating between two time delay profiles at reference ranges.

66. The beamformer control system of claim 62 wherein:
said secondary control computes an interpolated apodization value based on at least one of a range zone width and a correction range interpolation coefficient specified by the primary control.

67. The beamformer control of claim 28 wherein said secondary control comprises a calibrator for sampling signals from the receive beamformer on a signal-path-to-signal-path basis responsive to a calibration signal sent by the transmit beamformer system and for modifying operation of the receive beamformer system in response to the sampling of said signals.

68. The beamformer control of claim 28 wherein said primary control comprises a calibrator for sampling signals from the receive beamformer system on a beam-to-beam basis responsive to a calibration signal sent by the transmit beamformer system and for modifying the operation of the receive beamformer system in response to the sampling of said signals.

69. An ultrasound beamformer control system for use with (1) a transmit beamformer system for generating a transmit signal and (2) a receive beamformer system for processing a signal received from a target, the control system comprising:
a beamformer control for controlling the transmit beamformer system and the receive beamformer system, said beamformer control comprising:
(1) a primary control for generating primary beamforming parameters for controlling both the transmit beamformer system and the receive beamformer system, which primary beamforming parameters are generated for at least one reference depth; and
(2) a secondary control for generating secondary beamforming parameters, by interpolation, based on the primary beamforming parameters for controlling the transmit beamformer system and the receive beamformer system, said secondary control thereby reducing a quantity of parameters stored and processed by the primary control, and thereby reducing the quantity of parameters which must be communicated from the primary control to the secondary control.

70. The beamformer control system of claim 69 wherein:
said interpolation coefficients provided by the primary control to the secondary control are dependent on focusing range.

71. The beamformer control system of claim 69 wherein:
said receive beamformer system comprises an imaging receive beamformer system and a Doppler receive beamformer system; and
said primary parameters generated by the primary control are usable by the transmit beamformer system, the imaging receive beamformer system, and the Doppler receive beamformer system.

72. An ultrasound beamformer control system for use with a receive beamformer system having a plurality of receive processors for processing a signal received from a target, the control system comprising:
a beamformer control for controlling the receive beamformer system, said control including:
a generator for providing a control profile to each of said receive processors in the receive beamformer system to account for attenuation of the signal received from a target due to passage through an object.

73. The beamformer control system of claim 72 wherein said generator independently provides a control profile to each of the receive processors.

74. The beamformer control of claim 72 wherein:
the receive beamformer system includes a plurality of multi-channel receive processors; and
said generator independently provides a control profile to each channel of each receive processor.

75. The beamformer control system of claim 72 wherein:
said generator provides at least one of the following frequency-vs-time profiles:
(a) a decreasing frequency followed by an increasing frequency over time;
(b) a fixed frequency over time; and
(c) a decreasing frequency over time.

76. The beamformer control system of claim 72 including:
a primary control for generating parameters which define the control profile; and
a secondary control for generating frequency-vs-time profiles from the control profile.

77. The beamformer control system of claim 75 including:
a primary control for storing control profiles which define the frequency-vs-time profiles; and
a secondary control for generating frequency-vs-time profiles from the control profiles supplied by the primary control.

78. The beamformer control system of claim 75 wherein:
said beamformer control stores at least one of the following parameters in order to define the frequency-vs-time profiles: start frequency, frequency limit, frequency downslope, frequency upslope and frequency break time limit.

79. The beamformer control system of claim 72 wherein:
said beamformer control includes a phase processor for providing a phase adjustment value to the receive beamformer system which is comprised of a frequency adjustment component calculated as a demodulation phase value per signal sample and a phase value approximating a fine focusing delay value;
and wherein said generator provides a control profile to the receive beamformer system which accounts for attenuation of the signal due to passage through the object being imaged, provides said control profile to the phase processor for providing a phase adjustment value so that said signal can be used to calculate at least one of a frequency adjustment component and a phase value approximating a fine focusing delay value.

80. The beamformer control system of claim 79 wherein:

said generator provides at least one of the following frequency-vs-time profiles:
(a) a decreasing frequency followed by an increasing frequency over time;
(b) a fixed frequency over time; and
(c) a decreasing frequency over time; to calculate each of the frequency adjustment component.

81. The beamformer control system of claim 72 wherein the receive beamformer system processes multiple simultaneous receive beams with at least two of the receive beams having a different carrier frequency and wherein:

said generator provides a control profile to the receive beamformer system which accounts for attenuation of the signal received from the target due to passage through said object, provides said control profile for each beam dependent upon a carrier frequency of that beam.

82. The control system of claim 72 wherein:

said generator is programmable in order to selectively provide a multiplicity of said control profiles.

83. The beamformer control system of claim 72 wherein:

said generator provides arbitrary frequency-vs-time profiles that track frequency-vs-time attenuation effects.

84. The beamformer control system of claim 72 wherein:

said beamformer control stores parameters for defining frequency-vs-time profiles.

85. The beamformer control system of claim 72 wherein:

said generator generates control profiles per receive beam in order to account for attenuation.

86. The beamformer control system of claim 72 wherein:

said generator generates control profiles which define frequency-vs-time profiles per receive beam and per-channel in order to account for attenuation.

87. An ultrasound beamformer control system for use with a transmit beamformer system for generating a signal and a receive beamformer system for processing a signal received from a target, the control system comprising:

a beamformer control for simultaneously controlling the transmit beamformer system and the receive beamformer system, said control generates at least one of gain adjustments and phase adjustments to enable the transmit and receive beamformer systems to maintain at least one of amplitude coherence and phase coherence among receive scan lines.

88. The beamformer control system of claim 87 wherein the transmit beamformer system transmits a first transmit beam at a first ultrasonic frequency and a second transmit beam at a second ultrasonic frequency;

the receive beamformer system receives a first receive beam corresponding to the first transmit beam, said first receive beam at a third frequency, a second receive beam corresponding to the second transmit beam, said second receive beam at a fourth frequency; and wherein said beamformer control system generates adjustment parameters as a function of said first, second, third, and fourth ultrasonic frequencies, said adjustment parameters being operative to maintain at least one of amplitude coherence and phase coherence between said first receive beam and said second receive beam.

89. The beamformer control system of claim 87 wherein:

said beamformer control generates at least one of gain adjustments and phase adjustments to enable the transmit and receive beamformer systems to maintain at least one of amplitude coherence and phase coherence among receive scan lines for simultaneous beams per transmit event processed by the transmit beamformer system and for simultaneous beams per transmit event produced by the receive beamformer system.

90. An ultrasound beamformer system comprising:

a transmit beamformer system for generating a transmit signal;

a receive beamformer system for processing a signal received from a target which results from the transmit signal interacting with the target; and a beamformer control system for controlling both the transmit beamformer system and the receive beamformer system using at least one common expandable beamforming parameter profile.

91. The beamformer system of claim 90 wherein said beamformer control system uses a common expandable beamforming parameter profile;

said common expandable beamforming parameter profile is expanded by the beamformer control system to produce a first expanded parameter profile to be programmed into said transmit beamformer system;

said common expandable beamforming parameter profile is expanded by the beamformer control system to produce a second expanded parameter profile; and said receive beamformer system is programmed with at least one of the first expanded parameter profile and the second expanded parameter profile.

92. The beamformer system of claim 90 wherein:

said beamformer control system has a primary control system and a secondary control system;

said common expandable parameter profile is stored by the primary control system and communicated to the secondary control system where the common expandable parameter profile is expanded.

93. The beamformer system of claim 92 wherein:

said primary control system expands the common expandable parameter profile; and said primary control system partially expands the common expandable profile before communicating the partially expanded profile to said secondary control system where it is further expanded.

94. The beamformer system of claim 90 wherein:

said beamformer control system has a primary control system and a secondary control system; and said common expandable parameter profile is stored in and expanded by the primary control system and communicated to the secondary control system.

95. The beamformer system of claim 92 wherein:

said common expandable parameter profile comprises at least one of a focusing time delay parameter profile and an apodization-related parameter profile.

96. The beamformer system of claim 92 wherein:

said beamformer control system uses said common expandable parameter profile, wherein said profile is scan geometry independent; and at least one of said primary and secondary control systems expands the parameter profile as appropriate for an arbitrary scan geometry format.

97. The beamformer system of claim 95 wherein:

said control system provides the parameter profile in order to allow the transmit beamformer system and the receive beamformer system to maintain at least one of amplitude coherence and phase coherence among receive scan lines.

98. An ultrasound beamformer system comprising:

a transmit beamformer system for generating a transmit signal;

a receive beamformer system for processing a signal received from a target which results from the transmit signal interacting with the target; and said transmit beamformer system comprising multiple transmit processors, each transmit processor operative to process signals for individual elements of a transducer array;

said receive beamformer system comprising multiple receive processors, each receive processor operative to process signals from individual elements of a transducer array;

a beamformer control system comprising a primary control system and a distributed secondary control system;

said distributed secondary control system comprising a separate secondary control for each transmit processor and a separate secondary control for each receive processor.

99. The beamformer system of claim 98 wherein:

said primary control system generates primary control parameters and communicates the primary control parameters to the distributed secondary control system; and each of said secondary controls use the primary control parameters to generate secondary control parameters appropriate for the transmit and receive processors with which the individual secondary control is associated.

100. The beamformer system of claim 98 wherein:

said primary control system stores at least one sparsely-sampled parameter profile and generates a portion of the primary control parameters by expanding the sparsely-sampled parameter profile.

101. The beamformer system of claim 100 wherein:

said secondary control system further expands the sparsely-sampled parameter profile expanded by the primary control system.

102. The beamformer system of claim 100 wherein:

said sparsely-sampled parameter profile stored by the primary control system is common to both the transmit beamformer system and the receive beamformer system.

103. The beamformer system of claim 98 wherein:

said primary control system stores at least one sparsely-sampled parameter profile comprised at least of focusing time delay profiles and apodization-related profiles; and said primary control system expands said sparsely-sampled parameter profile by separately interpolating a time delay profile and an apodization-related profile using appropriate interpolation coefficients.

104. The beamformer system of claim 103 wherein:

said time delay profile comprises reference delay profiles; and said apodization-related profile comprises at least one of: apodization width profiles, apodization origin profiles, base apodization templates, and apodization correction profiles.

105. The beamformer system of claim 104 wherein:

said reference delay profiles are organized by reference ranges and reference scan line angles.

106. The beamformer system of claim 104 wherein:

said apodization width profiles are organized by reference ranges and scan line numbers.

107. The beamformer system of claim 104 wherein:

said apodization origin profiles are organized by reference ranges and scan line numbers.

108. The beamformer system of claim 104 wherein:

said base apodization templates are organized by type of apodization shape and aperture position.

109. The beamformer system of claim 104 wherein:

said apodization correction profiles are organized by reference ranges and reference scan line angles.

110. An ultrasound beamformer control system for controlling:

(1) a transmit beamformer system having a plurality of independent transmitters, each processing a signal used to construct at least one beam, and (2) a receive beamformer system having a plurality of independent receivers each processing a signal used to construct at least one beam, said control system comprising:

a control processor which can program each transmitter and each receiver with independently programmable parameters.

111. The beamformer control system of claim 110 further wherein each of said independent transmitters and receivers is programmed by said control processor for number of beams at least per transmit event.

112. The beamformer control system of claim 110 further wherein each of said independent transmitters and receivers is programmed by said control processor for per-beam transmit frequency and per-beam receive frequency, respectively, at least per transmit event.

113. The beamformer control system of claim 110 further wherein each of said independent transmitters and receivers is programmed by said control processor for shaping filter response at least per transmit event.

114. The beamformer control system of claim 110 further wherein each of said independent transmitters and receivers is programmed by said control processor with focusing time delay values at least per scan line range sample per receiver and at least per transmit event per transmitter.

115. The beamformer control system of claim 110 further wherein each of said independent transmitters and receivers is programmed by said control processor with apodization values at least per scan line range sample per receiver and at least per transmit event per transmitter.

116. The beamformer control system of claim 110 further wherein each of said independent transmitters and receivers is programmed by said control processor to select calibration values at least per transmit event.

117. The beamformer control of claim 110 further wherein said parameters of the transmitters and receivers are programmed at rates that support adaptive beamformation criteria.

118. An ultrasound beamformer control system for use with (1) a programmable transmit beamformer system for generating a transmit signal and (2) a receive beamformer system for processing a signal received from a target which results from the transmit signal interacting with the target, the control system comprising:

a beamformer control operative to control both the programmable transmit beamformer system and the programmable receive beamformer system by communication of beamforming parameter profiles to the programmable transmit beamformer system and the programmable receive beamformer system.

119. The beamformer control system of claim 118 wherein:

said beamformer control stores source parameter profiles which include parameters determined by at least one of (1) a transducer to be used and (2) a scan format to be used; and said control interpolates between the parameters of the source parameter profiles in order to generate additional parameter profiles.

120. The beamformer control system of claim 118 wherein:

said beamformer control uses a scan line origin, a scan line angle, and a focus range in order to specify focusing time delay profiles and apodization-related profiles.

121. The beamformer control system of claim 120 wherein:

said beamformer control specifies focusing time delay profiles and apodization-related profiles on a per-transmit-event basis.

122. The beamformer control system of claim 120 wherein:

said beamformer control uses separate scan line parameters, including separate scan line origins and separate scan line angles, for each beam in a multiple simultaneous beam operation.

123. The beamformer control system of claim 120 wherein:

said beamformer control communicates parameters to at least one of the transmit beamformer system and the receive beamformer system on a per-scan-line basis.

124. The beamformer control system of claim 118 wherein:

said beamformer control specifies a number of simultaneous beams transmitted by the transmit beamformer system independently from a number of simultaneous beams processed by the receive beamformer system.

125. The beamformer control system of claim 120 wherein:

said primary control uses (1) a plurality of reference ranges in order to specify focusing time delay profiles to the receive beamformer system and (2) a plurality of reference ranges in order to specify apodization-related profiles to the receive beamformer system.

126. The beamformer control system of claim 118 wherein:

said beamformer control specifies multiple focusing time delay profiles and multiple apodization-related profiles for at least one of single beam operation and multiple simultaneous beam operation.

127. The beamformer control system of claim 118 wherein:

said beamformer control specifies multiple focusing time delay profiles and multiple apodization-related profiles for each beam for at least one of single beam operation and multiple simultaneous beam operation for at least one of the transmit beamformer system and the receive beamformer system.

128. The beamformer control system of claim 118 wherein:

said beamformer control independently selects reference ranges, (1) for the transmit beamformer system and (2) for the receive beamformer system, in single beam operation and multiple simultaneous beam operation.

129. The beamformer control system of claim 118 wherein:

said beamformer control independently specifies focusing time delay profiles and apodization-related profiles for each reference range.

130. The beamformer control system of claim 118 wherein:

said primary control independently specifies focusing time delay profiles to the receive beamformer system for each reference range.

131. The beamformer control system of claim 118 wherein:

said primary control includes a delay processor for generating expanded time delay profiles and an apodization processor for generating expanded apodization-related profiles.

132. The beamformer control system of claim 118 wherein:

said primary control includes a focusing control for focusing, including a delay processor for interpolating focusing time delay profiles to a selected scan line angle and for interpolating the angle-interpolated focusing time delay profiles to a selected scan line origin.

133. The beamformer control system of claim 132 wherein:

the delay processor performs linear interpolation.

134. The beamformer control system of claim 132 wherein:

said focusing control sums aberration correction delay profiles from an adaptive focus processor.

135. The beamformer control system of claim 132 wherein:

said focusing control scales focusing time delay profiles developed for a first nominal center frequency and applied at a second nominal center frequency.

136. The beamformer control system of claim 132 wherein:

said focusing control interpolates for a focusing time delay profile at a range among at least two reference ranges.

137. The beamformer control system of claim 132 wherein:

said focusing control generates apodization profiles which result from a modification of a base apodization profile with an apodization correction profile.

138. The beamformer control system of claim 132 wherein:

said beamformer control further includes a secondary control;

wherein for the receive beamformer systems, said secondary control includes an interpolator for interpolating a focusing time delay profile to a first range between scan-line-angle-and-origin-interpolated focusing time delay profiles supplied by the primary control at a first pair of reference ranges.

139. The beamformer control system of claim 138 wherein:

said primary control additionally provides to the secondary control of the receive beamformer system a time delay range interpolation coefficient per range sample.

140. The beamformer control system of claim 139 wherein:

said receive beamformer system includes a plurality of receive processors with said secondary control associated with each of said plurality of receive processors; and wherein said time delay range interpolation coefficient is broadcast in common to all of the receive processors.

141. The beamformer control system of claim 118 wherein said beamformer control comprises a calibrator for sampling signals from the receive beamformer on a signal-path-to-signal path basis responsive to a calibration signal sent by the transmit beamformer system and for modifying the operation of the receive beamformer system in response to the sampling.

142. An ultrasound beamformer control system for use with (1) a transmit beamformer system for generating a transmit signal and (2) a receive beamformer system for processing a signal received from a target which results from the transmit signal interacting with the target, the control system comprising:

a beamformer control for controlling both the transmit beamformer system and the receive beamformer system, said control including a focusing control for generating a time delay profile.

143. The beamformer control system of claim 142 wherein:

said focusing control includes a focus processor for interpolating focusing time delay profiles to a desired scan line angle, and interpolating the focusing time delay profile to a desired scan line origin.

144. The beamformer control system of claim 143 wherein:

said focusing control interpolation performs linear interpolation.

145. The beamformer control system of claim 142 wherein:

said focusing control sums aberration delay correction profiles from an adaptive focus processor.

146. The beamformer control system of claim 143 wherein:

said focusing control focusing time delay profiles developed for a first nominal center frequency and applied at a second nominal center frequency.

147. The beamformer control system of claim 143 wherein:

said focusing control interpolates for a selected focusing range by interpolating between the focusing time delay profiles of at least two reference ranges.

148. An ultrasound beamformer control system for use with (1) a transmit beamformer system for generating a transmit signal and (2) a receive beamformer system for processing a signal received from a target which results from the transmit signal interacting with the target, the control system comprising:

a beamformer control for controlling both the transmit beamformer system and the receive beamformer system, said control including a beamforming control for generating an apodization profile.

149. The control system of claim 148 wherein:

said beamforming control generates the apodization profile by modification of a base apodization profile by an apodization correction profile.

150. A method for controlling (1) an ultrasound transmit beamformer system for generating a transmit signal and (2) an ultrasound receive beamformer system for processing a signal received from a target which results from the transmit signal interacting with the target, the method comprising the steps of:

using a set of sparsely-sampled reference time delay profiles;

origin shifting a first reference time delay profile by an integral number of transducer element widths to a first origin position;

angle interpolating the origin-shifted first reference time delay profile in angle; and origin interpolating to a second origin of the angle-interpolated origin-shifted first reference time delay profile by a fractional transducer element width to a second origin position to create a second reference time delay profile.

151. The method of claim 150 including the step of:

adding a constant delay offset profile to the second reference delay profile.

152. The method of claim 150 including the step of:

adding an aberration correction delay profile from an adaptive focus processor to the second reference time delay profile.

153. The method of claim 150 including the step of:

scaling the second reference time delay profile developed for a first nominal center frequency and applied at a second nominal center frequency.

154. The method of claim 150 including the step of:

for transmit beamforming, if a desired transmit range is not a delay reference range, computing intermediate values based on adjacent reference ranges, which intermediate values when combined produce the time delay profile for the desired transmit range.

155. The method of claim 150 wherein for the transmit beamformer system that a transmit range is other than a reference range, the method includes the steps of:

scaling first and second time delay profiles at first and second reference ranges respectively in a primary control;

communicating the scaled first and second time delay profiles to a secondary control; and summing the scaled first and second time delay profiles in the secondary control in order to compute a range interpolated time delay profile.

156. The method of claim 155 including the step of:

performing the scaling, communicating, and summing steps for a plurality of transmit processors which transmit processors taken together comprise the transmit beamformer system.

157. The method of claim 155 wherein the step of scaling:

uses a range interpolation coefficient to scale the first and the second time delay profiles.

158. The method of claim 150 wherein the receive beamformer system comprises an imaging receive beamformer system and with a receive range located at other than a reference range, the method includes the steps of:

communicating first and second time delay profiles at first and second reference ranges respectively from a primary control to a secondary control;

communicating a range interpolation coefficient from the primary control to the secondary control;

interpolating in the secondary control between the first and the second time delay profiles using the range interpolation coefficient in order to compute an interpolated time delay profile for the receive range.

159. The method of claim 158 including the step of:

performing the communicating steps and interpolating step for a plurality of imaging receive processors, which imaging receive processors when taken together comprise the receive beamformer system.

160. The method of claim 159 wherein the imaging receive processors are multi-channel receive processors, the method further comprising:

using a common range interpolation coefficient, which is broadcast to all channels associated with a beam, for all receive processors.

161. The method of claim 150 wherein the receive beamformer system comprises a Doppler receive beamformer system and with a receive range located at other than a reference range, the method includes the steps of:

interpolating in a primary control between first and second time delay profiles using a range interpolation coefficient in order to compute an interpolated time delay profile for said receive range; and converting the interpolated time delay profile into a range gate enable profile and a phase rotation profile for approximating a fine focusing time delay.

162. The method of claim 161 including:

performing the converting step in the primary control.

163. The method of claim 161 including:

communicating a range gate enable profile to the Doppler receive beamformer as a vector of on-and-off range gate sample values representative of receive times corresponding to depth.

164. The method of claim 150 wherein:

said origin shifting step includes shifting the first reference time delay profile by an integer part of a line origin offset value.

165. The method of claim 164 wherein:

said origin interpolating step includes interpolating the origin-shifted angle-interpolated first reference time delay profile by a fractional part of the line origin offset value.

166. The method of claim 150 wherein:

said angle interpolating step includes linear interpolation.

167. The method of claim 150 including the step of:

adding one of a time delay and a time advance profile to cancel fixed and known analog propagation delays not included in the second reference time delay profile.

168. The method of claim 150 including the step of:

scaling the second reference time delay profile based on a selected nominal center frequency if the first reference delay profile was derived based on a different nominal center frequency.

169. The method of claim 150 wherein the steps of using, origin shifting, angle interpolating, and origin interpolating are performed in a primary control for the transmit and receive beamformer systems, and in which the method further comprises the step of:

interpolating among said second reference time delay profiles to form focusing time delay profiles for a selected range in a secondary control.

170. The method of claim 169 further comprising the step of:

applying a delay calibration factor in a secondary control to account for analog path delay differences.

171. The method of claim 169 further comprising the step of:

in a secondary control, adding an element-dependent and scan line origin-dependent and steering-angle-dependent focusing offset term to the calculated time delay profile in order to accomplish at least one of the following: (a) to compensate for the effect of at least one of pipeline, filter, and envelope processing delays, (b) to customize the delay profile for special focusing requirements such as defocusing in color Doppler mode, (c) to stagger multiple simultaneous transmit beams in order to reduce beam interference, and (d) to unstagger multiple receive beams after transmit staggering.

172. The method of claim 169 further comprising the step of:

applying a focusing time delay profile in a first portion of a secondary control as an actual time delay and in a second portion of a secondary control as a phase shift approximating a residual time delay.

173. A method for generating apodization profiles for arbitrary scan line origin and angle to control (1) an ultrasound transmit beamformer system for generating a transmit signal and (2) an ultrasound receive beamformer system for processing a signal received from a target which results from the transmit signal interacting with the target, the method comprising the steps of:

calculating an apodization width using interpolation by scan line number and range among apodization width profile values;

calculating an arbitrary apodization origin using interpolation by scan line number and range among apodization origin profile values;

using the results of the first two steps together with a selected base apodization template to interpolate a base apodization profile;

calculating a correction profile using interpolation by scan line angle and range among apodization correction profile values; and generating a corrected apodization profile by multiplying the base apodization profile with the correction profile.

174. A method for generating an apodization profile for arbitrary scan line origin and angle for a selected scan geometry, to control (1) an ultrasound transmit beamformer system for generating a transmit signal and (2) an ultrasound receive beamformer system for processing a signal received from a target which results from the transmit signal interacting with the target, the method comprising the steps of:

generating a base apodization profile for the selected scan geometry;

generating a correction profile for the selected scan geometry; and generating a corrected apodization profile by modifying the base apodization profile with the correction profile.

175. The method of claim 174 wherein the receive beamformer system is an imaging receive beamformer system, and with a receive range being other than a reference range, the method including the steps of:

communicating first and second correction apodization profiles at first and second reference ranges respectively from a primary control to a secondary control;

communicating one of (1) a range interpolation coefficient and (2) a range zone width between the reference ranges from the primary control to the secondary control;

interpolating in the secondary control between the correction apodization profiles, using one of (1) the range interpolation coefficient and (2) the range zone width, in order to compute an interpolated apodization profile.

176. The method of claim 174 including the steps of:

calculating an apodization width using interpolation by scan line number and range among apodization width profile values;

calculating an apodization origin using interpolation by scan line number and range among apodization origin profile values; and using a result of the first two steps together with a selected base apodization template to interpolate a base apodization profile in the base apodization profile generation step.

177. The method of claim 174 wherein:

said step of generating a corrected apodization profile includes multiplying together the base apodization profile and the correction profile.

178. The method of claim 174 wherein said step of generating a base apodization profile includes:

selecting a base apodization template appropriate to a selected reference range;

origin-shifting and width-scaling the selected base apodization template; and interpolating the origin-shifted and width-scaled selected base apodization template in order to generate the base apodization profile.

179. The method of claim 174 wherein said step of generating the correction profile includes the steps of:

generating the correction profile for a selected scan line steering angle and at least one reference range including (1) interpolating in angle among correction profile values that have been origin-shifted in order to form the correction profile for the selected steering angle, and (2) interpolating array element positions to shift the correction profile to a selected origin.

180. The method of claim 174 wherein the steps of generating a base apodization profile, generating a correction profile, and generating a corrected apodization profile are performed in a primary control for the transmit and receive beamformer systems, and in which the method further comprises the step of:

range interpolating apodization profiles to selected ranges based on apodization profiles for at least one reference range, said range interpolating step performed in a secondary control.

181. The method of claim 180 further comprising the step of:

calibrating range-interpolated corrected apodization profiles in the secondary control with an apodization calibration factor profile in order to compensate for at least one of (1) analog path gain differences, (2) transducer element-to-element gain differences, and (3) a missing or failed element by readjusting the apodization of remaining active elements.

182. The method of claim 180 further comprising the step in the secondary control of adjusting range-interpolated corrected apodization profiles by a gain adjustment factor profile per beam for at least one of (1) compensating for processor filter attenuation and (2) performing beam-dependent gain management.

* * * * *

UNITED STATES PATENT AND TRADEMARK OFFICE
CERTIFICATE OF CORRECTION

PATENT NO.   : 5,581,517
DATED        : December 3, 1996
INVENTOR(S)  : Albert Gee et al.

It is certified that error appears in the above-identified patent and that said Letters Patent is hereby corrected as shown below:

Column 17,
Line 8, change "R-125" to -- R-100 --.

Column 19,
Line 54, change "[$\tau_1$ ($i$, $Rj$, $\theta_{k+1}$" to -- [$\tau_1$ ($i$, $Rj$, $\theta_{k+1}$) --.
Line 58, change "$\alpha_{74}$," to -- $\alpha_\theta$, --.

Column 20,
Line 29, change "($i$, $Rj$, $L$)" (second occurrence) to -- ($i$, $R_j$, $L$) --.
Line 66, change "T$_{nom}$" to -- t$_{nom}$ --.

Column 23,
Line 20, change "$\alpha_2 = (1-\alpha_R)\, \alpha_1$" to -- $\alpha_2 = (1-\alpha_R)\, \alpha_1$ --.
Line 47, change:

$$\text{``}O_{apod}R, L) = \alpha_1 O_{apod}(R_j, L_K) + \alpha_2 O_{apod}(R_j, L_{K+1})$$
$$+_3 O_{apod}(R_{j+1}, L_K) + \alpha_4 O_{apod}(R_{j+1}, L_{K+1})\text{''}$$

to $$-- O_{apod}R, L) = \alpha_1 O_{apod}(R_j, L_K) + \alpha_2 O_{apod}(R_j, L_{K+1})$$
$$+ \alpha_3 O_{apod}(R_{j+1}, L_K) + \alpha_4 O_{apod}(R_{j+1}, L_{K+1}) --.$$

Column 24,
Line 37, change "$[C)\ i', R_j, \theta_{k+1}) - C(', R_j, \theta_k)]$"

to -- $[C)\ i', R_j, \theta_{k+1}) - C(i', R_j, \theta_k)]$ --

Line 59, change "and R$_{+1}$" to -- R$_{j+1}$ --.

Column 25,
Line 49, change "performbeam-dependent" to -- perform beam-dependent --.

UNITED STATES PATENT AND TRADEMARK OFFICE
CERTIFICATE OF CORRECTION

PATENT NO.  : 5,581,517
DATED       : December 3, 1996
INVENTOR(S) : Albert Gee et al.

It is certified that error appears in the above-identified patent and that said Letters Patent is hereby corrected as shown below:

Column 41,
Line 59, change "$F_o$" to -- $F_c$ --.

Column 42,
Line 60, change "$f_D(t) \bullet (t$ -$_{break})$ +" to -- $f_D(t) \bullet (t$ -$T_{break})$ + --.

Column 50,
Line 3, change "$\gamma_E$" to -- $\gamma_E$, --.
Line 27, change "targets). The" to -- targets). (The --.

Column 51,
Line 31, change "$\phi_D = -2\pi v 100\ \tau_\phi$," to -- $\phi_D = -2\pi v_\phi \tau_\phi$, --.

Column 59,
Line 7, change "programing" to -- programming --.

Column 68,
Lines 22 and 39, change "control claim" to -- control of claim --.
Line 66, change "sums" to -- sums in --.

Column 74,
Lines 20, 22, 29, 33, 38, 42, 47 and 52, after "independent" insert -- multi-channel --.
Lines 25 and 26, after "each" insert -- multi-channel --.

Column 77,
Line 41, after "control" insert -- scales --.

Column 80,
Line 60, change "and (2)" to -- or (2) --.

UNITED STATES PATENT AND TRADEMARK OFFICE
CERTIFICATE OF CORRECTION

PATENT NO. : 5,581,517
DATED : December 3, 1996
INVENTOR(S) : Albert Gee et al.

It is certified that error appears in the above-identified patent and that said Letters Patent is hereby corrected as shown below:

Column 82,
Line 24, change "control of" to -- control, of --.

Signed and Sealed this

Twenty-eighth Day of May, 2002

Attest:

Attesting Officer

JAMES E. ROGAN
Director of the United States Patent and Trademark Office